United States Patent

[11] 3,618,032

[72] Inventors Paul E. Goldsberry; Jack Ward Simpson, both of Lexington, Ky.

[21] Appl. No. 782,285
[22] Filed Dec. 9, 1968
[45] Patented Nov. 2, 1971
[73] Assignee International Business Machines Corporation Armonk, N.Y.

[54] AUTOMATIC DATA COMPOSING, EDITING AND FORMATTING SYSTEM
30 Claims, 36 Drawing Figs.

[52] U.S. Cl. .......... 340/172.5
[51] Int. Cl. .......... G06f 15/02, G06f 15/40, G06f 3/14
[50] Field of Search .......... 340/172.5, 324.1, 146.1; 197/20

[56] References Cited

UNITED STATES PATENTS

| | | | |
|---|---|---|---|
| 3,241,120 | 3/1966 | Amdahl | 340/172.5 |
| 3,248,705 | 4/1966 | Dammann et al. | 340/172.5 |
| 3,256,516 | 6/1966 | Melia et al. | 340/172.5 |
| 3,297,124 | 1/1967 | Sims | 197/19 |
| 3,307,154 | 2/1967 | Garth, Jr. et al. | 340/172.5 |
| 3,346,853 | 10/1967 | Koster et al. | 340/172.5 |
| 3,364,473 | 1/1968 | Reitz et al. | 340/172.5 |
| 3,501,746 | 3/1970 | Vosbury | 340/172.5 |

*Primary Examiner*—Gareth D. Shaw
*Assistant Examiner*—Jan E. Rhoads
*Attorneys*—Hanifin and Clark and John W. Girvin, Jr.

ABSTRACT: A data composing, editing and formatting system for use in business offices by typists and composers of business letters and documents. A cathode-ray tube display is utilized to display keyed data and data inputted by a secondary media reader in a manner analogous to the display of a page of typed data on a typewriter. Once the data is so inputted, additional data can be inserted at a point defined by the operator without any resulting loss of information, word integrity, columnar definition or paragraph designation. Additionally, data can be deleted and the data located down page from the deleted data will shift up page to fill in where the deleted data was located without loss of paragraph designation. Text modification controls further include data centering within defined margins, transfer of data from one page position to another without loss of data or paragraph definition, automatic adjustment of the data to conform to new margin settings and a unique hyphenation operation. Once the data has been inputted and modified, it is transferred to a serial printer and/or a secondary media recorder for permanent recording. Special controls effect the optimum utilization of the serial printer by utilizing margin stop locations of the displayed data as well as tab stop location to define printer tabulation operations.

INVENTORS
PAUL E. GOLDSBERRY
JACK WARD SIMPSON
BY John W Girvin, Jr.
ATTORNEY

AUTOMATIC DATA COMPOSING, EDITING AND FORMATTING SYSTEM

CROSS-REFERENCES TO RELATED APPLICATIONS

The following applications are assigned to the same assignee as the present application.

U.S. Pat. application Ser. No. 623,053, filed Mar. 14, 1967, entitled "Data System With Printing, Composing, Communications and Magnetic Card Processing Facilities," Robert A. Kolpek, inventor.

U.S. Pat. application Ser. No. 578,791, filed Sept. 12, 1966, entitled "Electronic Counter," Louis M. Hornung, inventor, now U.S. Pat. No. 3,511,977.

U.S. Pat. application Ser. No. 765,326, filed Oct. 7, 1968, entitled "Electronic Statistical Typing System," Robert A. Rahenkamp and William R. Stewart, Jr., inventors.

BACKGROUND OF THE INVENTION

1. Field

This invention relates to an automatic data composing, editing and formatting device, and more particularly, to an improved electronic display device having facilities therein to effect ready changes in the content and format of the data displayed and which is designed for the optimum operation of a serial printer.

2. Description of the Prior Art

The preparation of modern business documents often involves typing and editing several drafts of the document before it is complete, correct, and presented in a format that is both readily understandable and aesthetically pleasing to the eye of the reader. The steps of preparing a final printed copy of a document often entail: (1) Typing a rough draft from raw data, dictation equipment, or notes; (2) deletions, insertions, rearrangement and corrections by an editor; (3) retyping, using the edited rough draft as a source of information; (4) reediting to insure correctness and to insure aesthetic perfection; (5) retyping as necessitated by step (4) reediting to insure correctness of the final copy.

As can be seen from the above, each time information is typed, it must be reread and perhaps edited to insure that it is correct, and each time that it is edited, it must be retyped. This process is extremely time consuming inasmuch as the secretary's time is lost in retyping while the editor's time is lost in reediting.

Several devices have been proposed and utilized which shorten the amount of time lost in retyping and reediting business documents. One prior art approach has been to record each of the characters typed on a secondary media such as paper tape or magnetic media as the first draft of the document is being prepared. The typed copy is then examined and edited by the editor and returned to the typist with the corrections to be made noted thereon. The secondary medium is then selectively utilized by the typist to control the typewriter so that it will automatically print out the information contained in the first draft. The typist must control the playout of this information, stopping it where necessary to make proper insertions and deletions in accordance with the instructions of the editor thus providing a second draft of the document. Since it is possible for the typist-operator to make a mistake in the preparation of the second draft or for the editor to change its form or content, it is necessary to have an additional secondary media station to record the characters as they appear on the second draft. The second draft is then sent to the editor and the process continues in much the same manner until the desired final copy is printed. While such prior art devices reduce the workload of the typist and the number of typing mistakes since the typist only has to key the edited material, these devices require a highly skilled operator to keep track of and to operate with the secondary media. Additionally, these devices do not appreciably reduce the workload of the editor.

A second type of prior art device which has been utilized to edit and correct keyed data is an electronic display device. These devices generally have a cathode-ray tube (CRT) display which displays information keyed into the device from an associated keyboard or which is provided by an electronic computer system. Once the information is displayed, corrections to the displayed data can be made by the operator. Such corrections include entry of new data, deletion of existing data or insertion of new data. These display devices are of two types, the so-called "programmed" device and the "stand alone" device. The "programmed" device has a CRT station containing storage addressing controls, CRT controls, and a keyboard. The data is entered from the keyboard or other means into the central processor of a remote computer which is programmed to receive the data and store it. The data is so stored is then sent back to the CRT station to be displayed on the CRT display. The placement of the data on the CRT screen is controlled by the program which controls the central processor. An example of such a device is the IBM 2260 data communications and display device now in public use.

A "stand alone" device differs from the programmed device inasmuch as all of the control electronics necessitated to effect data editing are located at the console with the keyboard and CRT display. These devices generally have their own bulk storage wherein the characters to be displayed are stored in some convenient code form such as modified binary coded decimal. Once the information content is believed to be correct, the data in the bulk storage is transmitted to a central processor. The central processor can then cause subsequent printout of the information. Such a system is exemplified in U.S. Pat. No. 3,248,705 entitled "Automatic Editor" and assigned to the assignee of the present invention.

It is noted that the "programmed" devices as set forth above do not lend themselves readily to utilization by the average business office since they require large scale data processing units to accompany them. Further, both the "stand alone" and "programmed" devices described above are oriented toward the computer user inasmuch as line size, margins, length of insertions and deletions, and the final format of the output document are dictated by constraints placed on the system by the computer and cannot readily be changed by the operator of the keyboard device. Additionally, since the prior art electronic display devices require the operator to communicate with the computer to effect changes in the stored information, the operator must learn the computer format. Further, a large computer storage facility is necessitated to store the many documents keyed in and the computer must have indexing and addressing controls to uniquely locate each document. Thus, as is readily apparent, none of the prior art electronic display devices are oriented toward the business user.

As already noted, it is often desirous to change the format of a business document so that it creates a favorable impression to the reader. Margins, paragraph spacing, arrangements of headings and order of paragraphs are often changed to provide a more effective communication. None of the prior art devices described above provide a ready means for the editor or operator to experiment with and change the format of a business document.

SUMMARY

In order to overcome the above-noted shortcomings of the prior art, the present invention provides an information editing and display device wherein information can readily be keyed into the device by a typist who is unskilled in the data processing arts.

The keyed information can be altered by the typist to correct obvious typographical errors and then transferred to a secondary storage medium, such as a magnetic card or magnetic tape storage media. Once the information has thus been recorded, the display device can be utilized for the typing of a different document. At a later time, the information stored on the secondary storage media can be read back into the display device and the information so entered can be displayed to and edited by the editor. Further, the editor can at this time change the format of the information displayed by adjusting margins, centering the information within the existing margins, changing the paragraph or line order, inserting headings, changing line endings, as for example, by hyphenating words to obtain an even right-hand margin, or by putting the information into columnar form as it would appear, for example, in a newspaper or book publications. Once the information is edited and formatted, it is ready for typing in final form. This can be done by connecting an output printer to the display device or by recording the information so edited once again on the secondary media, and later utilizing the secondary media to effect a printout on a different device.

In order to facilitate rapid typing and editing of information in varied format form, the display device of the present invention operates in four basic modes: replace, delete, insert, and close. When operating in the replace mode, information keyed in is sequentially stored starting at a page location defined by the operator. When in the delete mode, information that has previously been stored is replaced with blank spaces. When in close mode, information located down the page from a predetermined point can be closed to that point with all intervening information being destroyed. When in insert mode, information can be keyed in at any predetermined point without a resulting loss in information as long as there is less than a page of information in the total document. Thus, in insert mode, only the information content at the page ending is affected, and all paragraphs remain intact.

As is often the case in typing a business letter, the margins differ throughout the page. This is particularly true where various paragraphs are indented and where columnar information is to be presented. A unique feature of the present invention is that a plurality of margin stops, each of which may be associated with a vertical position on the page to be typed can be stored for later activation by the operator. Several sets of margin stops can be associated with a single vertical position on a page, thereby enabling the typist to rapidly type columnar information. For example, the typist would type all the information which is to appear within a column defined by the first set of margin stops, then activate the second set of margin stops and the information subsequently typed would be stored alongside of the first column of information within the margins defined by the second set of stops. An additional unique feature is that a serial printer can be connected to this device which will interpret the intermediate margin stops as tab stops, thereby printing the information within different columns defined by margin stops across the columns serially, from left to right.

As mentioned above, it is often desirous to change the existing margins of printed data to change the aesthetic effect of the document. A unique feature of the present invention is that the existing margins of information which has been keyed into the device can be expanded or contracted and the information reformed to fit within the new margins. This operation is performed a line at a time or a paragraph at a time, thereby enabling one to maintain a plurality of different margin endings for the final document. An additional feature of the present invention is the utilization of a unique hyphenation routine which maximizes the number of symbols per line and allows the operator latitude in determining line endings and further enables the operator to eliminate unwanted "rivers" and "bays" which are formed by the arrangement of space characters which occur in the text.

The foregoing and other features and advantages of the invention will be apparent from the following more particular description of the preferred embodiment of the invention as illustrated in the accompanying drawings.

IN THE DRAWINGS

Figure 4A:
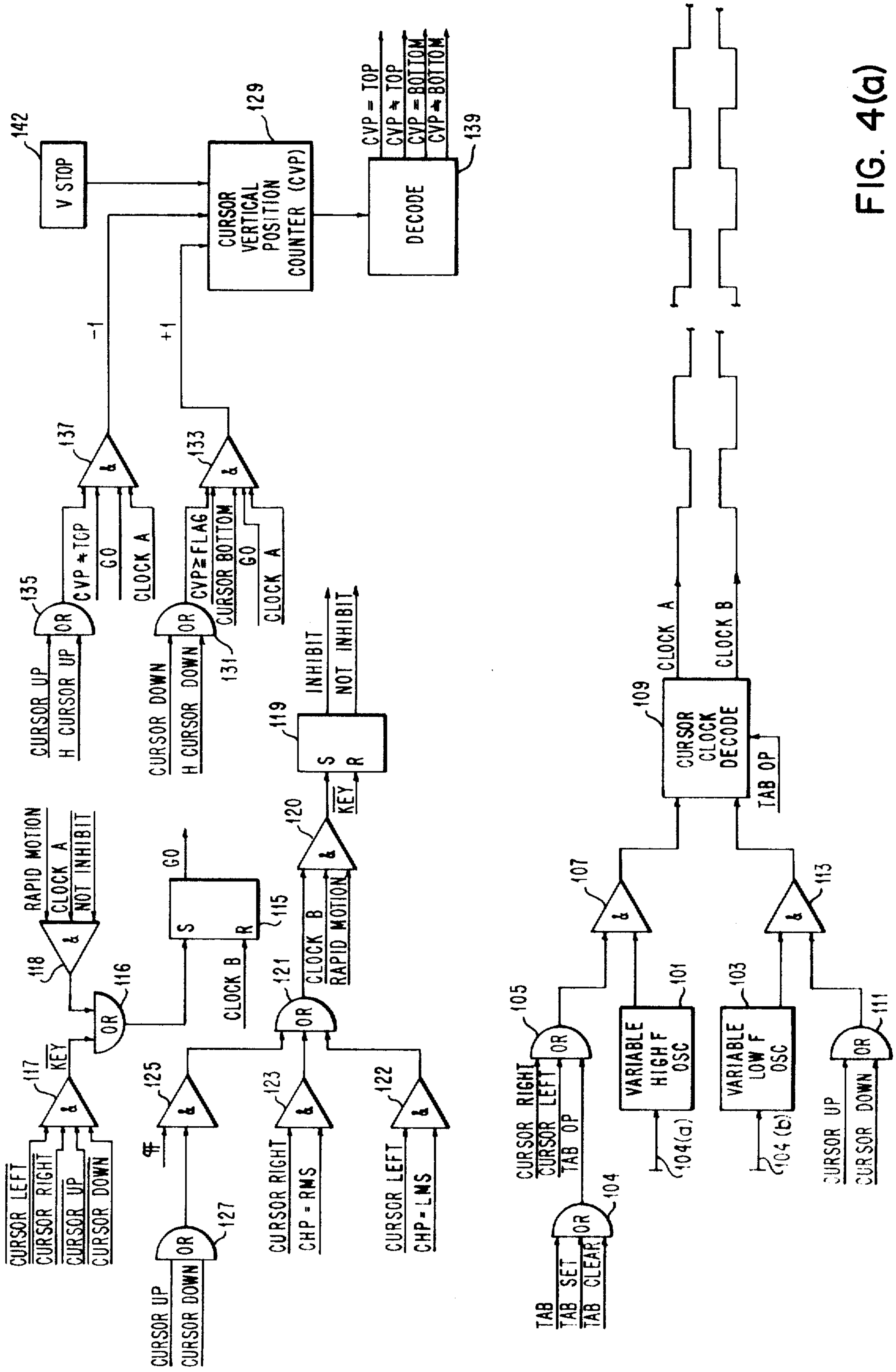
Figure 4B:
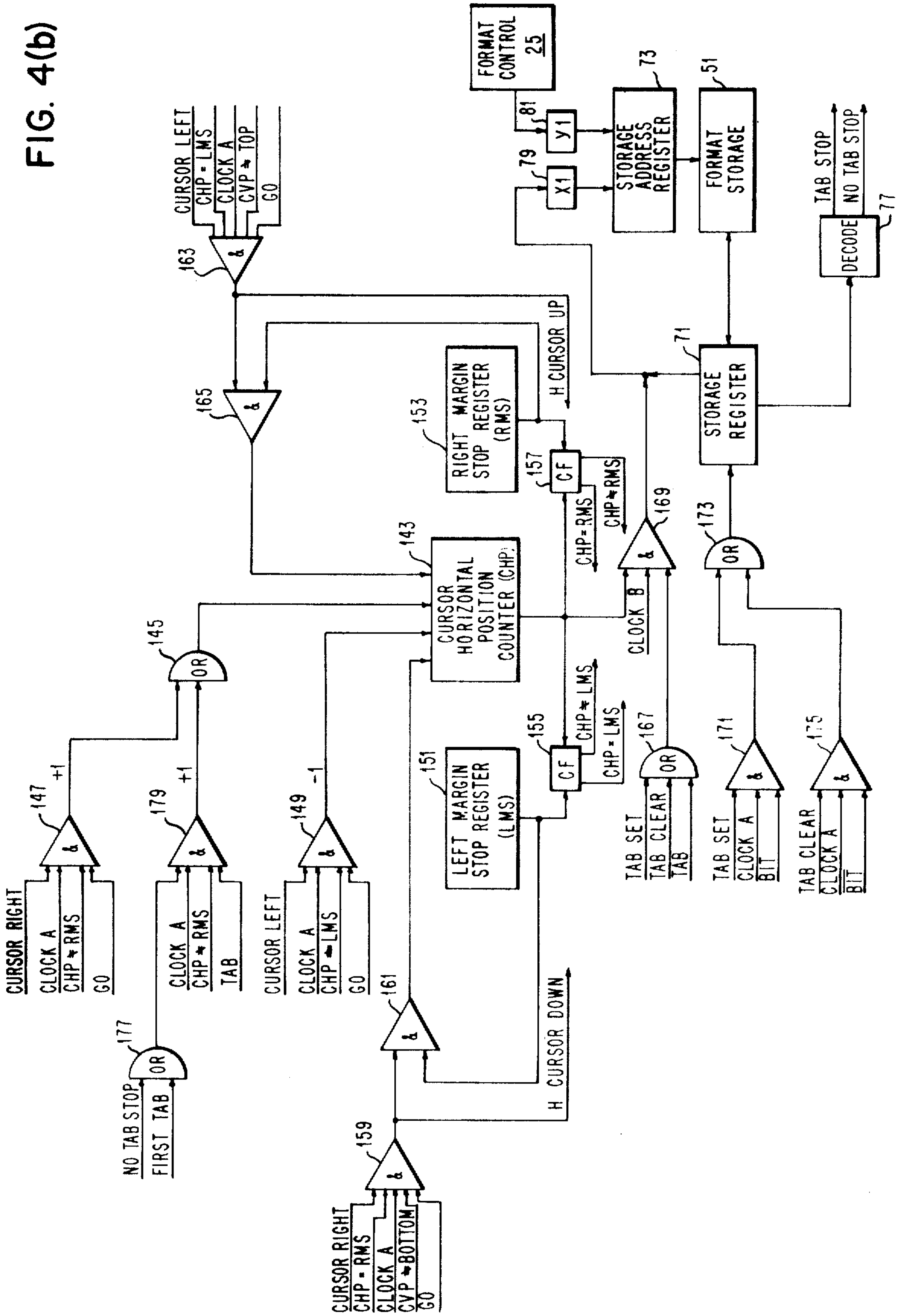

FIGS. 4(*a*) and 4(*b*) are schematic block diagrams of the cursor positioning logic which controls the placement of a marker symbol on the display device.

Figure 5A:
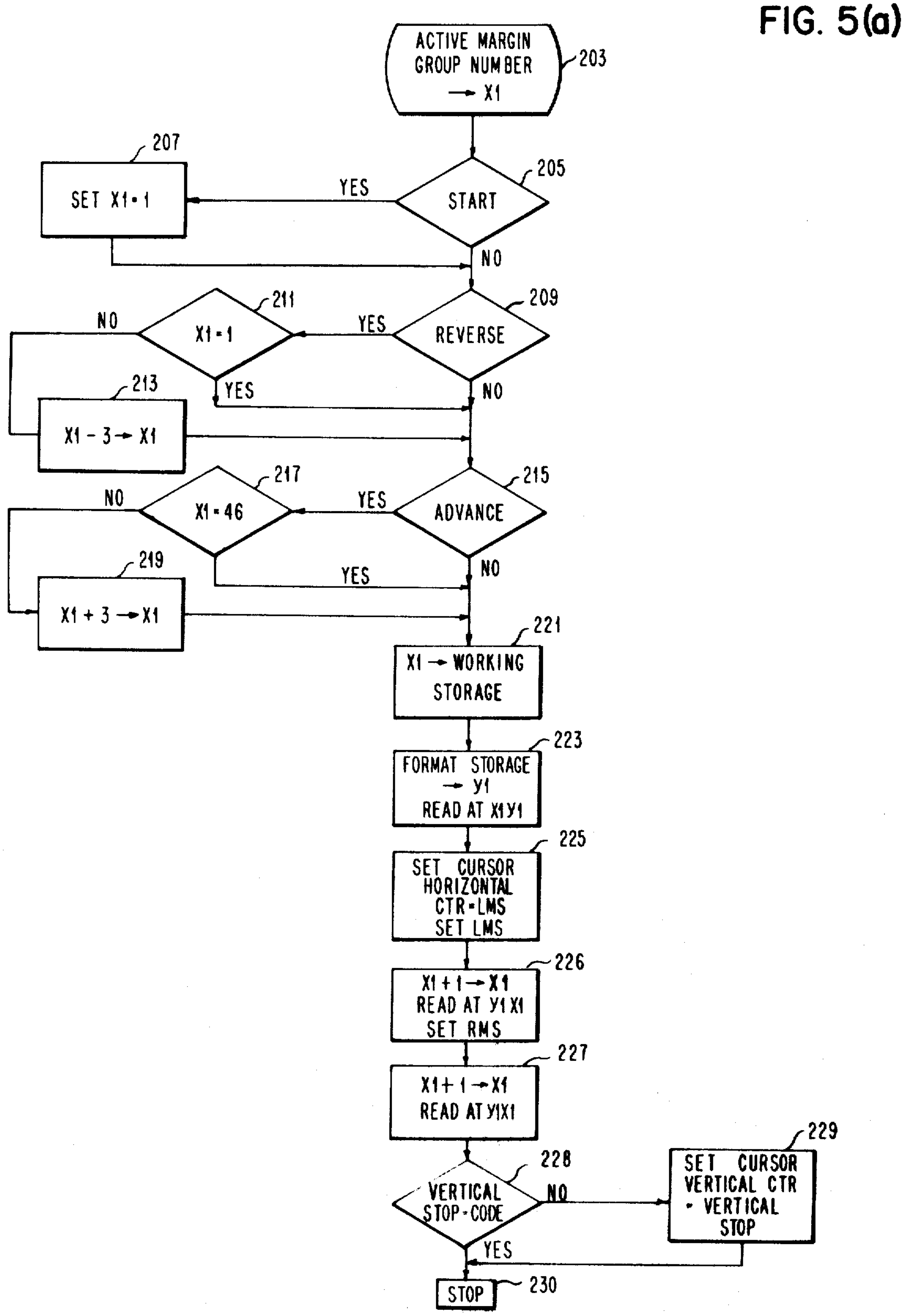
Figure 5B:
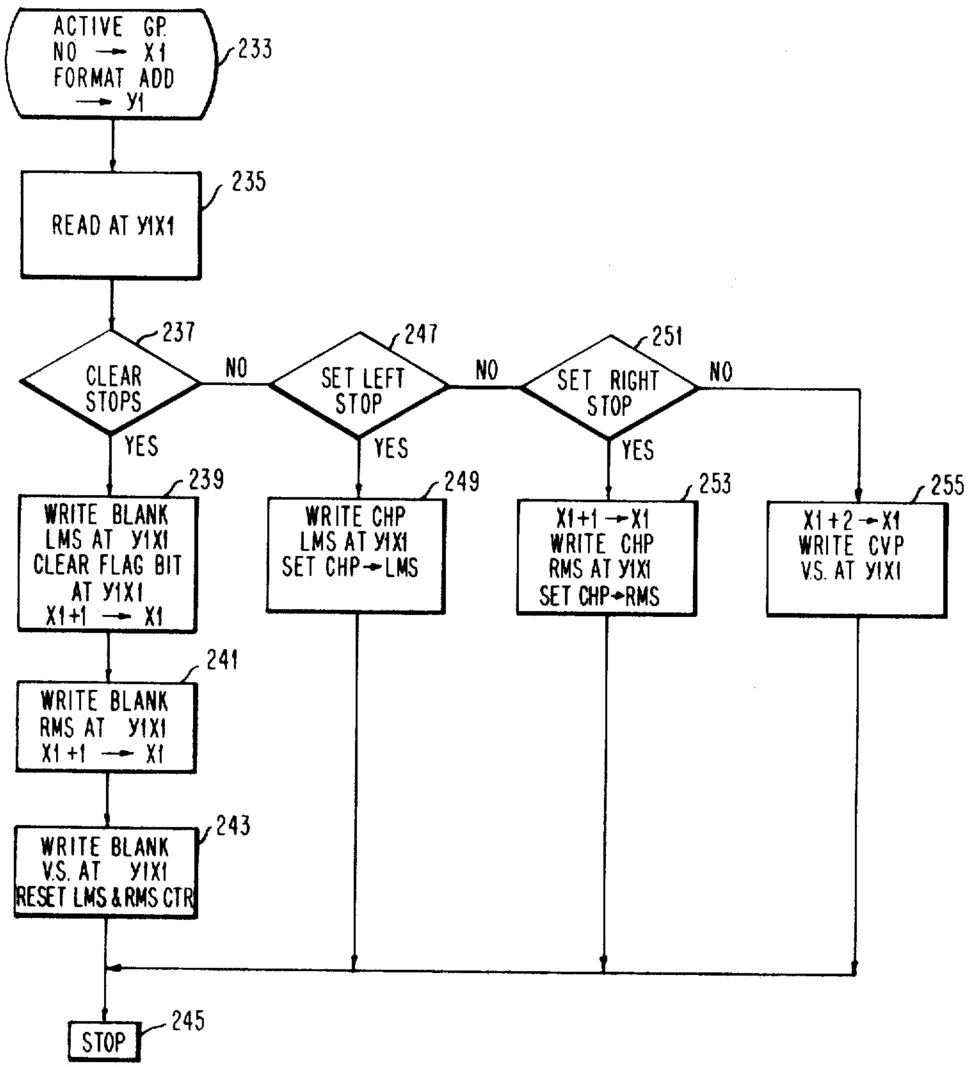

FIGS. 5(*a*) and 5(*b*) are state diagrams of the sequence of operations effected by the system of FIGS. 1, 3, 4, and 15 during margin formatting operations.

Figure 6A:
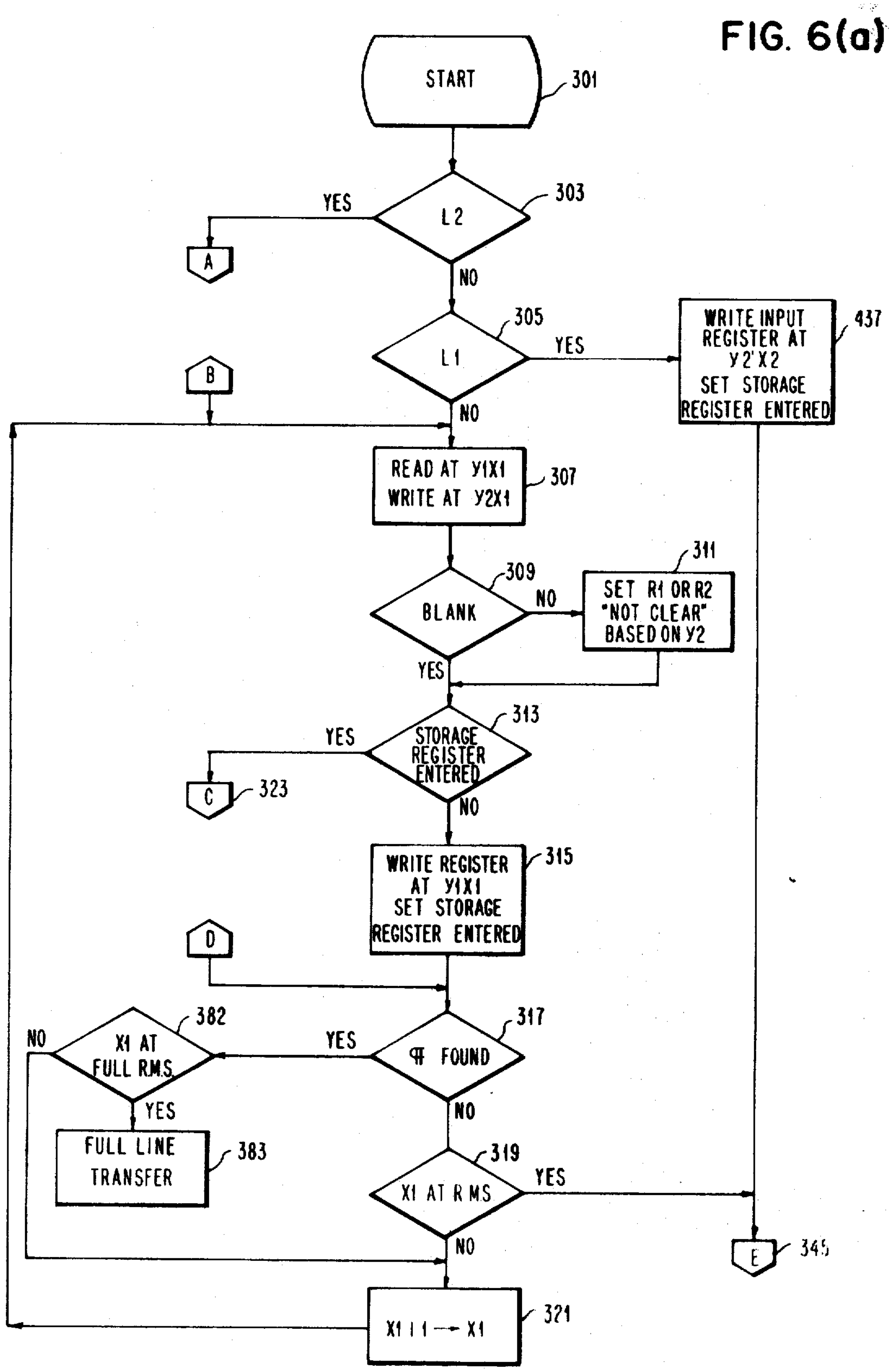
Figure 6B:
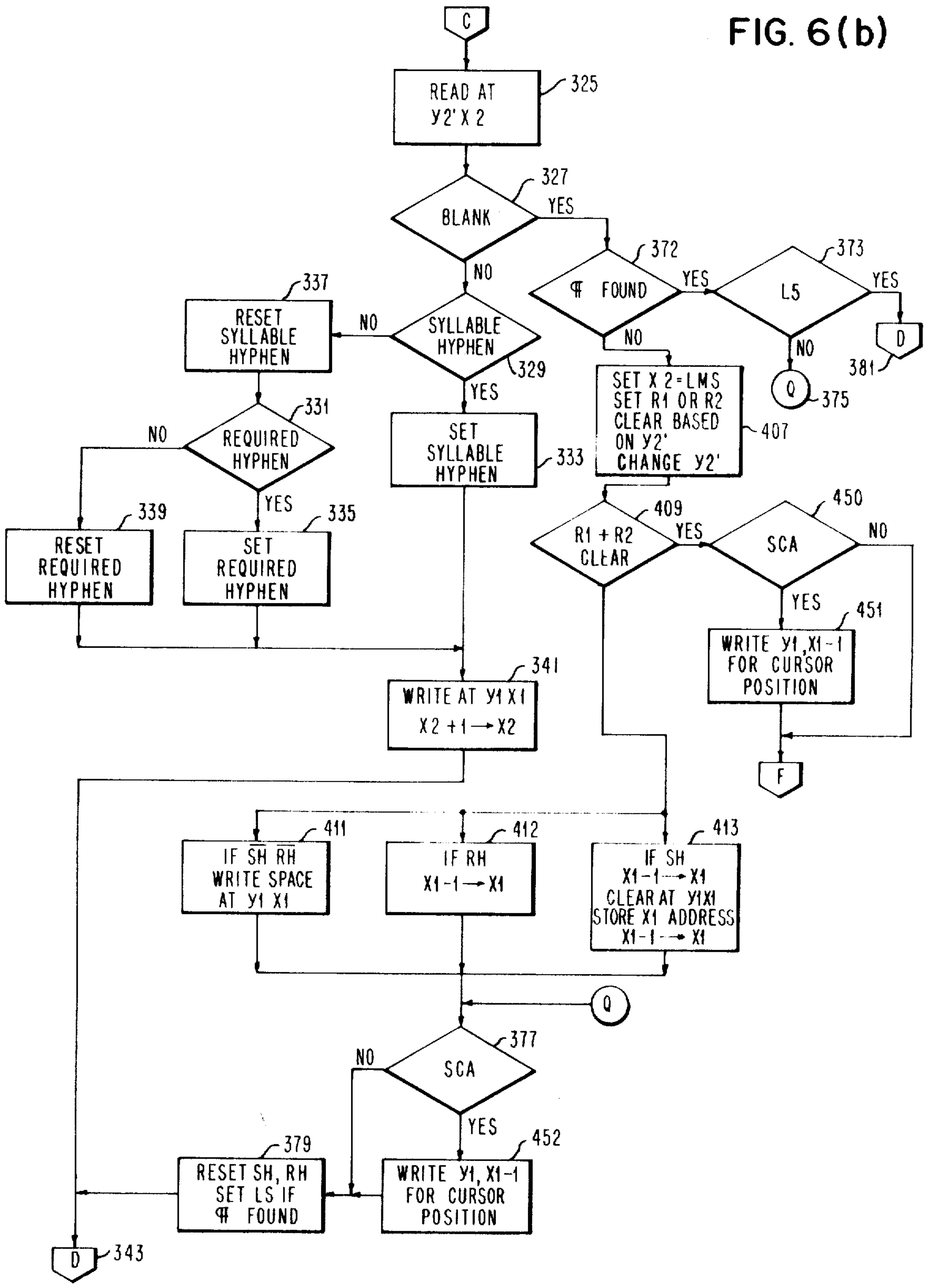
Figure 6C:
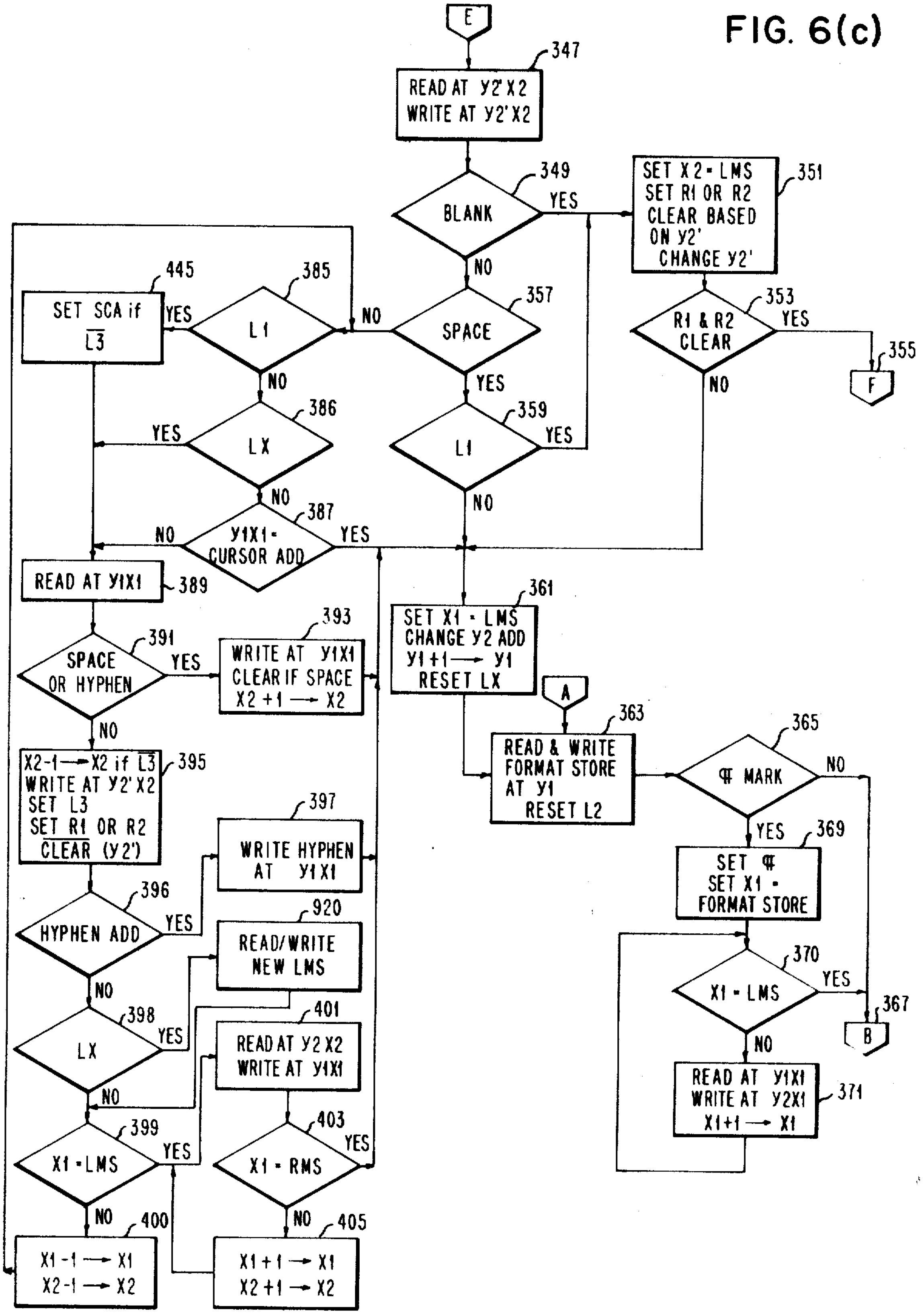

FIGS. 6(*a*), 6(*b*) and 6(*c*) are state diagrams of the sequence of system operations effected during an insert mode operation.

Figure 7:
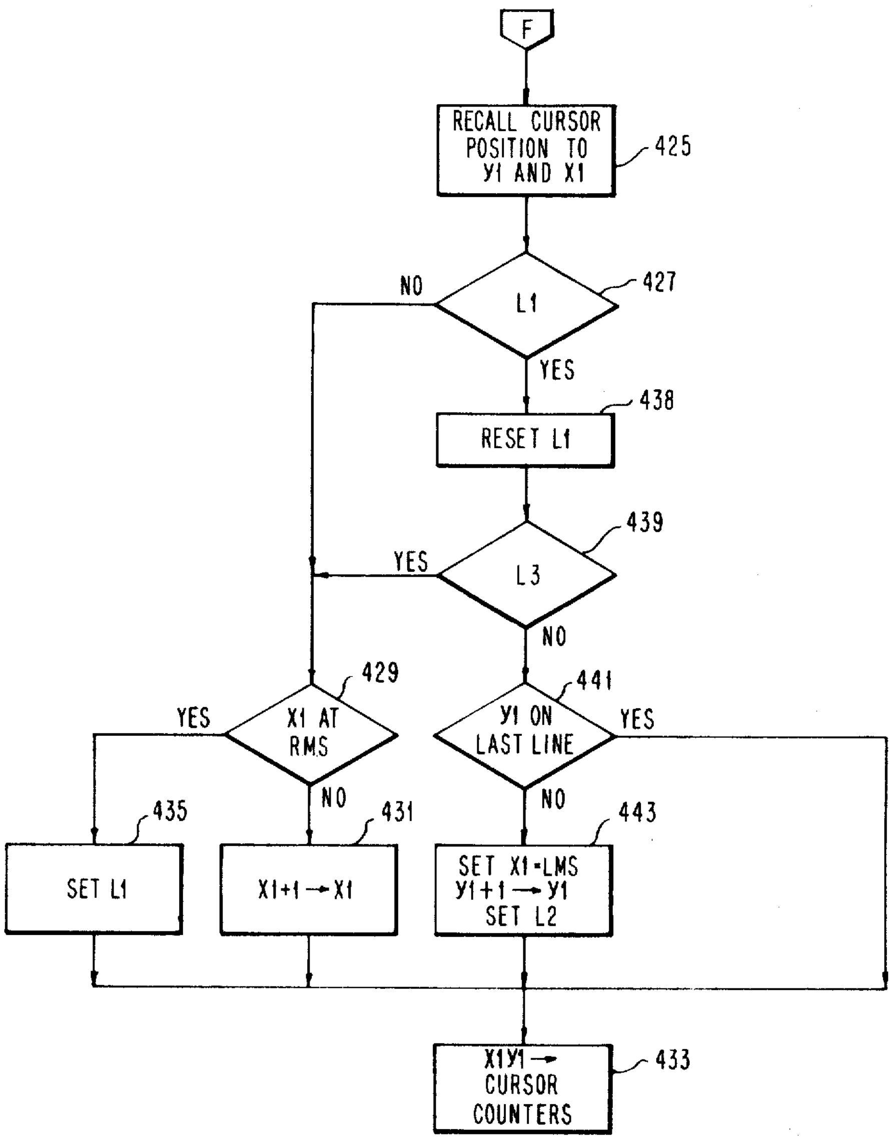

FIG. 7 is a state diagram of the sequence of system operations effected during a cursor advance operation.

Figure 8:
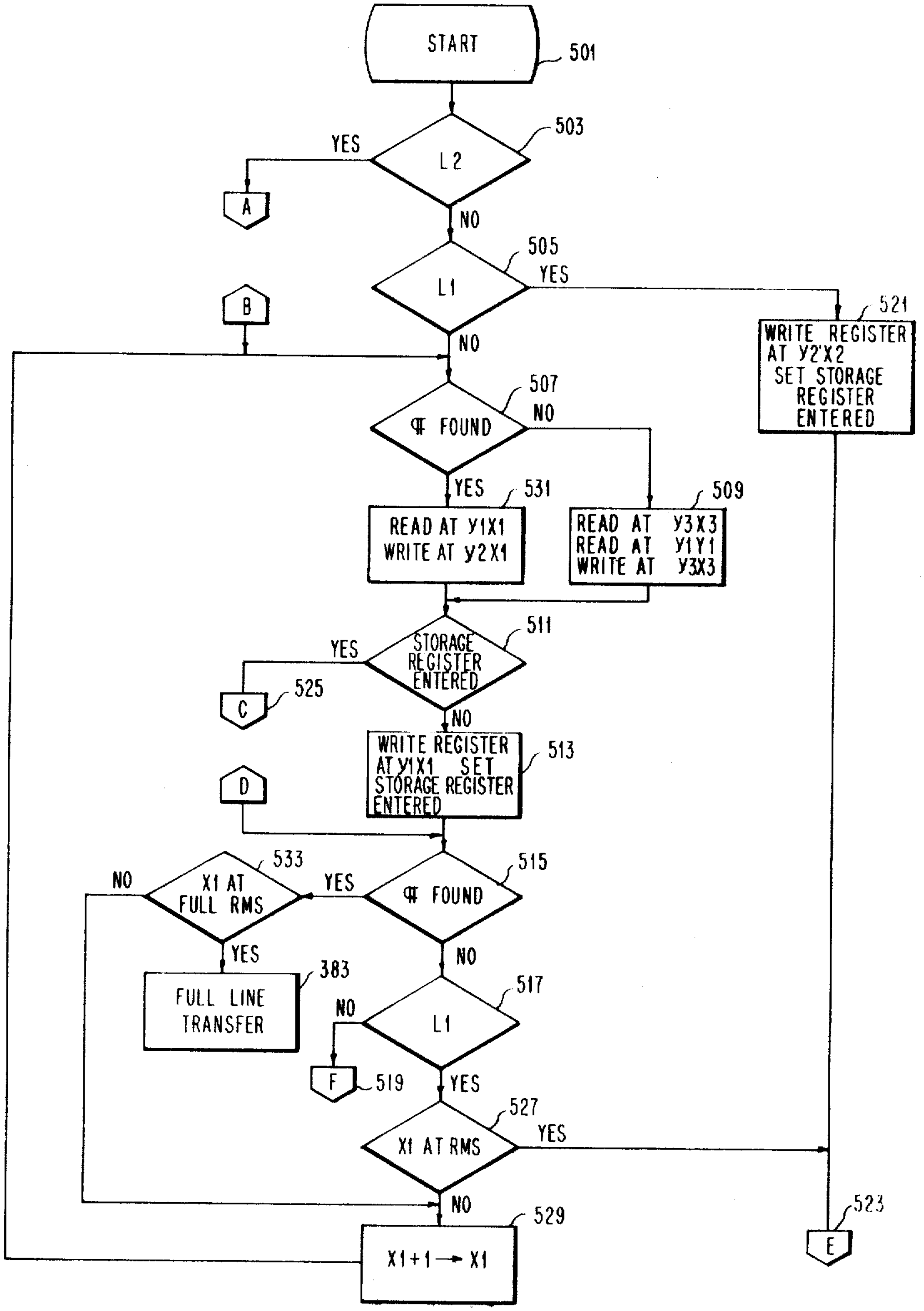

FIG. 8 is a state diagram of the sequence of system operations effected during a replace mode of operation.

Figure 9:
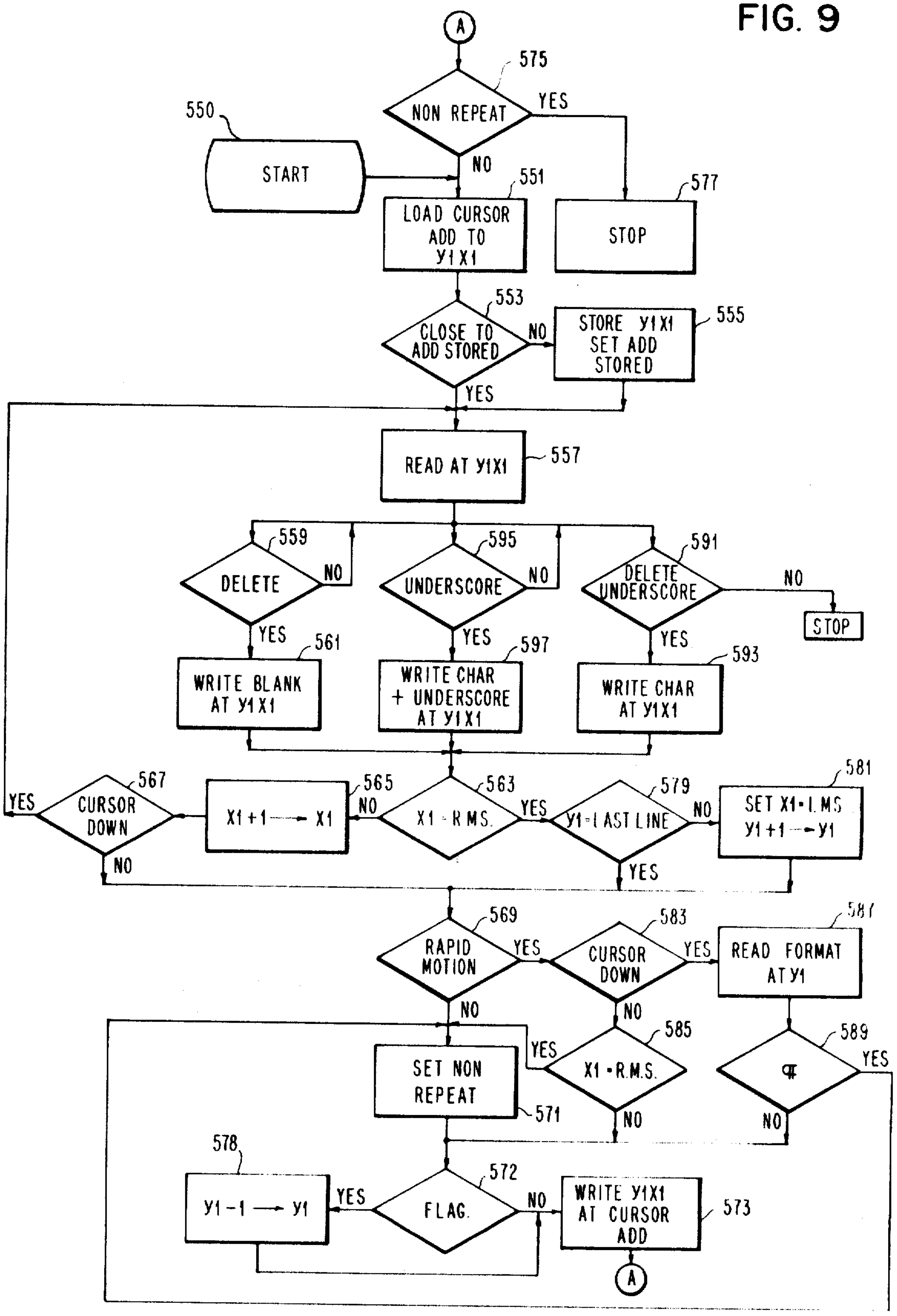

FIG. 9 is a state diagram of the sequence of system operations effected during a delete mode or underscore operation.

Figure 10A:
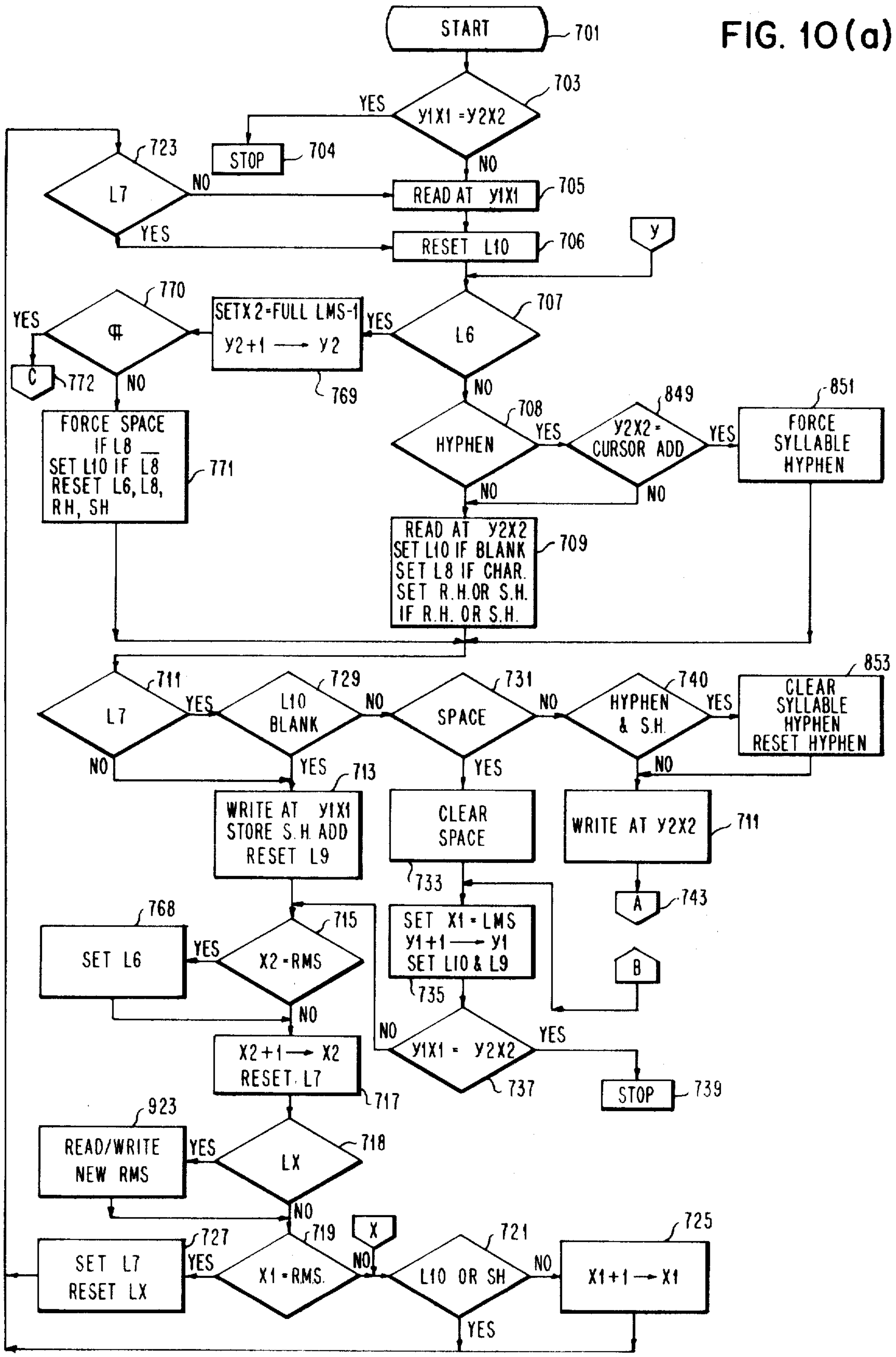
Figure 10B:
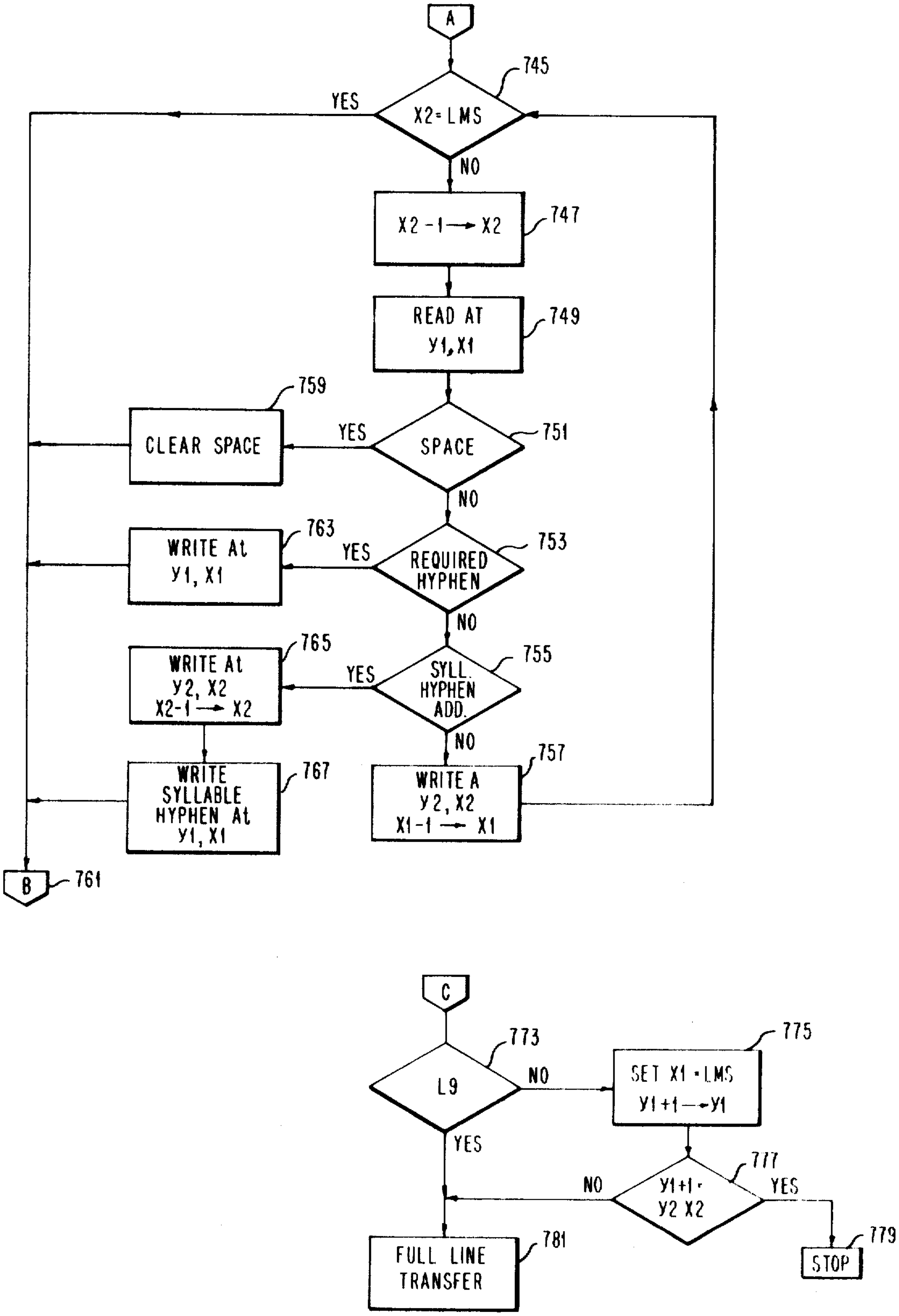

FIGS. 10(*a*) and 10(*b*) are state diagrams of the sequence of system operations effected during a closure mode of operation.

Figure 11:
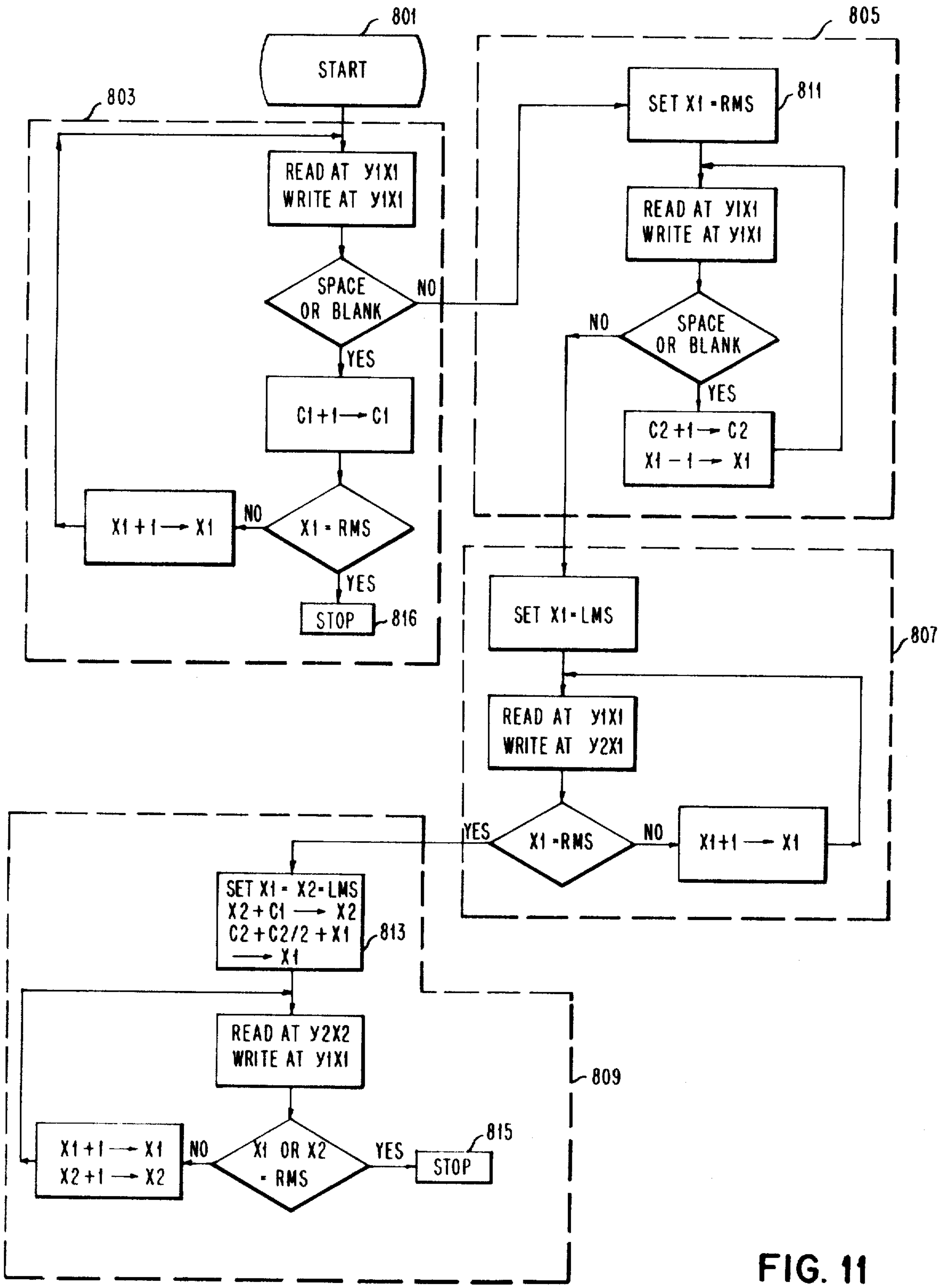

FIG. 11 is a state diagram of the sequence of system operations effected during a text centering operation.

Figure 12:
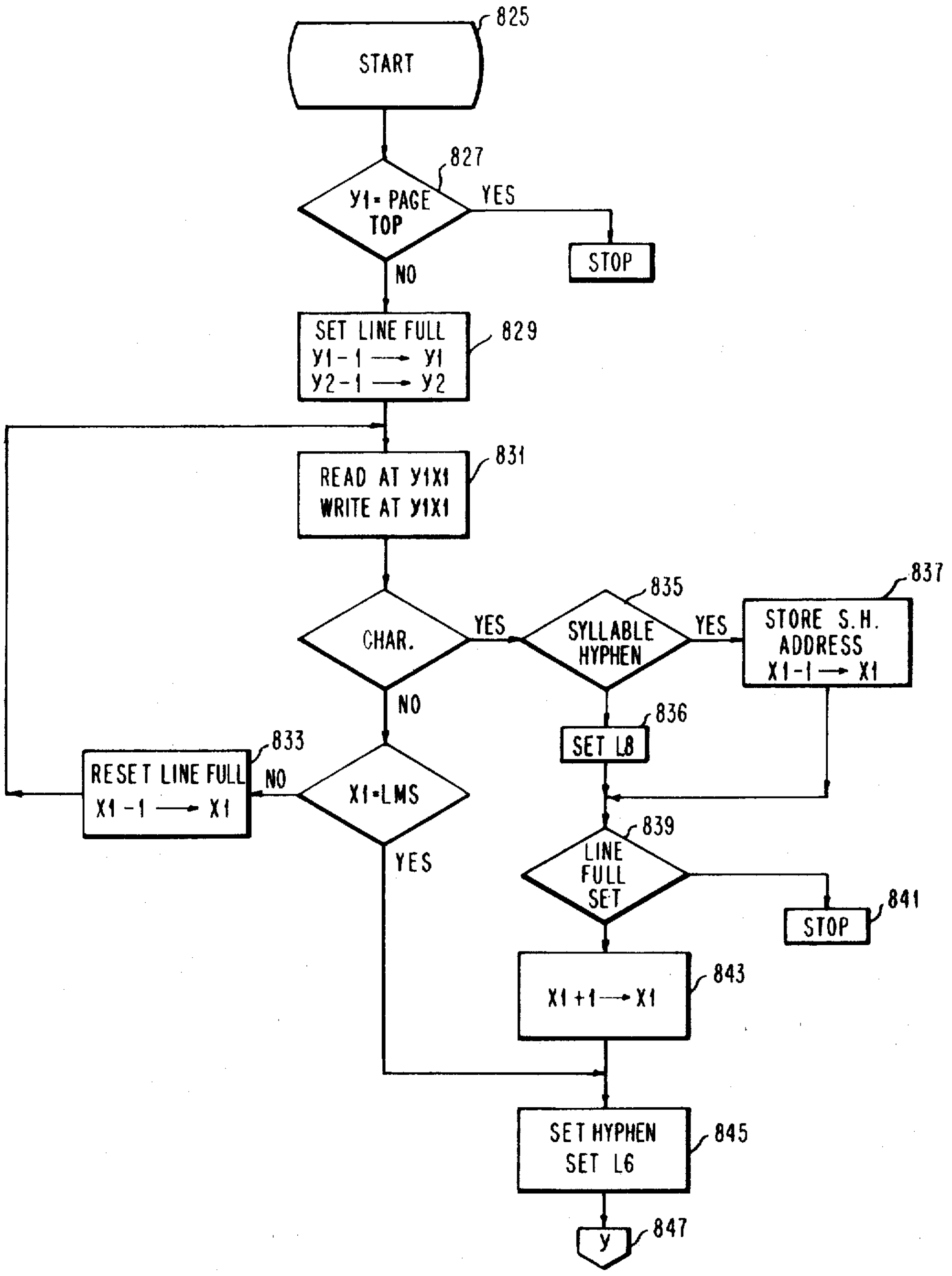

FIG. 12 is a state diagram of the sequence of system operations effected during a hyphenation operation.

Figure 13A:
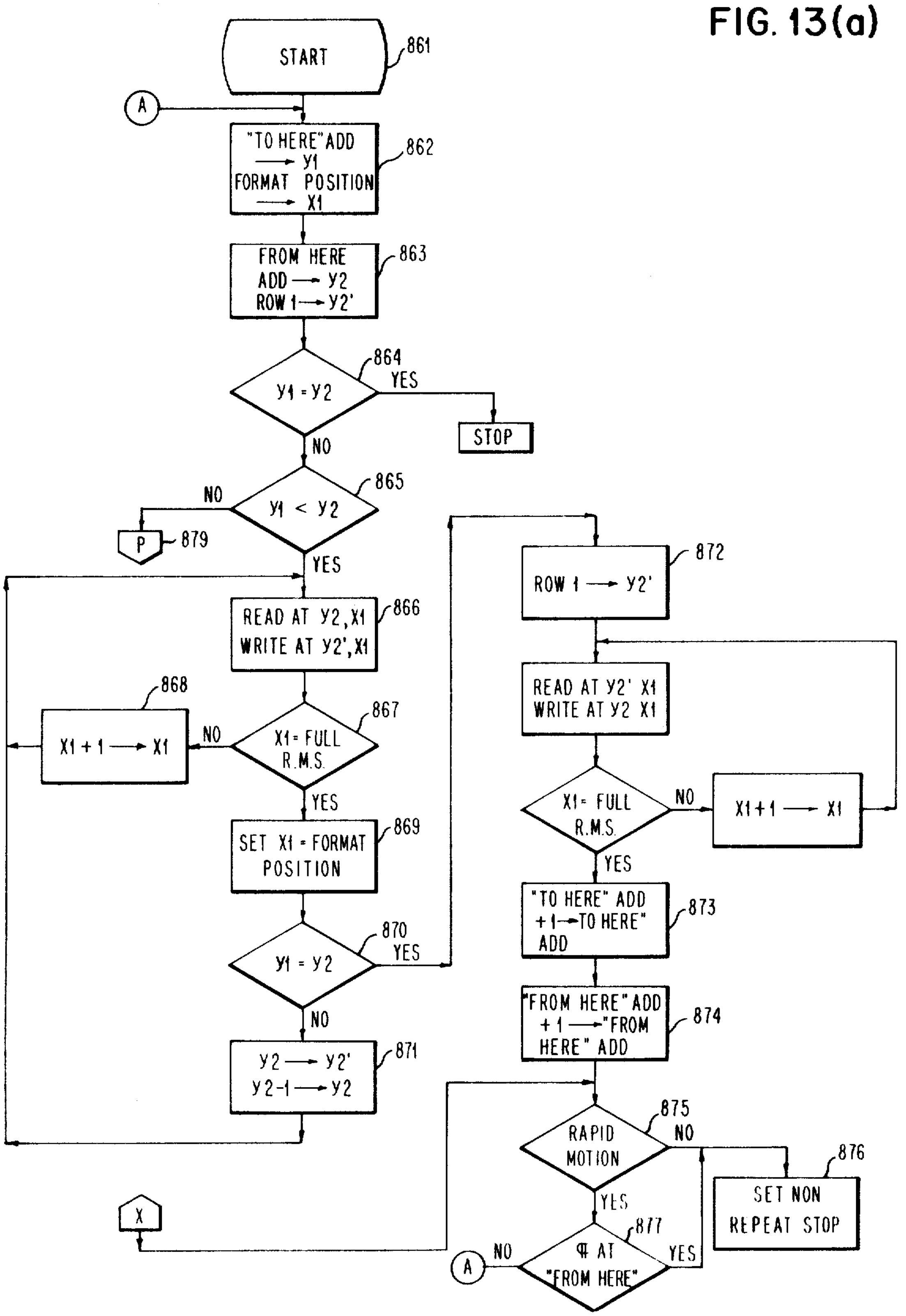
Figure 13B:
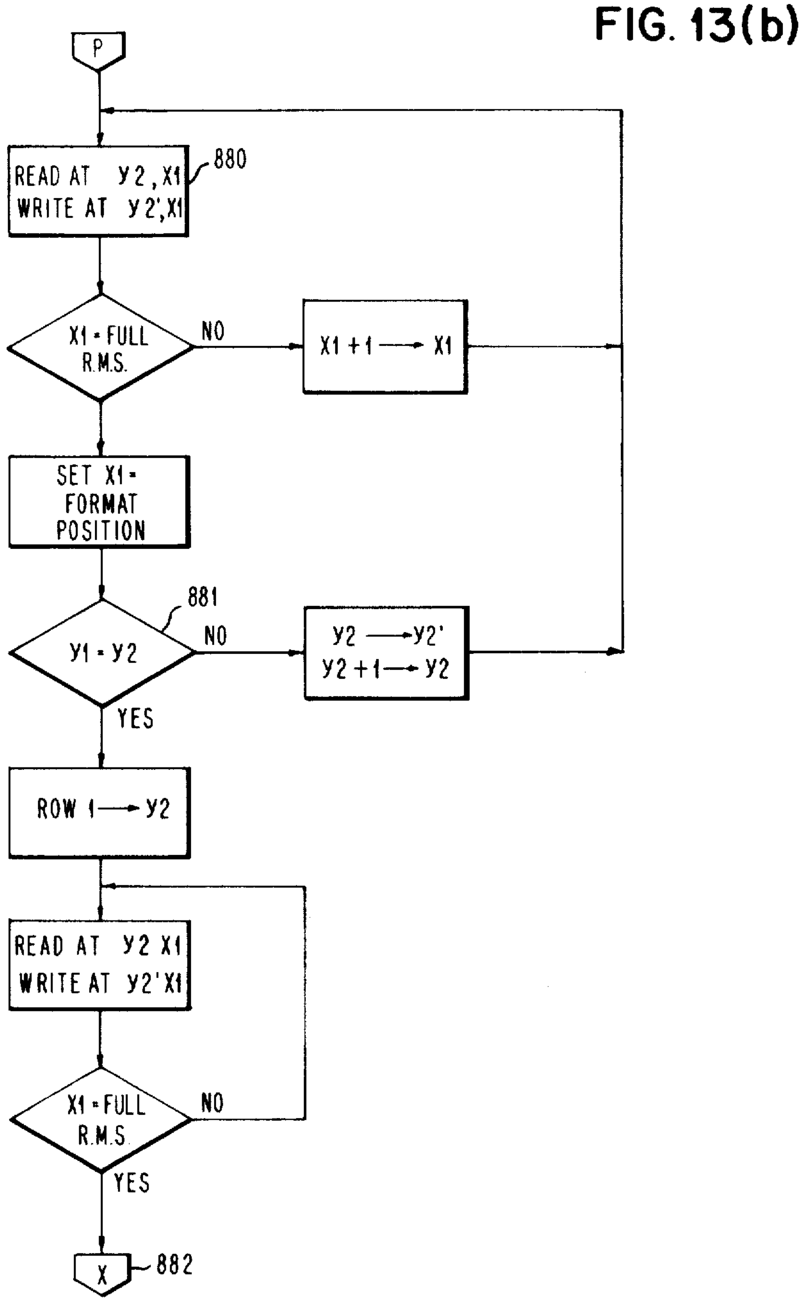

FIGS. 13(*a*) and 13(*b*) are state diagrams of the sequence of system operations effected during a line transfer operation.

Figure 14:
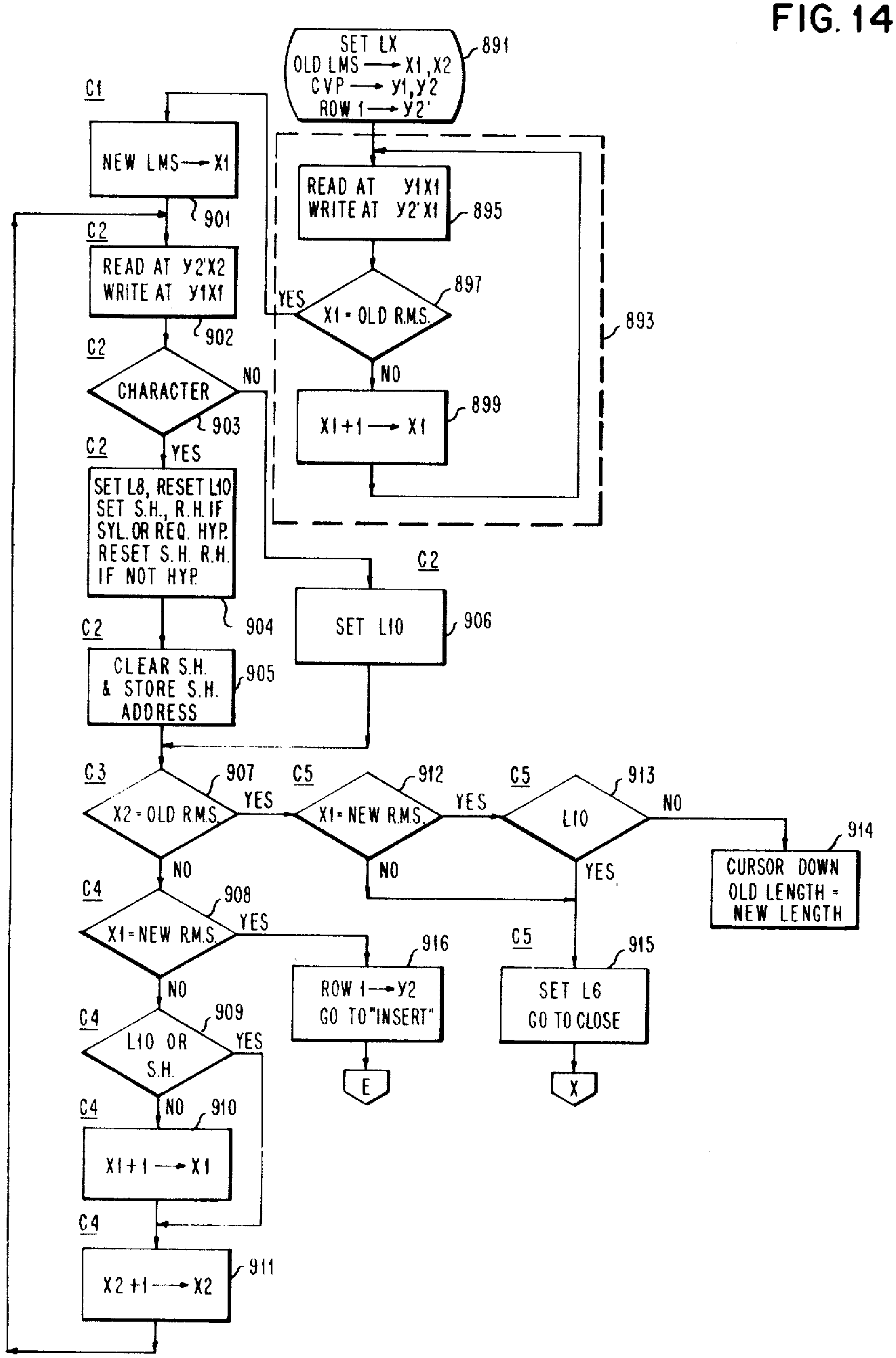

FIG. 14 is a state diagram of the sequence of system operations effected during a margin adjust operation.

Figure 15A:
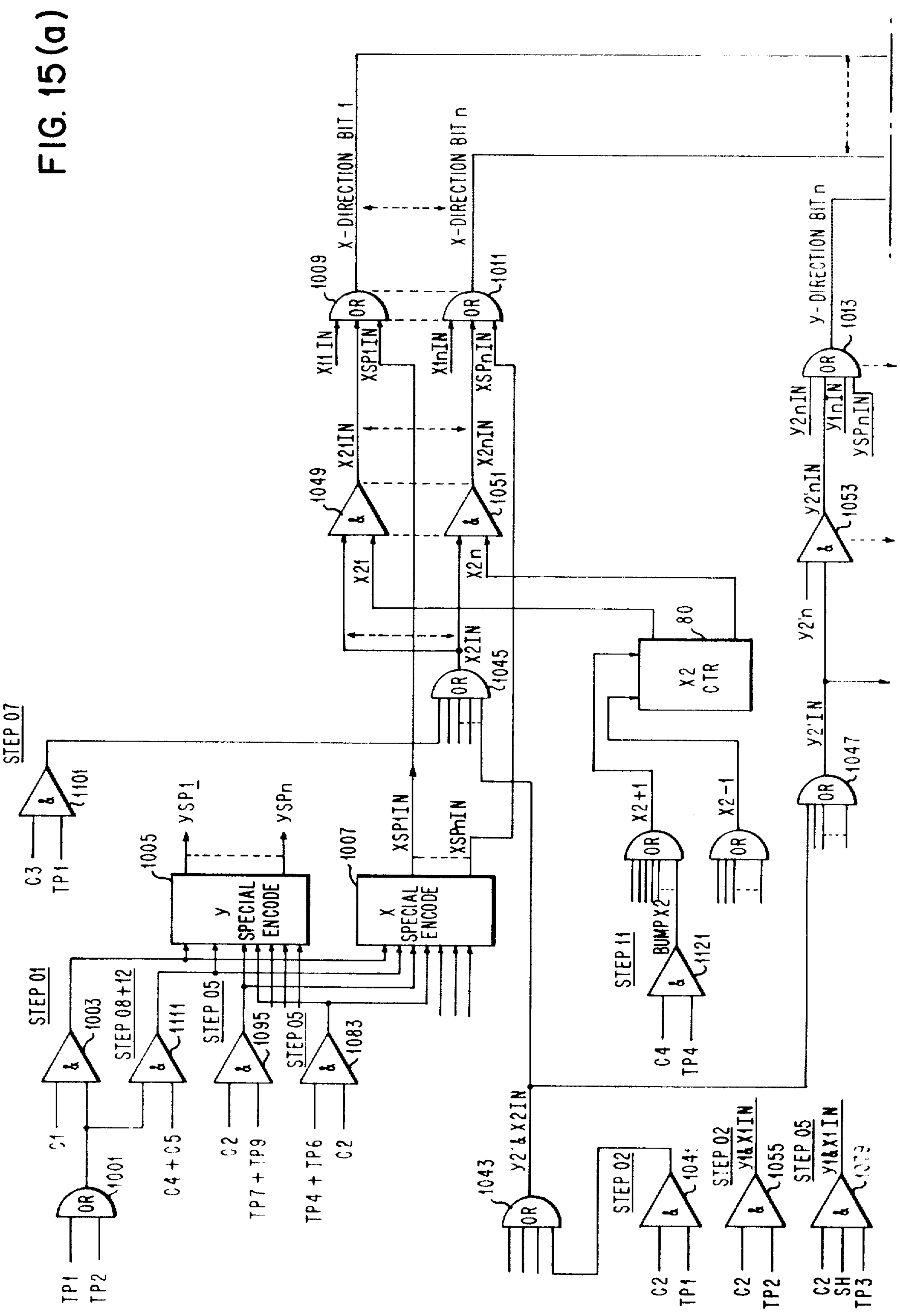
Figure 15:
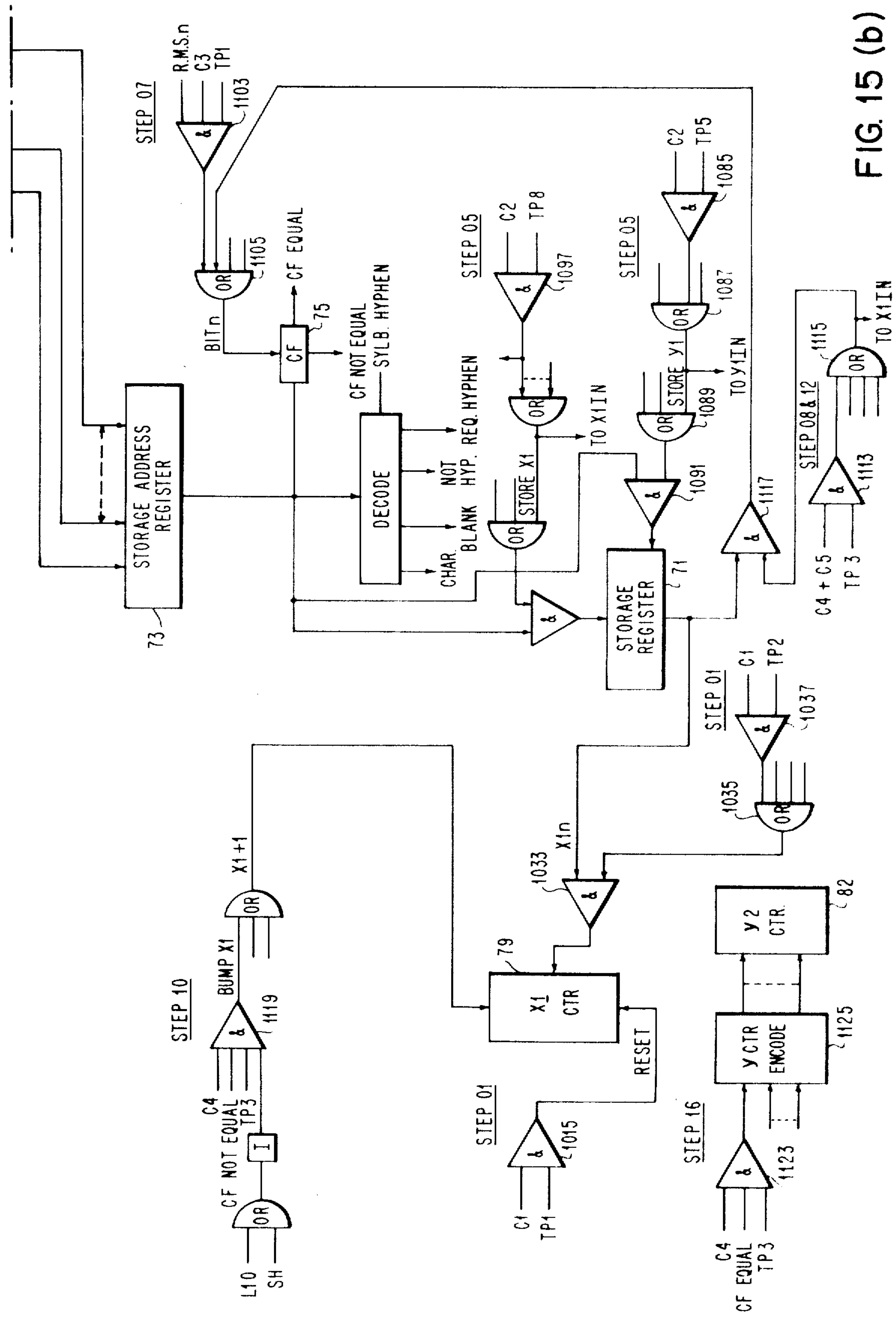
Figure 15:
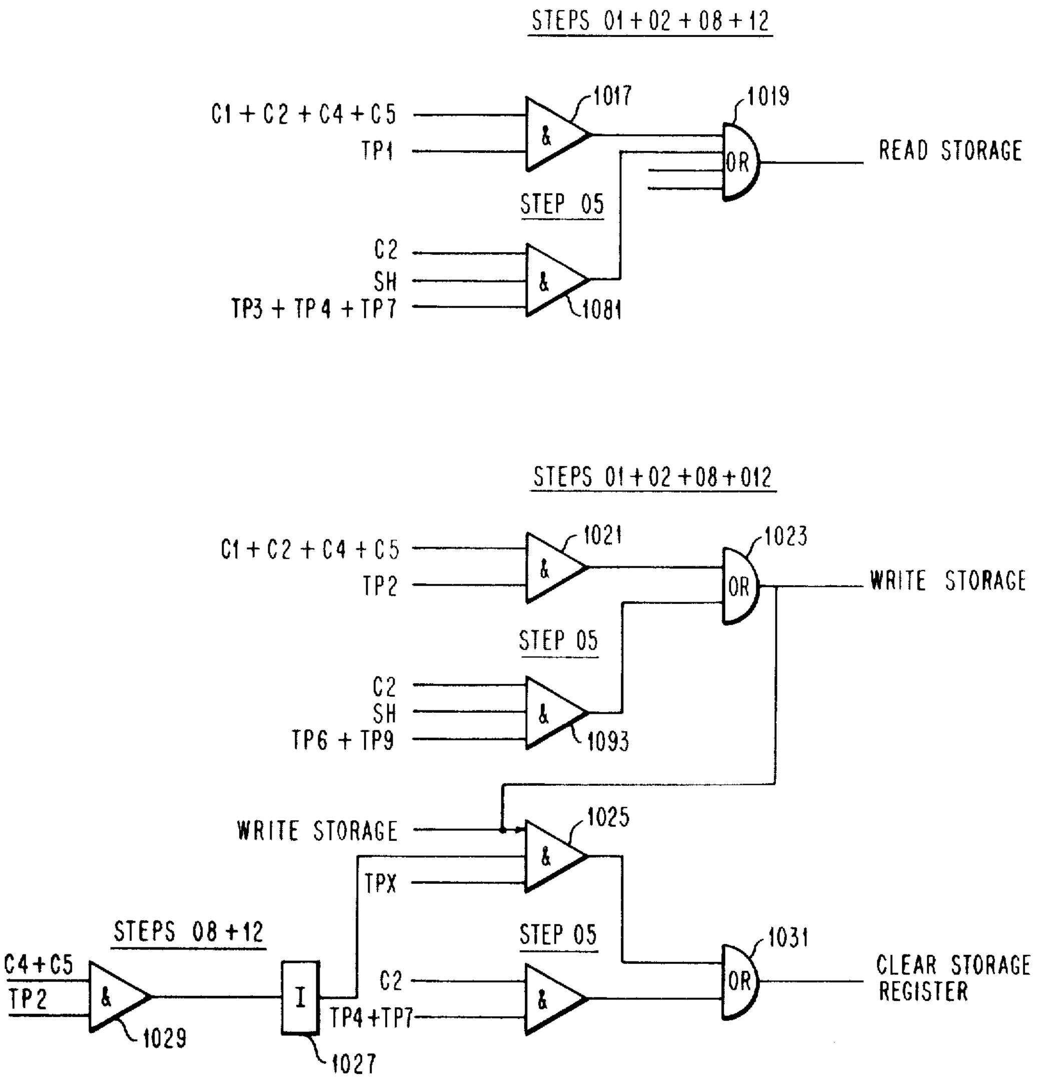
Figure 15D:
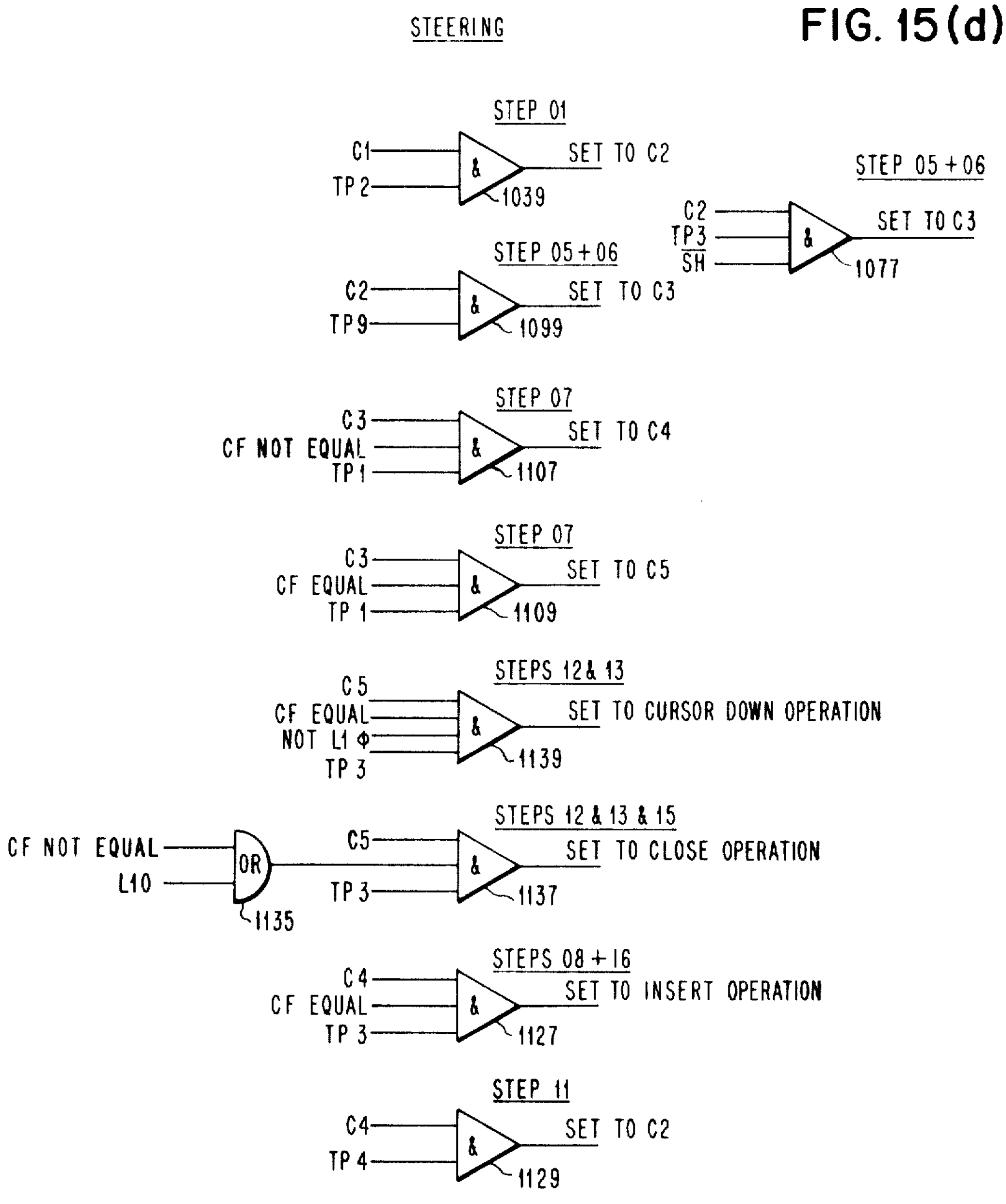
Figure 15E:
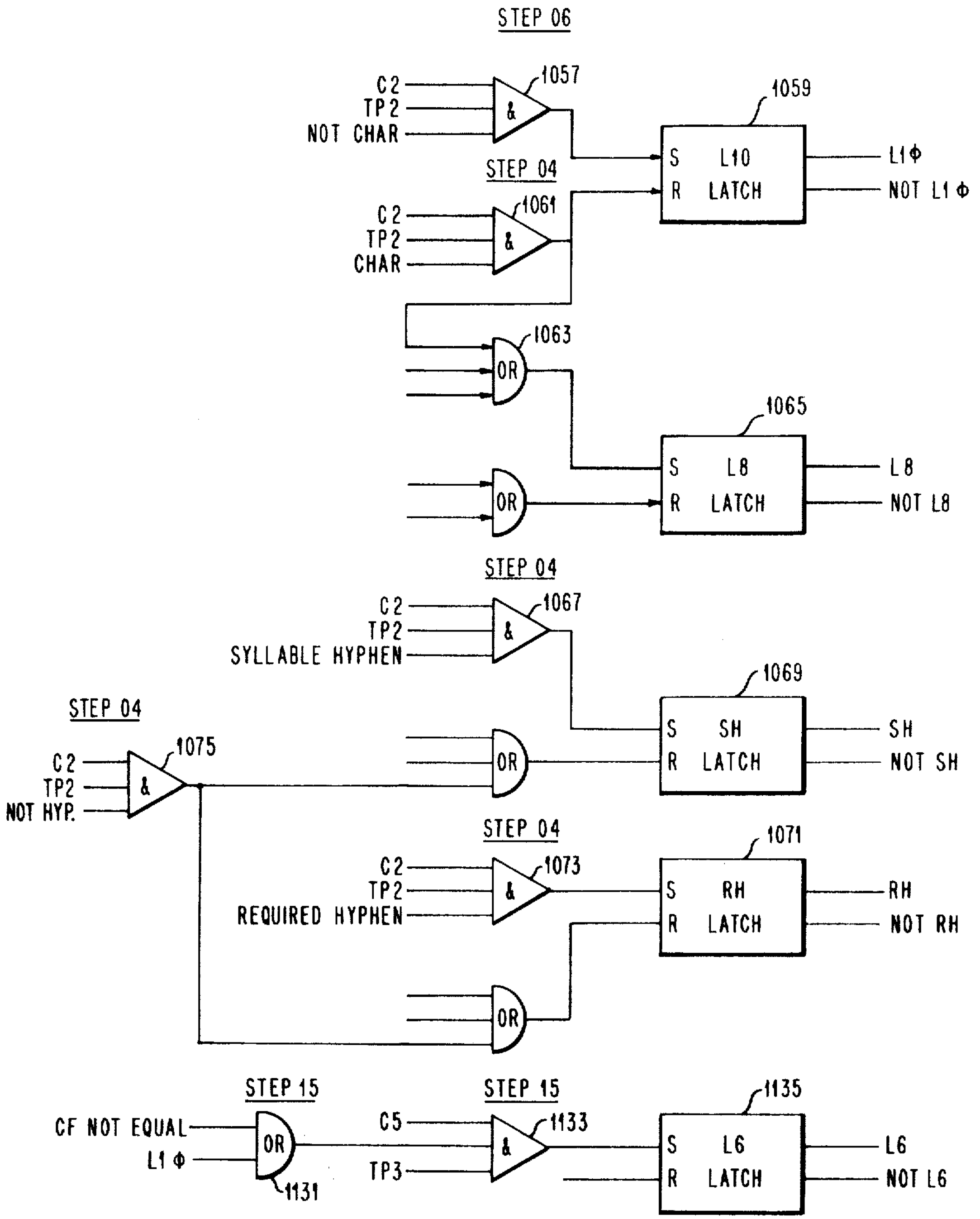

FIGS. 15(*a*), 15(*b*), 15(*c*), 15(*d*) and 15(*e*) are schematic block diagrams of the control logic utilized for the margin adjust operation of FIG. 14.

Figure 16:
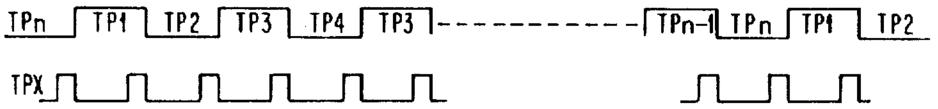

FIG. 16 is a timing pulse diagram of timing pulses applied to the block diagram of FIG. 15.

Figure 17:
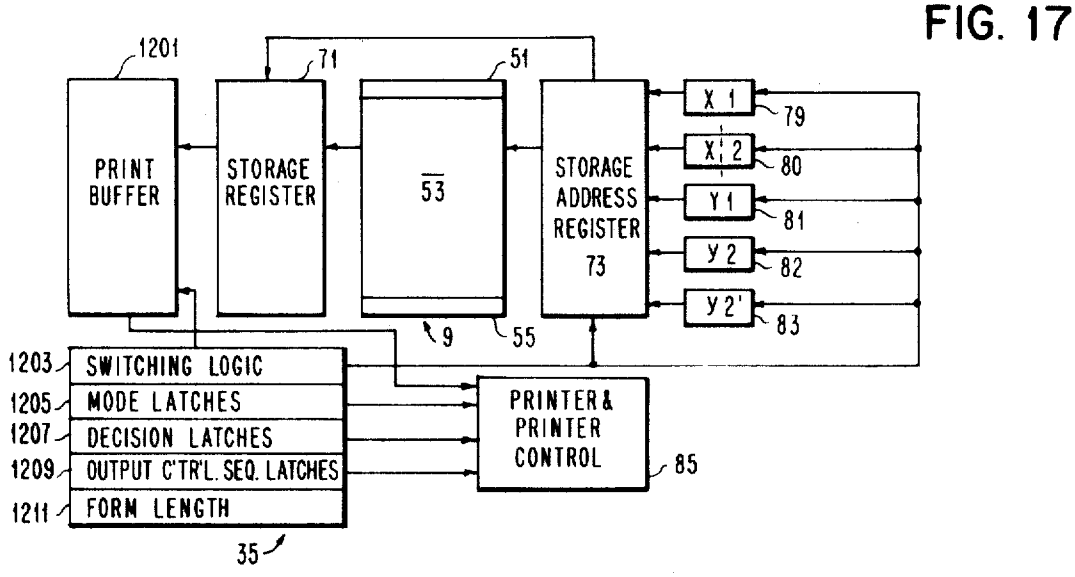

FIG. 17 is a schematic block diagram of the output control logic of the data composing, editing and formatting system of the present invention.

Figure 18:
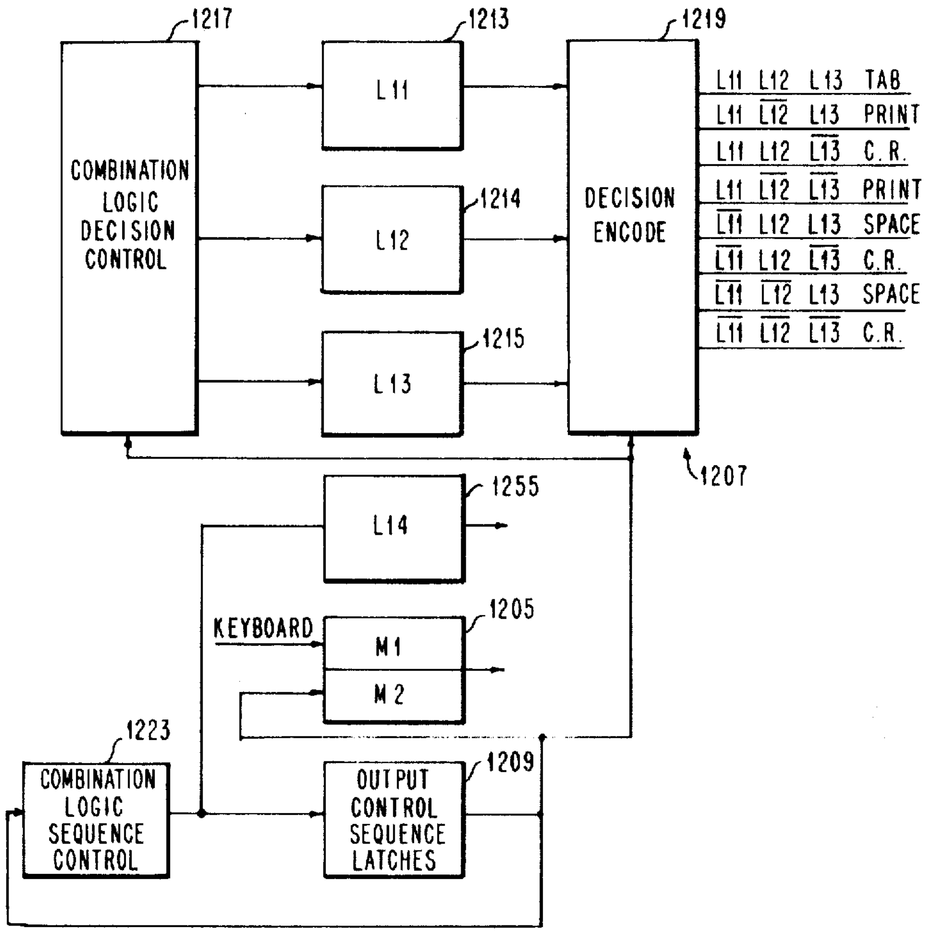

FIG. 18 is a detailed schematic block diagram of the output control logic of FIG. 17.

Figure 19:
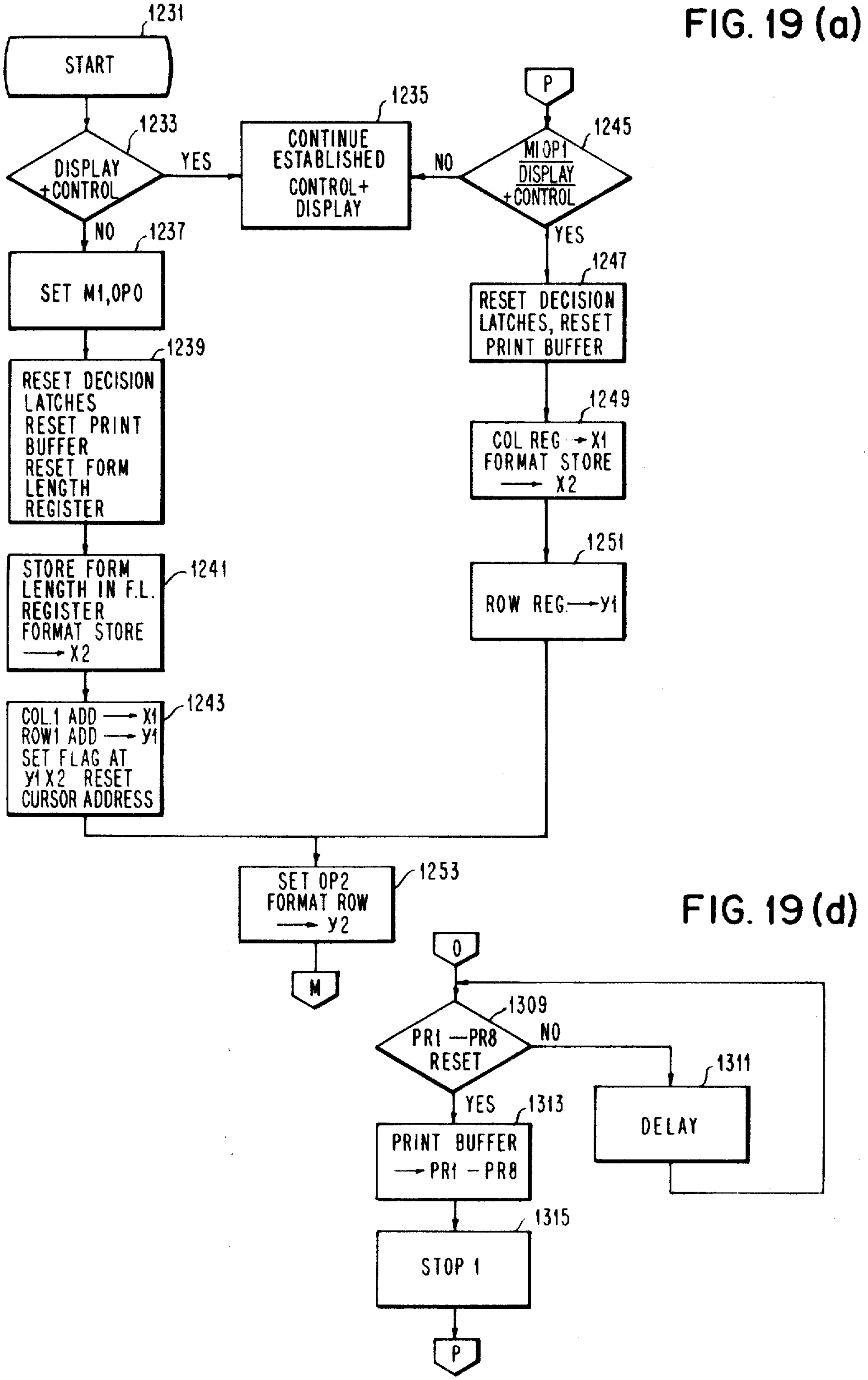
Figure 19:
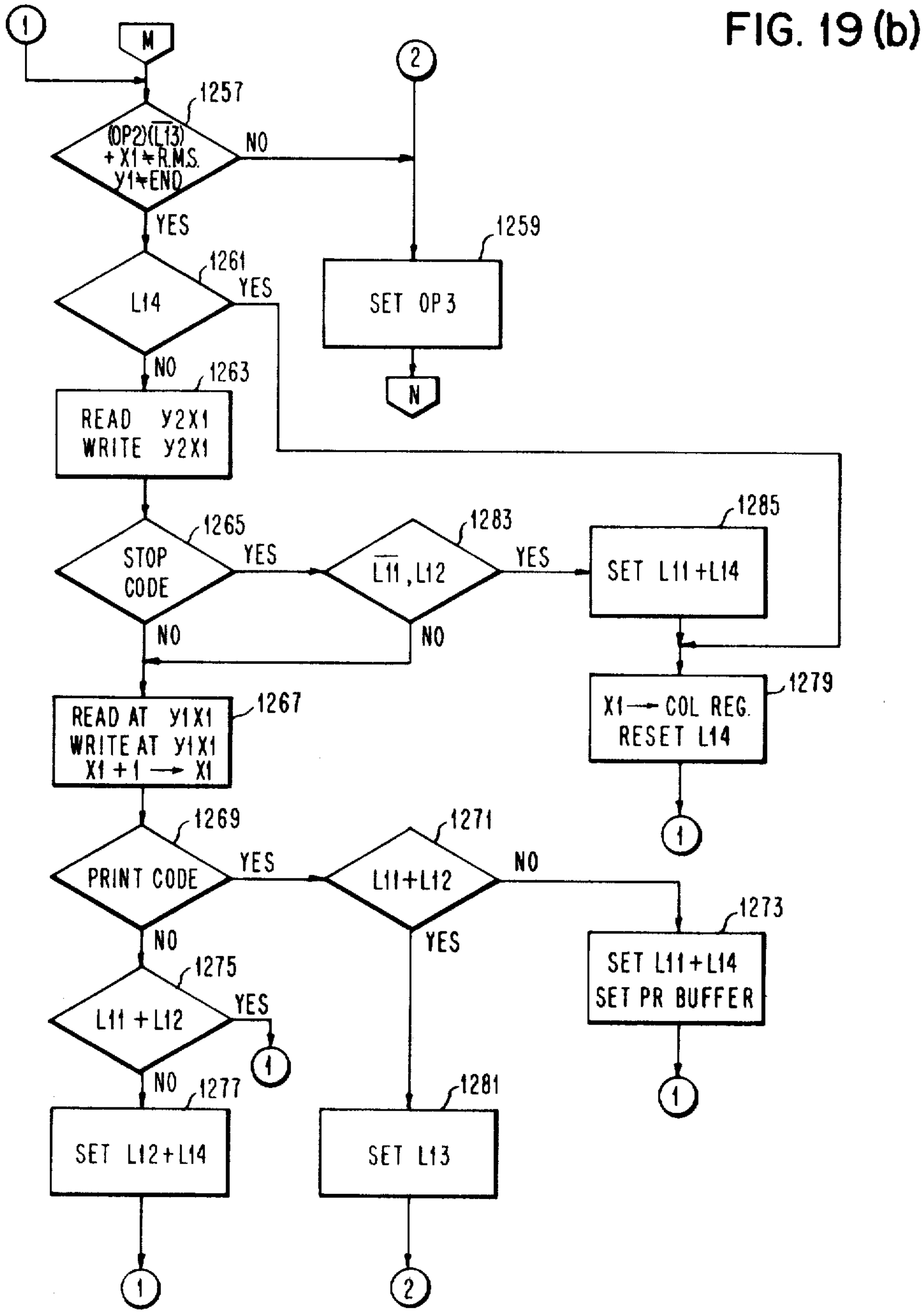
Figure 19C:
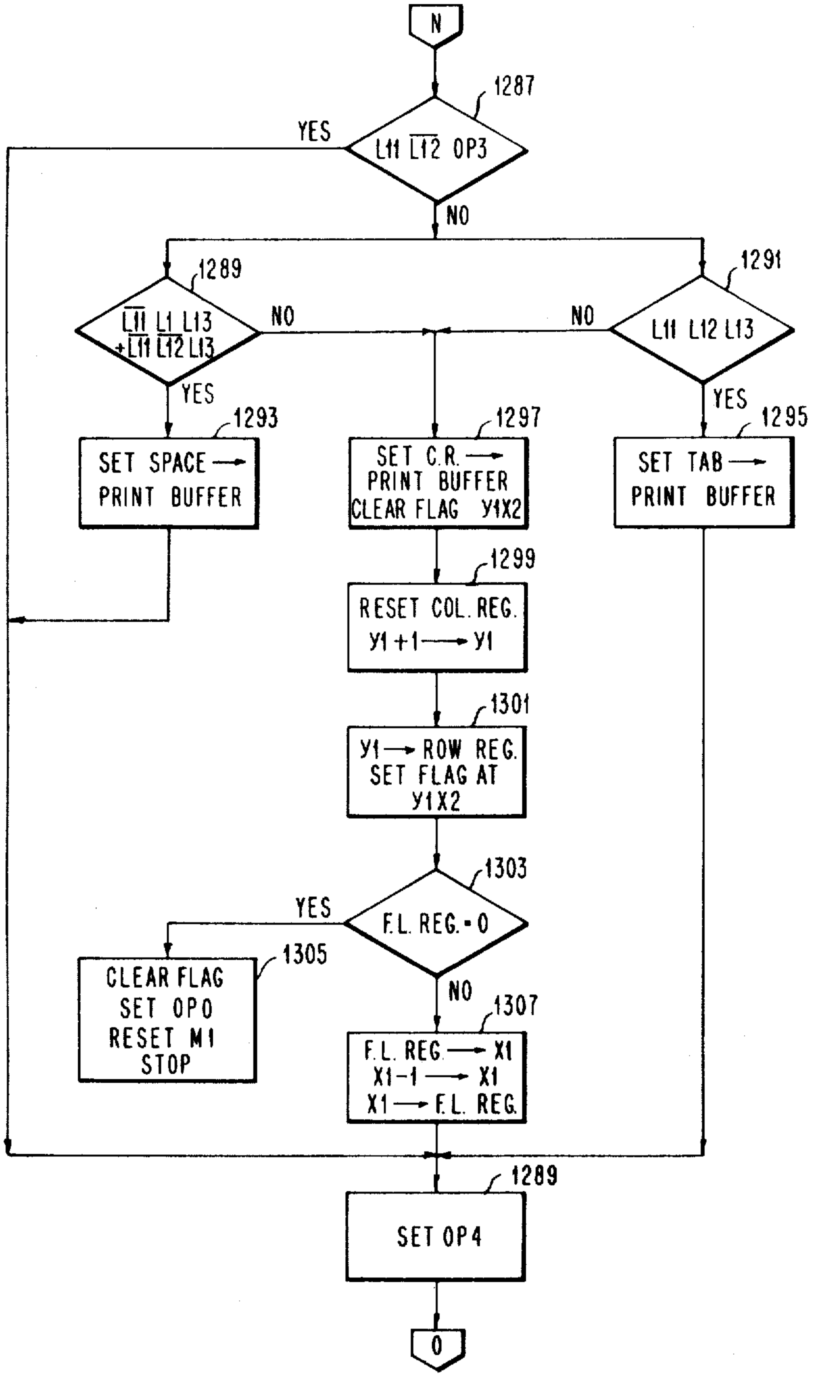

FIGS. 19(*a*), 19(*b*), 19(*c*) and 19(*d*) are state diagrams of the sequence of system operations effected during a data output operation.

Figure 20:
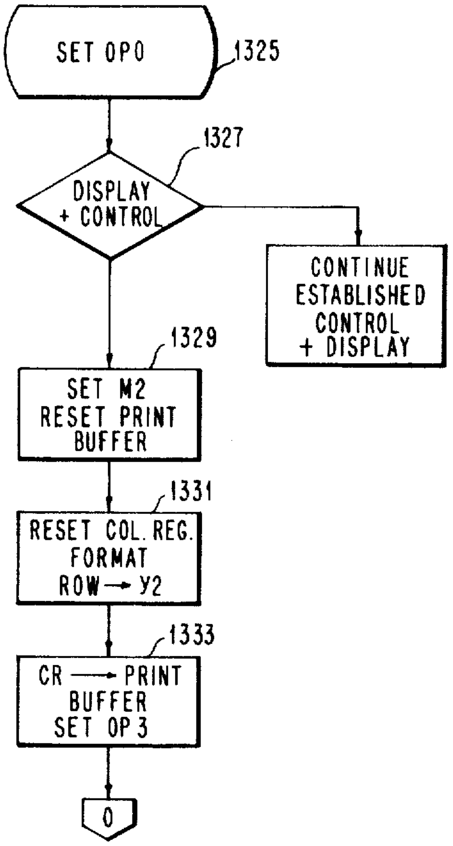
Figure 20B:
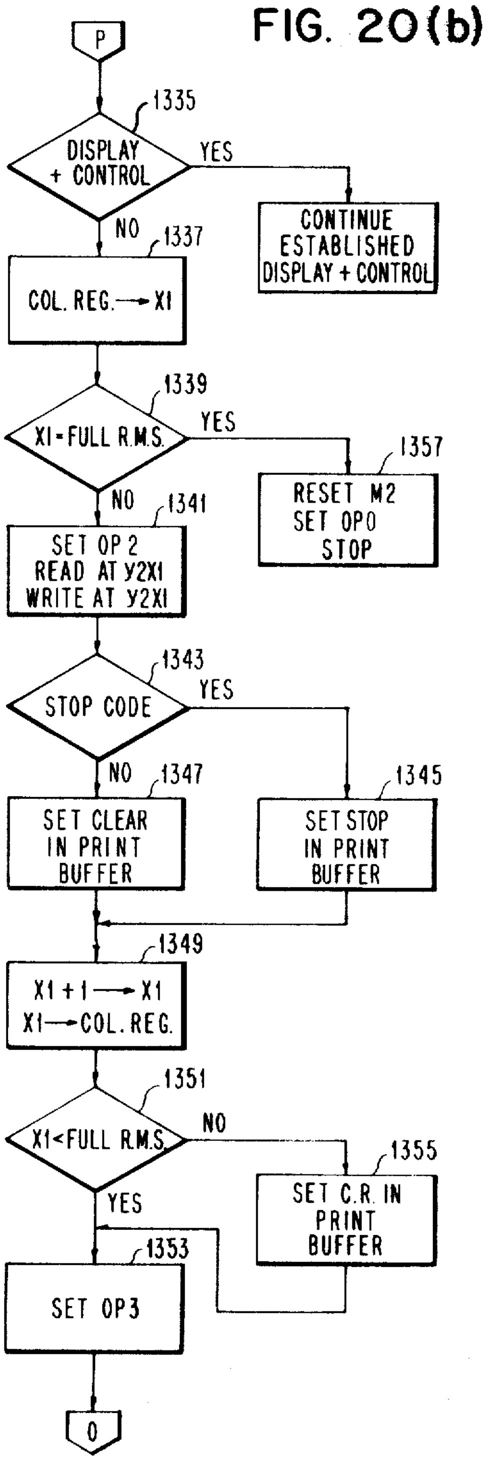

FIGS. 20(*a*) and 20(*b*) are state diagrams of the sequence of system operations effected during a printer format set up operation.

Figure 1:
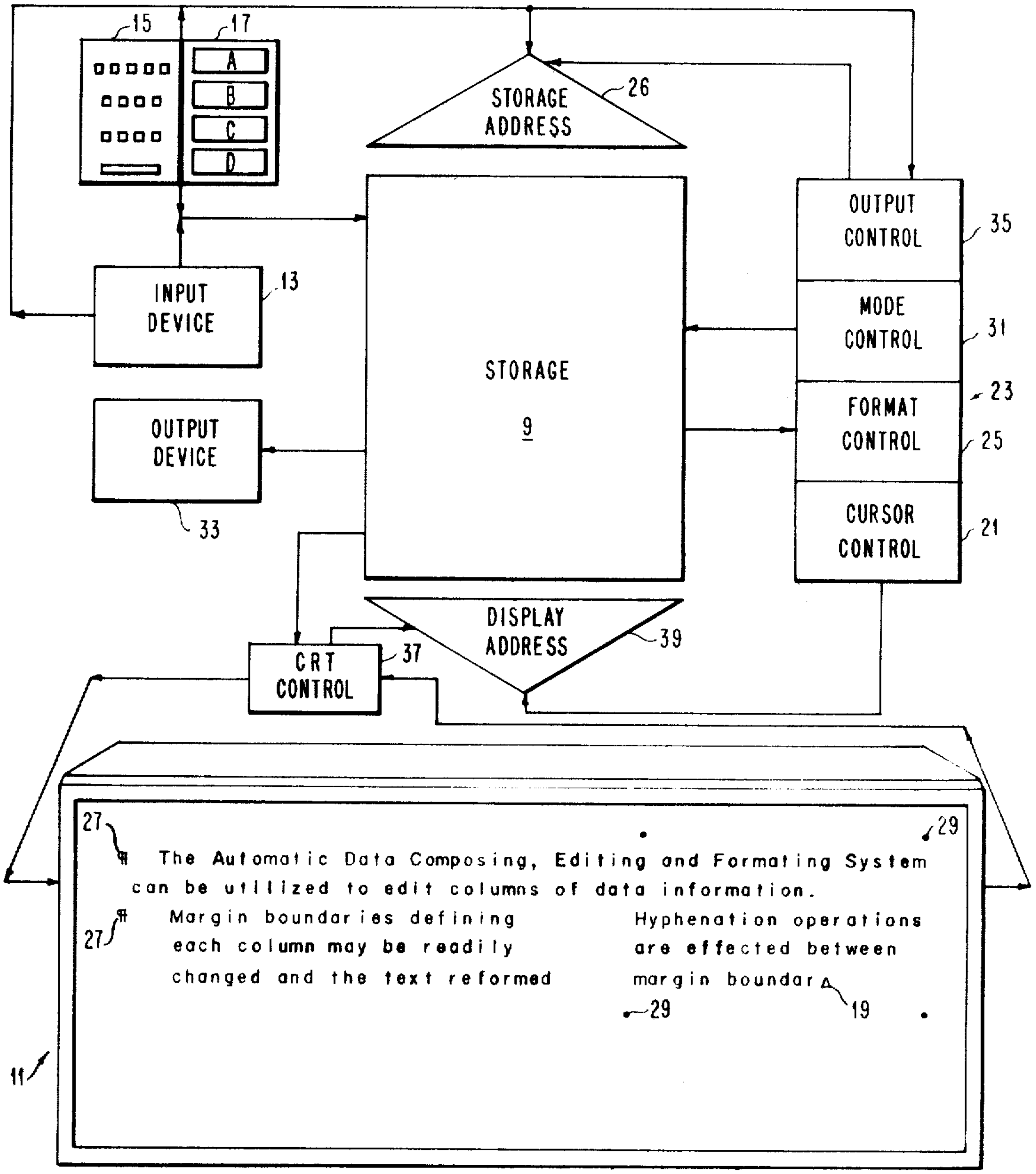
FIG. 1 is a schematic block diagram of the automatic data composing, editing, and formatting system of the present invention.
Figures 21, 22:
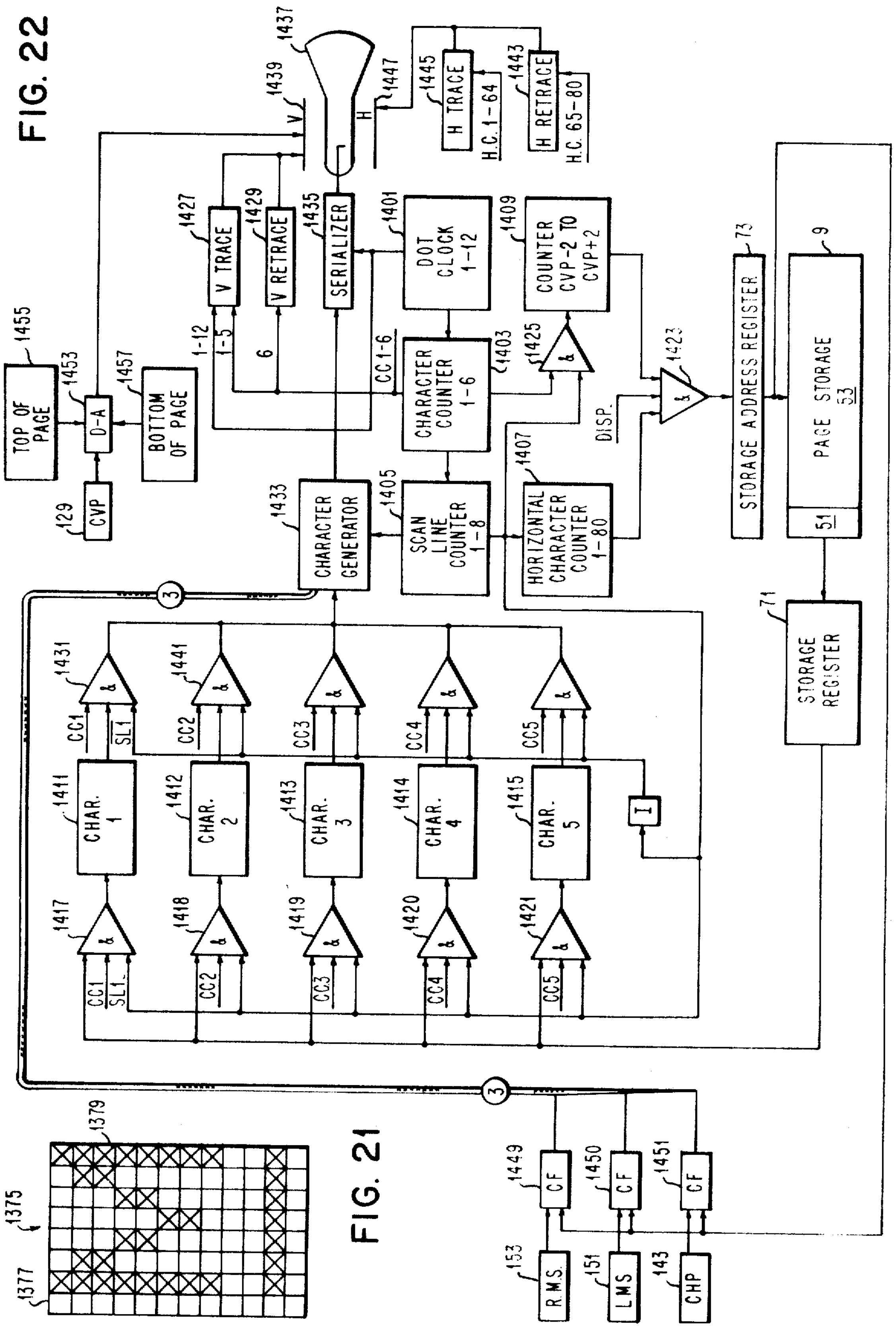

FIG. 21 is a representation of a data character as it is displayed on the display device of FIG. 1.

FIG. 22 is a schematic block diagram of the display device of the present invention.

TABLE OF CONTENTS

| | Column |
|---|---|
| General Description | 5 |
| A. Cursor Control | 5 |
| B. Format Control | 6 |
| C. Text Content Control | 6 |
| D. Text Modification Control | 6 |
| E. Input/Output Control | 7 |
| Detailed Description | 8 |
| A. General Data Flow | 8 |
| B. Cursor Control | 10 |
| C. Format Control | 14 |
| D. Text Content Control | 17 |
| 1. Insert Mode | 18 |
| 2. Replace Mode | 27 |
| 3. Delete Mode | 28 |
| 4. Closure Mode | 30 |
| E. Text Modification Control | 34 |
| 1. Underscore Control | 34 |
| 2. Center Control | 35 |
| 3. Hyphen Control | 35 |
| 4. Transfer Line Control | 38 |

5. Margin Adjust Control.................. 39
6. Logic Implementation of Margin Ajust Control.............................. 42
F. Input/Output Control........................ 49
G. Display Control................................ 53

GENERAL DESCRIPTION

Referring now to the drawings and more particularly, to FIG. 1 thereof, a block diagram of the automatic data composing, editing, and formatting system of the present invention is shown. This device includes an electronic storage unit 9 for electronically storing information to be edited and formatted. The information thus stored is visually displayed to the machine operator by a cathode-ray tube (CRT) display 11 which displays the information as it would appear on a printed page. That is, up to a page of information can be displayed as a plurality of successive lines of information, the width of each line depending upon the margins desired by the operator. Text information is inputted into the electronic storage unit 9 either by an input device 13 or by the data keyboard 15. The input device 13 may be a paper tape reader, a magnetic media reading device, or any other secondary media reading device. An example of a magnetic card reading device which could be utilized as an input device is described in the aforereferenced copending application of Robert A. Kolpek. The input text data typically is in the form of coded items which represent characters, spaces, and typographical operations, a sequence of which forms words, sentences, and paragraphs.

Figure 2:
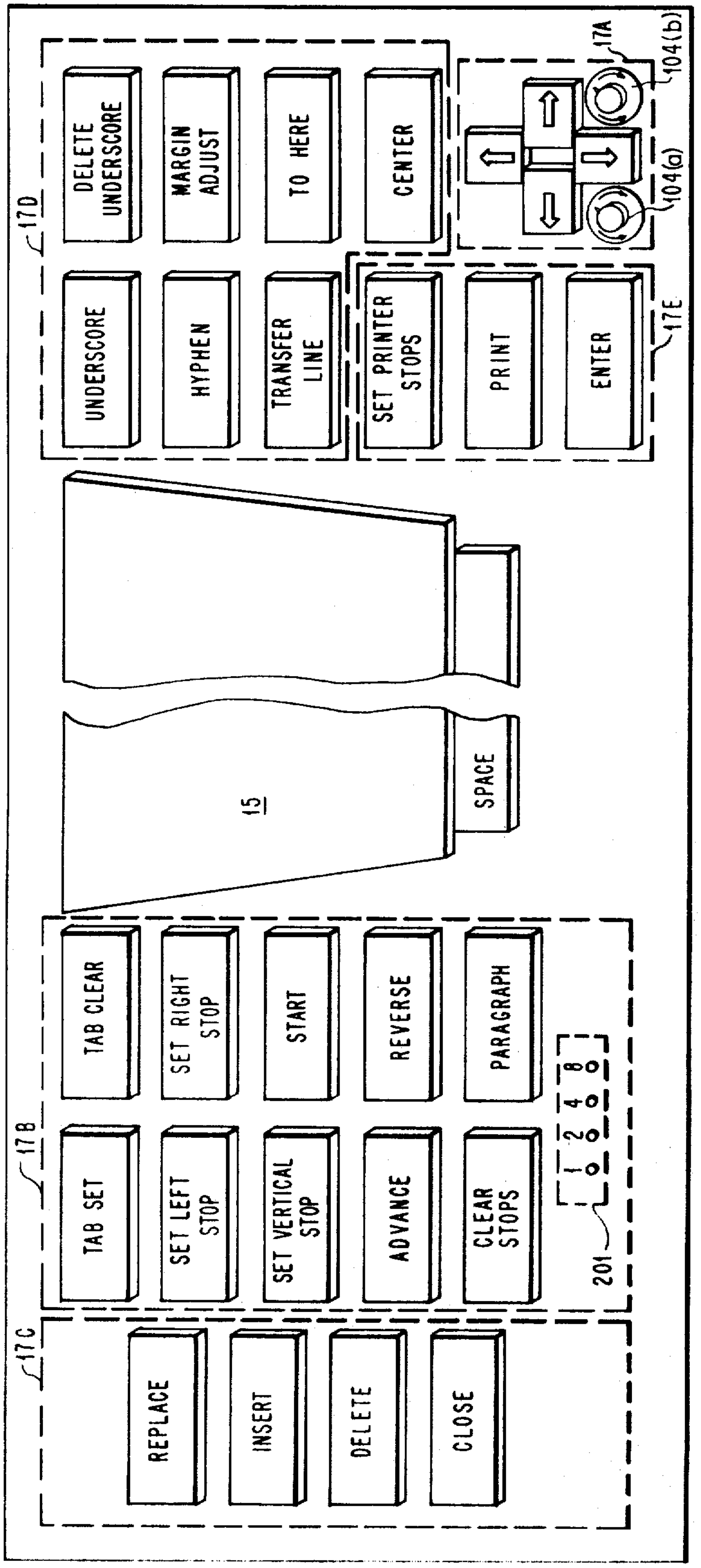
FIG. 2 is a diagrammatic view of the control and data keyboards of the system of FIG. 1.

A function keyboard 17 is utilized by the operator to control the operation of the data composing, editing, and formatting device. Five major operations of the device can thus be controlled: cursor control, format control, text content control, text modification control, and input/output control. Referring briefly now to FIG. 2 of the drawings, a diagrammatic view of the data keyboard 15 and a detailed diagram of the function keyboard 17 is depicted. The data keyboard 15 is similar to a standard typewriter keyboard. The function keyboard 17 consists of five major functional groups of keys 17A to 17E corresponding to the five major operations. The keys within block 17A are utilized by the operator for cursor control, those within block 17B for format control, those within block 17C for text content control, those within block 17D for text modification control and those within block 17E for input/output control. In the description which follows, a general summary of the operations effected by the various function keys will be grouped according to the major operation which they correspond to. Reference will be made in general to the function keyboard 17 of FIG. 1, it being understood that reference to a particular key of the function keyboard refers the reader to FIG. 2.

A. Cursor Control

Referring once again to FIG. 1, cursor control refers to the placement of a visual identification means with respect to text information displayed on the CRT display 11. In the description which follows, a cursor 19, which is an electronically illuminated spot appearing on the CRT display will be described as the visual identification means. The cursor specifies the point of action for most operations visually to the operator and electronically to the electronic storage unit 9 and its controls. For example, it specifies where the next character keyed on the data keyboard 15 will be placed with respect to other characters when in a character replace or insert mode of operation.

Manipulation of an appropriate key on the function keyboard 17A activates the control unit 21 which causes the cursor mark 19 to move left or right, up or down, one character at a time or in a multiple character scan in accordance with the degree of depression of the selected key. An additional control located on the cursor keyboard 17A enables the operator to control the scanning speed rate of the cursor to conform to the operator's mental and visual scanning rate. The location of the cursor 19 at a coordinate position on the CRT display 11 is defined by the cursor control logic 21 which forms a part of the control unit 23. The cursor control logic also defines the coordinate position in the storage unit 9 which contains the text information located adjacent to the cursor 19 on the CRT display 11 to the storage address unit 26.

B. Format control

Format control effected by the function keyboard 17 enables the operator to specify the format which the text information will conform to. Format control implies those operations that define the beginning and ending of lines (margins), tabulation stops, the vertical selection of a starting line, and control of paragraphs. The purpose of these controls is to organize the text for appearance and readability and to control the format operation of the output printing device. The format control unit 25 is responsive to the function keyboard 17B to insure that the text data in the storage unit 9 conforms to the prescribed format.

The format control unit 25 also controls the display of paragraph marks 27 and display marks 29 on the CRT display 11. The paragraph marks indicate the start of a new paragraph and the display marks indicate the location of the margin stops of the line of text information addressed by the cursor.

C. Text Content Control

Text content control refers to those operations which cause the content of the text information located in the storage unit 9 to be changed. It has been described how text information may be entered into the storage unit from the input device 13 or the data keyboard 15. The text content control keys of the function keyboard 17C control which of the four modes of operation, insert mode, replace mode, delete mode, or close mode, will be effected during entry of keyed input text data.

When in insert mode, coded text characters which are keyed are sequentially entered and stored at the storage locations defined by the cursor locations without any resulting loss of previously stored information. The previously stored information automatically shifts to the right and down page. After each operation is completed, the number of words appearing on each line of the display are optimized and no word is split or truncated. Additionally, all paragraphs remain intact. When operating in the replace mode, keyed text data is sequentially stored starting at the initial cursor location. As when in insert mode, the cursor advances to the right and down page as information is keyed. When in delete mode, the character located at the cursor location is replaced with a blank. When in close mode, information located down page from a predetermined location can be closed to a second storage location located up page from the first storage location with all intermediate information being destroyed. The mode control unit 31 is responsive to the function keyboard 17C to control the internal manipulation of data in the storage unit 9 in accordance with the text control operation defined by the operator.

D. Text Modification Control

Text modification control describes those controls which are used after making text content corrections to modify text conformation and order. There are five such controls, each of which contributes to the effectiveness of display typing: underscore, center, hyphen, transfer line, and margin adjust.

The underscore control provides swift means of marking symbols that are to be printed with underscore symbols. The procedure requires placement of the cursor at the symbol to be underscored or at the left symbol of a word that is to be underscored. Next, the underscore control key on the function keyboard 17 is selected. Underscore is accomplished as the cursor is moved past one character or several characters of text under the control of the cursor control keys also located on the function keyboard 17D. By moving the cursor down page, complete lines may be underscored. The delete underscore key functions in a similar manner to remove underscores.

Center control moves a line of test so that it centers about the column central to the selected margin stops or the column immediately right of center of the selected margin stops. The procedure for effecting center control is first placing the cursor at the line which is to be centered and then selection of the center key on the function keyboard 17D. The procedure is repeated if a multiple number of lines are to be centered.

Hyphen control is used to conditionally hyphenate a word. The procedure is to place the cursor under the first symbol of the syllable that is to remain in the line it occupies. Upon selection of the hyphen key on the function keyboard 17D the first part of the split word is tested for fit into the void ending the previous line. The void is defined as the space existing between the last character and the right hand margin. A fit results in transfer of a space character, the first part of the split-off word and the writing of the special hyphen symbol following the split-off syllables into the void. No shifting occurs when the fragment word exceeds the line space remaining in the preceding line. A special symbol is used so that upon subsequent shifting operations causing the hyphenated word to move downward, the hyphen may be removed and the word rejoined. Text is automatically closed following hyphenation.

Transfer line control causes shifting of a selected line from one section of text to another, and the shifting of intervening text to accommodate the line transfer. The transfer procedure starts by marking the "To Here" address by placement of the cursor and the use of the "To Here" key on the function keyboard 17D. The cursor is then moved to the line that is to be transferred, then the transfer line key on the function keyboard is selected. Transfer is then accomplished, line by line, through the use of the cursor key. The transfer may be up page or down page and include successive lines of test, the "To Here" address being automatically updated.

Margin adjust control is used to change the margins containing a section of text so that the lines may be shortened, lengthened, or repositioned upon the page horizontally. The start of the procedure in effecting this control is to position the cursor at the first line of text that is to be readjusted. The margin adjust key on the function keyboard 17D is depressed. The new margins are then marked using the cursor and the set right and set left stop keys on the function keyboard 17B. Controlwise the new margin group is stored in a special part of memory and the old margins are entered into the active margin registers. The text line between the old margins is adjusted to fit the new margins, line by line, as the cursor is moved downward, line by line. Text below that which was adjusted is closed or shifted downward as required by the margin adjustment operation.

E. Input/Output Control

Once information has been composed, edited, and formatted, it is usually desirous to make a permanent record of the information so recorded. An output device 33 is provided to receive information from the electronic storage unit 9 and to either record the information in the form of a printed document (an example of such a device would be a typewriter) and/or to make a secondary record of such information (an example of such a device would be a paper tape punch or a magnetic recording device).

In either instance, the output of the display typing system is designed for the optimum operation of a serial printer. Control signals are generated by the output control unit 35 which is responsive to the function keyboard 17 to cause symbol printing, tabulation, carrier return, indexing, tab set, and tab clear. This arrangement allows unattended printer operation except the initial placement of continuous printing paper into the printer.

The output control unit 35 is designed to free the storage unit 9 periodically for output. Output control is begun by depressing the print control key on the function keyboard 17E. Each line of the storage unit 9 is scanned until a print symbol is detected or until the line is completely searched. The control decision will be print a symbol, space, tab, index, or carrier return according to the content of the line, efficient use of printer, and the column address for output. After a line of symbols has been transmitted, the next line will be addressed and the scanning procedure repeated. The incrementing of scan lines is terminated when form length has been exhausted or the end of the page of storage has been reached. The storage and switching operates at a much greater speed than output so that input may overlap printing as storage is freed line by line after completion of its output cycle. Display typing controls are inhibited from the storage area not yet processed for output.

A second output control is termed set printer stops. A carrier return signal is transmitted to the output unit. Thereafter, a tab set or clear code followed by a space code is transmitted to the output device. This process is repeated until all of the tab stops and margin stops stored in storage unit 9 are read. A tab is set at each columnar position at which a tab or left margin mark exists in the format storage.

An "enter" key is also provided on the function keyboard 17E which allows the operator to enter both data and format information into the storage unit 9 from the input device. 13. A special character transmitted from the input device indicates the beginning and ending of format information.

A further output control operation is effected by the CRT control unit 37 which controls the display on the CRT display of characters stored in coded form in the storage unit 9. If an entire page of information is to be displayed, each text item is gated from the storage unit 9 under the control of the display address register 39 to the CRT control unit 37 in a defined sequence. This sequence is dependent upon the manner in which the characters are generated on the CRT display 11. For example, it may be desirous to display each entire character sequentially or it may be desirous to display only a portion of a plurality of adjacent characters. If the entire page is not displayed, then a plurality of lines adjacent to the line addressed by cursor mark 19 can be displayed. In any instance, the characters to be displayed are gated to the CRT control unit 37 which decodes each character into a series of blank and unblank control signals which control the turning off and on of the CRT electron beam. Conventional CRT sweep controls are utilized to control the placement of the CRT beam with respect to the CRT screen. These signals are synchronized with the CRT control unit in a conventional manner to insure the recording of an intelligible pattern on the CRT screen. Thus, as can be seen from the above description, the operator can key in data or text information by depressing keybuttons located on the data keyboard 15 or information may be inputted by input device 13. Control information can be inputted by input device 13 or by function keyboard 17. The control information (a) specifies the storage location to which information may be inputted on the information line which will be operated upon, (b) specifies the format that the data information is to conform to, (c) specifies the mode of operation for text content changes, (d) specifies text reformatting operations, and (e) controls input and output operations.

DETAILED DESCRIPTION

A. General Data Flow

Figure 3:
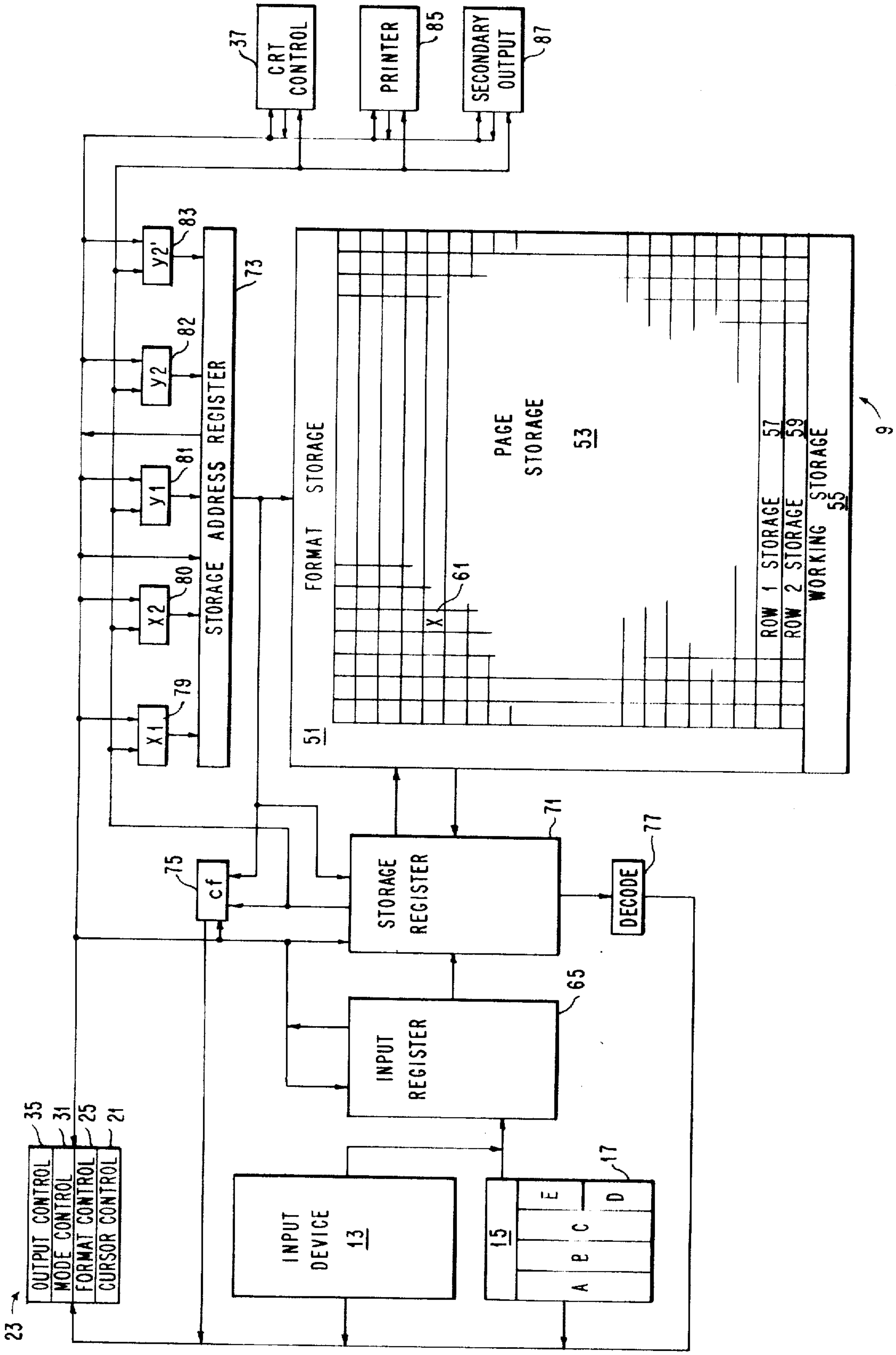
FIG. 3 is a detailed schematic block diagram of the automatic data composing, editing and formatting system of the present invention.

Referring now to FIG. 3 of the drawings, a more detailed block diagram of the electronic storage unit, the addressing circuitry, and the input and output data paths of the data composing, editing and formatting system are depicted. As described above with respect to FIG. 1, information is transmitted to an electronic storage unit 9 where it is stored for display and revision. The electronic storage unit 9 includes a format storage portion 51, a page storage portion 53, a working storage portion 55 and two special storage portions, row 1 storage 57 and row 2 storage 59. In the description which follows, each portion of the electronic storage unit 9 will be described as performing certain functions. It is, of course, understood by those skilled in the art that each portion of the electronic storage unit 9 has been arbitrarily selected to perform certain functions.

The format storage portion 51 of the electronic storage unit 9 is utilized to store format information which will control the format that the data information or text characters will conform to. Included in the format information stored are sets of margin stops, tab stops, and paragraph definition marks. Each set of margin stop information thus stored contains a left-hand boundary, a right-hand boundary, and a vertical position. There are 16 such sets of margin stops which are addressed sequentially as will be described, only one set of being activated at any one time instant. The activated margin stops are contained in a register (not shown) and confine the cursor to positions intermediate the stops.

As mentioned above, tab information is also stored in the format storage 51. Two sets of tab information are required to be stored: an input tab set and an output tab set. Briefly, the input tab set is generated by the operator who defines tab stops at predetermined horizontal locations of the display in much the same manner that tab stops are set on a typewriter. That is, tab stops are set by positioning the display cursor at a required stop column on the display (not shown) and selecting the "tab set" key on the function keyboard 17B of FIG. 2. Each of the input tab stops are stored in the format storage 51 in the form of flag bits, there being a flag bit location for each horizontal position of a line of display.

The output tab stops are utilized to control the output printer. These tab stops correspond on a one for one basis with the input tab stops and also correspond with each left-hand margin stop stored in the format storage. For example, each of the 16 sets of margin stop information contain left-hand boundaries, there being 16 corresponding output tab stops set in format storage 51. In addition to the 16 output tab stops corresponding to the left-hand margin stop information, there would be a number of output tab stops corresponding to the input tab stops. The output tab stops are also in the form of flag bits which correspond with each horizontal position of a line of print.

Special paragraph formatting information is also stored in format storage 51. This information in the form of paragraph marks is stored to the left of each line of text information which corresponds to the start of a paragraph. Since a paragraph could start on any line in accordance with the desires of the operator and the information content, it is necessary to have a number of format storage locations corresponding to the number of lines of information that could be stored in page storage 53 to store paragraph marks. The paragraph marks are stored when the operator positions the cursor on the desired line and depresses the "paragraph" key. Thus, depression of the key labeled "paragraph" causes a paragraph mark to be stored in the format storage 51 at a line address corresponding to the cursor line address only if no such mark were previously stored there. If a paragraph mark was previously so stored, depression of the "paragraph" key would effect its removal. Additionally, a "cursor return" key (not shown) located on the character keyboard 15 of FIG. 2 can be utilized to cause the cursor to move to the left stop, index down one line, and cause a paragraph mark to be stored at a location in the format storage 51 corresponding to the line indexed to. Repetitive operation effects storage of blank lines.

In the description immediately preceding, the type of information stored in the format storage 51 was described. The description which follows relates to the type of information stored in the page storage 53, the row 1 storage 57 the row 2 storage 59, and the working storage 55.

The page storage 53 is utilized to store text characters and is constructed so as to correspond on a line for line basis with a page of information content. That is, the page storage consists of a plurality of lines of storage, each line of storage consisting of a plurality of discrete positions capable of storing a character. The maximum number of characters that can be stored within a line of storage corresponds to the maximum page width desired. Each character position of the page storage is located at a unique coordinate position. For example, the fifth character that could appear in the fifth line of the page storage 53 would have an X-coordinate position of five corresponding to the fact that it is the fifth character in the line and a Y-coordinate position of five corresponding to the fact that it is in the fifth line. The unique position has been labeled with an "X" 61. As will be seen hereinafter, the page storage 53 corresponds on a one for one basis with the displayed information.

Row 1 storage 57 and row 2 storage 59 each comprise a single line of storage with a number of characters corresponding to the number of characters corresponding to the number of characters in a line of page storage 53. These storages are utilized for the temporary storage of characters from the page storage during certain control operations.

Working storage 55 comprises a plurality of storage positions for storing unique values needed to accomplish the data editing and formatting functions. Examples of the information stored in the working storage are: the active margin group designated by the operator, numerous internal conditions which are set and sampled during character moving operations, an output storage address and various other factors which will be described hereinafter.

As described above with respect to FIG. 1, data information and control information is entered into the electronic storage unit 9 by a keyboard device or by an input device. Data keyboard 15 and function keyboard 17 enter both data information and control information to the input register 65. Also, the input device 13 enters both data and control information to the input register 65. Certain control information such as mode information and cursor location information is transmitted directly from the function keyboard 17 to the control unit 23. Data information and format control information is transferred from the input register 65 to the storage register 71. The information located in the storage register 71 is transferred to a specific location of electronic storage unit 9 specified by the storage address register 73.

When it is desirous to read information from the electronic storage unit 9, information at the address specified by the storage address register 73 is gated from the electronic storage unit 9 to the storage register 71. Thereafter, the information in the storage register 71 can be transferred back to the electronic storage unit 9 at the same storage location or at a different storage location in accordance with the information content of the storage address register 73. Additionally, the information in storage register 71 can be routed to the compare circuit 75 which is responsive to the control unit 23 to compare the information content of storage register 71 and the information content of storage address register 73. The compare circuit 75 thereafter indicates to the control unit 23 when the data in storage register 71 is the same as that in storage address resister 73. The decode circuit 77 is operative to decode the characters in storage register 71 and to supply predetermined output signals for predetermined characters to the control unit 23.

The characters in the storage register 71 may also be gated into the address counters 79–83 under the control of a gating signal supplied by the control unit 23. The information stored in the address counters 79–83 can thereafter be gated into the storage address register 73.

Information located in storage register 71 is also sent to the CRT control 37, the printer 85, and secondary media recorder 87 under the control of appropriate gating pulses supplied by the control unit 23. Information sent to the CRT control 37 is utilized by this device to control the information display and the characters displayed thereon as described above with respect to FIG. 1 and as will be described hereinafter. Information gated to printer 85 is utilized to cause the printer to print the information characters so sent, or to automatically perform a control operation in accordance with the control character sent to the printer 85. This operation will also be discussed hereinafter. In a similar manner, information characters can be sent to a secondary medium recorder 87 in order that they be recorded on the secondary medium.

B. Cursor Control

Referring once again to FIG. 1 of the drawings, it has been described how the operator varies the location of the cursor mark 19 on the CRT display 11 by manipulating controls on the cursor control keyboard 17A. It has further been described how the cursor can be moved up or down or left to right, one character position at a time or through multiple character positions at a scanning rate settable by the operator. In the description which follows, the operation of the cursor control unit 21, which is responsive to the function keyboard 17A to effect control over the cursor position will be described in detail.

Referring now to FIG. 4(*a*) of the drawings, the cursor scan rate control logic and the cursor vertical positioning logic is depicted. The cursor scan rate control logic consists of a variable rate high-frequency oscillator 101 and a variable rate low-frequency oscillator 103. The frequency rate of each of the oscillators is controlled by an operator control 104(*a*) and 104(*b*) located on the cursor control keyboard 17A of FIG. 2. Whenever the operator desires to effect motion of the cursor to the right or the left, the corresponding cursor right, cursor left or tab operation key button is depressed thereby providing a gating signal to OR-gates 104 and/or 105, the output signal of which provides a gating signal to the AND-gate 107, whereby the output signal of the variable rate high frequency oscillator is gated to the cursor clock decode logic 109. This logic provides two periodically recurring mutually out-of-phase output signals termed "clock A" and "clock B," the repetition rate of which is dependent upon the setting of the operator control 104(*a*). In a similar manner, whenever the operator depresses a cursor up, or cursor down key, the OR-gate 111 and the AND-gate 113 gate the output signal of the variable rate low-frequency oscillator 103 to the cursor clock decode logic 109. Again, two recurring mutually out-of-phase output signals are provided at a frequency rate dependent upon the setting of the operator control 104(*b*). Thus, the cursor horizontal and vertical scanning rates may be set by the operator to the operator's reading speed. The cursor clock decode logic 109 insures that the clock A signal always occurs prior to the clock B signal except when initiated by a tab operation wherein special single cycle control is effected. It is also phased with the memory control clocks to be described with respect to FIG. 15.

As has been described, the cursor position is incremented in the direction denoted by the depressed key button by one character position or through multiple character positions. Partial depression of any of the cursor motion keys causes the cursor to be incremented by one character position while full depression of the key generates a rapid motion signal which causes multiple characters to be scanned by the cursor. A go latch circuit 115 provides a gating signal to effect cursor incrementing. The latch circuit is set with an output signal from the OR-gate 116 which is responsive to a signal from AND-gate 117 whenever all four cursor motion keys are restored to their nonoperative condition or to a signal supplied by the AND-gate 118 whenever all rapid motion is selected at clock A time if the not inhibit signal is present. Thereafter, whenever one of the cursor motion keys is depressed, the latch circuit 115 in conjunction with the output signal provided by the depressed cursor key provide gating signals to effect cursor motion. The latch circuit is reset at clock B time. In this manner, the latch circuit is reset with the first clock B signal upon partial depression of a key so that subsequent cursor motion cannot be effected until the latch circuit is again set by releasing the depressed key thereby providing the gating signal at the AND-gate 117.

If a key is fully depressed, the signal from the AND-gate 118 turns the Go latch 115 on with each clock A signal until either the rapid motion or not inhibit signal is removed upon key release. The not inhibit signal is supplied when the latch circuit 119 is in a reset state. This latch is set during a rapid motion operation with a signal from AND-gate 120 at a clock B time whenever OR-gate 121 provides a signal indicating a stop condition. OR-gate 121 is responsive to AND-gates 122 and 123 which provide an output signal to set the latch circuit 119 whenever the cursor reaches the left margin or right margin respectively. Thus, by fully depressing the cursor left or cursor right key button, the cursor is caused to increment across the line in the direction denoted by the depressed key until the margin stop is reached. In a similar manner, the AND-gate 125 provides a set signal to the latch signal 119 whenever the cursor addresses a line containing a paragraph mark when moving in rapid motion. The OR-gate 127 provides an output signal indicative of a cursor up or cursor down motion which is gated with the paragraph mark signal. In this manner, the cursor will rapidly slew up page or down page until a line containing a paragraph mark is reached. At this time, cursor motion stops. Thereafter, in order to make the cursor continue its motion, the operator must release the depressed cursor up or cursor down key, thereby causing the latch circuits 115 and 119 to be set and reset respectively with a gating signal supplied by the AND-gate 117, and thereafter depress the key.

The cursor vertical position control logic consists of a counter 129 which maintains a count corresponding to the line number the cursor is addressing in the page storage unit (not shown). Whenever the cursor down key is depressed, or whenever a signal is provided by the horizontal position cursor control logic indicating that the cursor should move downward, the OR-gate 131 provides an output signal to the AND-gate 133. In a similar manner, whenever the cursor up key is depressed or whenever the cursor horizontal position control logic provides a cursor up signal, the OR-gate 135 provides an output gating signal to the AND-gate 137. The output signal of the counter 129 is provided to the decode circuit 139 which provides a series of output signals indicating the relative position of the cursor with respect to the top and to the bottom of the page. That is, a signal is provided indicating that the cursor is located on the topmost line of page storage, on the bottommost line of page storage or not located on either line. The signal indicating that the cursor is not on the topmost line is provided to the AND-gate 137 while the signal indicating that the cursor is not on the bottom line is provided to the AND-gate 133. Assuming that the cursor is not located on the top or the bottom line, whenever the cursor up key is depressed, the AND-gate 137 provides a −1 output signal when the clock A signal appears. In a similar manner, a +1 output is provided by the AND-gate 133. The output signal of the AND-gates 133 and 137 either increment or decrement the cursor vertical position counter 129. In this manner, the cursor vertical position counter maintains a count indicative of the cursor position which is modified by key button depression or by signals provided by the horizontal cursor position control logic to be described.

Referring now to FIG. 4(*b*) of the drawings, the cursor horizontal position control logic is depicted. This logic is similar to the vertical position control logic in that a cursor horizontal position counter 143 is incremented or decremented as the cursor moves to the left or to the right. Additional control logic is also added for tab operations and for margin stop recognition.

The cursor horizontal position counter 143 is incremented by 1 in accordance with the signals applied by the OR-gate 145. Whenever the cursor right key is depressed, the AND-gate 147 provides an output signal as long as the cursor horizontal position does not equal the right margin stop. In a similar manner, the AND-gate 149 provides a −1 output signal whenever the cursor left key button is depressed as long as the left margin position is not reached for decrementing the counter by 1. Both the AND-gate 147 and the AND-gate 149 are gated with the "GO" signal which is reset for single increment partial key depressions with the clock B signal and which cyclically turns on for multiple incrementing of the cursor until the margin position is reached as has been described.

The active left margin stop is stored in the left margin stop register 151 and the active right margin stop is stored in the right margin stop register 153. Compare circuits 155 and 157 provide output signals indicating the relative position of the cursor with respect to their respective margin stops. Whenever the cursor reaches the right margin stop due to the depression of the cursor right key, and is not located at the bottom of the page, the AND-gate 159 provides a gating signal to the AND-gate 161 which thereby gates the contents of the left margin stop register into the cursor horizontal position counter. Additionally, the AND-gate 159 provides an output signal to the cursor vertical position counter to cause it to increment by 1 thereby moving the cursor down page. Thus, whenever the cursor is located at the right margin and the cursor right key button is depressed, it is moved to the left margin of the next lower line. In a similar manner, when the cursor left key is depressed and the cursor horizontal position is equal to the left margin stop, AND-gate 163 provides an output signal to the AND-gate 165 which gates the right margin stop into the cursor horizontal position counter 143. Additionally, the AND-gate 163 provides an output signal to the cursor vertical position counter causing it to decrement by 1 thereby moving the cursor up page.

A further horizontal cursor positioning control is effected through the utilization of the "tab" key (not shown) located on the data keyboard 15. Depression of this key causes the cursor to advance to a horizontal position defined by a tab stop contained in the format storage 51. Tab stops are initially set in the format storage 51 by positioning the cursor to the desired horizontal location and thereafter depressing the "tab set" key on the function keyboard 17B. Depression of the "tab set" key causes OR-gate 167 to provide an output signal to the AND-gate 169 which gates the contents of the cursor horizontal position counter 143 into the X1 counter 79. At the same time, the format control unit 25 effects the gating of the vertical address of the format storage 51 into the Y1 counter 81. The contents of the X1 counter 79 and the Y1 counter 81 are thereafter transferred to the storage address register 73 which causes the character position in the format storage 51 corresponding to the horizontal position of the cursor to be addressed. Depression of the tab set key also causes a bit to be gated by the AND-gate 171 to the OR-gate 173 and thereafter gated into the storage register 71. This bit which corresponds to a tab position is thereafter stored in a format storage at the address specified by the storage address register 73. In a similar manner, depression of the tab clear key on the function keyboard 17B provides a gating signal to the OR circuit 167 whereby the storage address register 73 is gated with the contents of the cursor horizontal position counter and the format storage vertical position. Additionally, the AND-gate 175 is gated with a no-bit signal which is transferred to the storage register 71 and thereafter written into the format storage 51 at the specified location. In this manner, tab bits are either set or cleared at the cursor location upon depressing the "tab set" key or the "tab clear" key.

Once the desired tab bits are set in the format storage 51, depression of the tab key causes the cursor horizontal position counter 143 to increment until a tab stop is reached. In this manner, depression of the tab key on the data keyboard 15 causes the cursor to assume a horizontal position equal to that of the tab stop located immediately to its right. Depression of the tab key provides a gating signal to OR-gate 167 in a manner similar to that described heretofore with respect to the tab set and tab clear key. The output signal of the gated AND-gate 169 along with one provided by the format control unit 25 causes the storage address register to address the format storage 51 at a location corresponding to the cursor horizontal position counter. Thereafter, the format storage at this position is read into the storage register 71 and then decoded by the decode circuit 77 to indicate whether that position contains a tab stop or contains no tab stop. Assuming that it contains no tab stop, the output signal of the decode circuit is provided to the OR-gate 177 which provides an output gating signal to the AND-gate 179. As long as the cursor's horizontal position does not equal the right margin stop location, and as long as the gating signal is provided, the AND-gate 179 provides a +1 output since the tab key has been depressed. This output is applied to the OR-gate 145 and thence to the cursor horizontal position counter which is incremented by +1. The incremented content of the cursor horizontal position counter is thereafter gated by the clock B signal to the AND-gate 169 and the operation continues until a tab stop is detected by the decode circuit 77. When the tab stop is thus detected, the gating signal is removed from the OR-gate 177 and the operation ceases. In this manner, the cursor is tabbed to a location corresponding to the location of the tab stop in the format storage 51.

If the cursor horizontal position counter is equal to a tab stop location when the tab key is depressed, a "first tab" signal gates the OR-gate 177 to effect incrementing of the cursor horizontal position counter. This first tab signal is reset with the first cursor increment by logic (not shown) and remains off until the tab key is restored.

Summarizing, the cursor vertical position counter 129 of FIG. 4(*a*) and the cursor horizontal position counter 143 retain the vertical and horizontal positions of the cursor. These positions correspond to a unique page storage location within the page storage unit 53. The counters are incremented and decremented by control keys located on the keyboard 17A of FIG. 2. It is to be noted that the memory controls necessary to effect storage cycles are described with respect to FIG. 15 of the drawings and are, of course, utilized in conjunction with respect to the tab operations described above.

C. Format Control

Referring once again to FIG. 3 of the drawings, the description immediately preceding described the operation of the cursor control unit 21 with respect to the block diagram of the data formatting and editing system depicted. In the description which follows, the operation of the format control unit 25 will be described. The format control unit is responsive to keys on the function keyboard 17B to effect the storage of formatting information in the format storage 51 and to effect its recall from the format storage 51. As has been heretofore described, the information stored in the format storage 51 consists of input tab stop information, paragraph definition information, margin stop information, and output tab stop information.

The operation of the format control unit 25, when storing, clearing, and utilizing input tab information has been described in the last section relating to the cursor control unit. Further, as has been described, special characters designating the beginning of a new paragraph are caused to be stored when the operator positions the cursor on the line desired thereby addressing a corresponding line in page storage and thereafter depresses the "paragraph" key. The key depression causes the X1 counter 79 to be gated with the line format storage position and the Y1 counter to be gated with the vertical position of the cursor address. Thereafter, the contents of the addressed location are read to the storage register 71 and decoded by the decode circuit 77 to determine whether a paragraph mark was already located at the defined position. If no such paragraph mark was thus located, the format control unit 25 provides a special paragraph character to the storage register 71, and, thereafter, the contents of the storage register 71 are gated into the addressed format storage location. If the decode circuit 77 indicates that a paragraph mark previously existed at the address location, the format control unit causes a blank character to be gated into the storage register 71 and thereafter into the addressed format storage location. In this manner, the depression of the paragraph key causes a paragraph mark to be stored at the addressed line location if none previously existed there. If one previously existed there, it is removed.

In the description which follows, the operation of the format control unit 25 when storing margin stop information in the format storage unit 51 and when thereafter recalling that information from the format storage unit 51 will be described. The description is in the form of a state diagram describing a sequence of operations. It is understood by those skilled in the art that the sequence of operations thus defined may readily be implemented utilizing logic blocks similar to those described with respect to FIGS. 4(*a*) and 4(*b*) of the drawings. However, since the margin storage operation, and other operations such as the text content control operations to be described hereinafter involve many elemental operations and decisions which must be sequentially made, the description of these operations and decisions is best described by a state diagram. Reference will be made to both FIG. 3 and FIGS. 5(*a*) and 5(*b*) in the following description, it being understood that reference to machine components refers the reader to FIG. 3 and reference to a sequence of operations refers the reader to FIG. 5.

As has been described, the format storage 51 contains 16 sets of margin stop information, each set containing a left boundary, a right boundary and a vertical position. In order to store margin stop information, it is necessary to access the format storage positions adapted to contain the margin stop information and then store the margin stop information and then store the margin stop information. Thereafter, the margin stop information thus stored may be recalled to control the placement of the cursor as has been described and to control the placement of text characters as will hereinafter be described.

In order to store margin stop information, the operator depresses the "start" key on the function keyboard 17B. This causes the first group of storage locations within the format storage 51 which are adapted to store margin set information to be addressed. A set of indicator lamps 201 depicted in FIG. 2 indicate that a first margin group is being addressed. Thereafter, the second, third, etc., margin groups may be sequentially addressed by depressing the "advance" key on the function keyboard 17B. In a similar manner, the margin address can be decremented by depressing the "reverse" key. Referring now to FIG. 5(*a*) of the drawings, depression of the "start," "advance," or "reverse" key on the function keyboard 17B of FIG. 2 causes the active margin group number contained in the working storage 55 of FIG. 3 to be gated into the X1 counter 79 of FIG. 3. This operation is denoted by block 203. In operation, the format control unit 25 of FIG. 3 gates the address of the location in the working storage 55 containing the active margin group number into the storage address register 73. Thereafter, the storage address register 73 effects the gating of the contents of the addressed storage location in the working storage into the storage register 71. Thereafter, the contents of the storage register 71 are transferred to the X1 counter.

Referring once again to FIG. 5(*a*) of the drawings, once the active margin group number has been stored in the X1 counter, a test is made as indicated by block 205 to determine whether the start key had been depressed. If the start key had been depressed, the X1 counter is set equal to 1 as indicated by block 207. Thereafter, the reverse key is sampled, as indicated by block 209, to determine whether it was depressed. If the reverse key was depressed, a test is made as indicated by block 211 to determine whether the X1 counter was equal to 1. If the X1 counter is equal to 1, no further decrementing of the X1 counter will thereafter be effected since 1 is the lowest position which may be reached. This test is effected by gating the contents of the X1 counter 79 into the storage address register 73 and thereafter gating the contents of the storage address register 73 to the compare cirçuit 75. The compare circuit 75 compares the signal thus gated to it with a signal gated to it from the format control unit 25. If the contents of the X1 counter do not equal 1, the counter is decremented by 3 as indicated by block 213. This causes the counter to contain the address of the left margin stop of the next lower group of stops. (It is necessary to decrement by 3 in order to always address the first storage location within the group of three storage locations.) Thereafter, the advance key is sampled as indicated by block 215, and, if it had been depressed, a test is made to determine whether the X1 counter was equal to 46. This would indicate that the last group of margin stop information was being sampled, and, since further advance could not be effected, the counter would retain its count. If the X1 counter did not equal 46, as indicated by block 217, the X1 counter would be incremented by 3 as indicated by block 219.

Summarizing the above operation, whenever the start key, reverse key, or advance key is depressed, the active margin group number is gated from the working storage unit into the X1 counter. If it were the start key that was depressed, the X1 counter is set equal to 1. If the reverse key is depressed, the X1 counter is decremented by 3 unless it were addressing the first margin group number. If the advance key were depressed, the X1 counter is incremented by 3 unless it were already addressing the last margin group number. In any event, the number thus contained in the X1 counter is thereafter stored in the working storage location predesignated to contain the active margin group number as indicated by block 221. This operation is effected by gating the contents of the X1 counter into the storage address register 73 and then gating the contents of the storage address register 73 into the storage register 71. Thereafter, the storage address register 73 is gated with the location in the working storage 55 predesignated to contain the active group number. The storage address register 73 then effects the addressing of that storage location and the information content of the storage register 71 is transferred into it.

Once the contents of the X1 counter indicating the active margin group have been placed into the working storage, the format storage address is gated into the Y1 counter and the contents of the format storage, as indicated by the X1 and Y1 counters, is read. At this time, the X1 and Y1 counters will be addressing the left margin stop information of the activated margin group in the format storage 51. These operations are denoted by block 223. Thereafter, the cursor horizontal position counter and left margin stop register are set equal to the left margin information as denoted by block 225. This is effected by gating the left margin information located in the storage register 71 into the cursor horizontal position counter 143 and left margin stop register 151 described with respect to FIG. 4(*b*) of the drawings. Thereafter, as denoted by block 226, the X1 counter is incremented by 1 so that it addresses the right margin stop information within the group of margin information and this information is read from the format storage and stored in the right margin stop register 153 of FIG. 4(*b*). Thereafter, as noted by block 227, the X1 counter is incremented and the vertical stop information is read. As noted by block 228, the vertical stop information is compared to see if it is equal to a special code. If it is equal to the special code which indicates that no vertical stop has been stored, the device stops as indicated by block 230. If the vertical stop does not equal a special code, the cursor vertical position counter is set equal to the vertical stop information as indicated by block 229 and the device thereafter stops as indicated by block 230.

Summarizing, depression of the start, reverse, or advance keys causes a group of margin stop information to be addressed and hence activated. The activated group of margin stop information is thereafter utilized to effect the placement of the stop information in the left and right margin registers and to effect the placement of the cursor adjacent to the activated left margin stop at a vertical position determined by the activated vertical stop.

Referring now to FIG. 5(*b*) of the drawings, the operation effected by the format control unit 25 of FIG. 3, when effecting the storage of margin stop information at the location in format storage specified by the activated group of margin stop information is depicted. Previously stored margin stops located within the format storage 51 at the address specified by the activated group number can be cleared by depressing the "clear stops" key on the function keyboard 17B. A new left margin stop, right margin stop, or vertical stop as defined by the cursor position can be stored in the format storage 51 at an address specified by the activated margin group number by depressing the "set left stop," "set right stop," or the "set vertical stop" keys respectively located on the function keyboard 17B.

Depression of one of the set stop keys or the clear stop key causes the active margin group number to be gated from the working storage into the X1 counter and causes the vertical position address of the format storage to be gated into the Y1 counter as denoted by block 233. Thereafter, as denoted by block 235, the contents of the format storage at the address specified by the Y1 and X1 counters is read. If the "clear stops" key was depressed as indicated by block 237, a blank character is written into the left margin stop position located at the address specified by the Y1 and X1 counters and the output tab flag bit is cleared as denoted by block 239. Thereafter, the X1 counter is incremented by 1 and a blank character is written at the right margin stop positions at the format storage location denoted by the now incremented X1 counter and the Y1 counter. Thereafter, the X1 counter is again incremented by 1 as denoted by block 241 and the special code is written at the vertical stop positions of the format storage specified by the Y1 and X1 counters as denoted by block 243. Additionally, the left and right margin stop registers of FIG. 4(*b*) are reset. Thereafter, the device stops as indicated by block 245.

If the key button depressed were the "set left stop" key, the operation would proceed from block 237 to block 247 whereupon a test would be made to determine that the left stop key was depressed. Thereafter, the cursor horizontal position counter is written into the left margin stop positions at the format storage location defined by the Y1 and X1 counters and into the left margin stop register as denoted by block 249 and the device thereafter stops. If the "set right stop" key were depressed, the operation would proceed from block 247 to block 251 and thence to block 253 to effect the operation of incrementing the X1 counter by 1 and thereafter storing the contents of the cursor horizontal position counter in the right margin stop positions of the format storage defined by the Y1 and X1 counters and in the right margin stop register. If the "set vertical stop" key were depressed, the operation would proceed from block 251 to block 255 whereupon the X1 counter would be incremented by 2 and the contents of the cursor vertical position counter would be written into the vertical stop positions of the format storage defined by the Y1 and X1 counters. Thereafter, the device would stop as indicated by block 245.

If the operator desired to store a plurality of groups of margin stop information, the operator would thereafter depress the advance or reverse key buttons on the function keyboard 17B causing a new active group number to be stored and thereafter depress the set left, right, and vertical stop keys and clear stop key as desired. Thus, a plurality of margin stops are stored in the format storage 51 of FIG. 3.

As has been described, output tab stops are utilized to control the output printer. The left margin stop positions, along with the tab stop information stored in the format storage, is utilized to define the output tab stops. The operation of defining the output tab stops is identical to that of defining input tab stops except that depression of both the "set tab" key and the "set left stop" key effect the storage of a flag bit representative of an output tab stop at the location defined by the horizontal cursor position.

D. Text Content Control

Referring once again to FIG. 3 of the drawings, the operation of the cursor control unit 21 and format control unit 25 have been described as controlling, respectively, the placement of and addressing by a cursor mark and the placement of control information into the format storage unit 51. In the description which follows, the operations of the data composing, editing and formatting system when entering and changing text content will be described with respect to the data flow between the keyboards 15 and 17 controlled by the operator, the electronic storage unit 9, and the output display device. Again, for purposes of ready understanding, state diagrams will be utilized to describe the operation of the control unit 23.

As has been mentioned heretofore, there are four basic modes of text content control: insert mode, replace mode, delete mode, and close mode. The operation of the device in each of these modes will be discussed in the following four sections.

1. Insert Mode

In the description which follows, the sequence of elemental operations performed by the data editing device of the present invention as depicted in FIG. 3 for the character insert operation will be described. This sequence of operations is depicted in FIGS. 6(*a*), 6(*b*) and 6(*c*) as a state diagram showing a sequence of operational steps. Reference will be made to both FIG. 3 and FIGS. 6 in the following description, it being understood that reference to machine components refers the reader to FIG. 3 and reference to the sequence of steps refers the reader to FIGS. 6.

When the operator depresses the control key labeled "insert" on the keyboard 17C of FIG. 2, the operator is indicating that the character information thereafter keyed into the electronic storage unit 9 should be inserted between preexisting text characters at a predetermined point. The control unit 31 is responsive to the depression of the "insert" key to set up various initial conditions which will be described hereafter. Either before the operator depresses the "insert" key or thereafter, the operator manipulates the cursor control keys on the function keyboard 17A of FIG. 2 in order to place the cursor 19 of FIG. 1 adjacent to the character position wherein it is desired to insert information. Since the cursor position corresponds to a unique one of the character positions in the page storage 53, for example, the character position 61 of the page storage, it is defined by both a vertical and horizontal coordinate positions which are stored in counters 129 and 143 of FIGS. 4(*a*) and 4(*b*).

Once the cursor has been positioned by the operator to the desired location, the operator insures that the margin stops are as desired. The operator can specify the left-hand and right-hand margins by operating with the margin advance and reverse keys on the function keyboard 17B of FIG. 2 and thus activate a particular group of margin set information. The active left and right margin stops are stored in registers 151 and 153 of FIG. 4(*b*) as has been described.

Once the "insert" key has been depressed, the cursor has been positioned, and the margin stops have been verified, the operator depresses a character key button on the data keyboard 15 which corresponds to the first character of the material to be inserted. A coded representation of the letter corresponding to the depressed key button is transmitted to the input register 65.

In the description which follows, it will be described how the character located in the input register 65 replaces the character addressed by the cursor and how that character is, in turn, shifted one position to the right thereby replacing the character adjacent to it. This operation continues until a blank character location is reached or until the right margin is reached. If the right margin is reached, it is necessary to test the character which is "pushed off" of the line to determine whether it is the last character of a word. If it is the last character of a word, the entire word must be shifted down to the next line and the next line must be shifted to the right by a number of characters corresponding to the inserted word. This operation continues with the overflow words of each line shifting to the next line until a paragraph mark is detected or until no characters need to be shifted.

The detection of a paragraph mark causes the entire first line of the new paragraph to shift down by one line thus allowing the overflow words of the last line of the preceding paragraph to occupy a new line. In a similar manner, each line of storage is thereafter shifted to the next line until a blank line or the last line of page storage is detected.

In all operations, the row 1 storage 57 and row 2 storage 59 are utilized to temporarily store all displaced characters until they can be written in their new location of the page storage 53. The address counters 79–83 are utilized to keep track of the page storage and row storage locations of displaced characters as will be described. Further, many special conditions exist, such as for example, the handling of hyphen and space characters which are shifted off of a line, the positioning of the cursor when the word which the cursor is addressing is shifted to the next line and the handling of single word lines.

These will be described in the following detailed description of the elemental operations performed.

As mentioned heretofore, the depression of the "insert" key and a character key button sets up various internal conditions under the control of the mode control unit 31. These conditions include: the X1 address counter 79 and the X2 address counter 80 are set with the horizontal coordinate position defined by the cursor. This is effected by reading the horizontal cursor coordinate position from the cursor position counter into the address counters. In a similar manner, the Y1 address counter 81 is gated with the vertical coordinate position of the cursor, and the Y2 and Y2' counters 82 and 83 are gated with the vertical coordinate position of the row 1 storage 57. Also, the row storages are cleared of data.

Further, a series of internal latches located within the mode control unit 31 are set to an initial condition. These latches are utilized when executing the sequence of operations to test for various conditions. Thus, the latches indicating that the row 1 storage 57 and the row 2 storage 59 are clear are set, the latch indicating that the last character was a syllable hyphen is reset, the latch indicating that the last character was a required hyphen is reset, the latch indicating that a paragraph mark has been found is reset, the latch indicating that the cursor address should be stored is reset, the latch indicating that the storage register has been entered is reset, and the latch indicating single cycle control is reset. Additionally, the L1 latch and the L2 latch, which are utilized to sample internal conditions relating to the cursor, retain their information at this time.

In the description which follows, it will be assumed that the cursor is addressing the character position 61 of the page storage which is the fifth character in the line and further, that the left-hand margin stop is set at a position corresponding to the third character position in a line and that the right-hand margin stop is set at a position corresponding to the last character position of a line of page storage. Thus, when the first character is keyed, the internal latches located within the control unit as described above are set. This is delineated in FIG. 6(*a*) by the start block 301. Thereafter, as indicated by blocks 303 and 305, the L2 and L1 indicators are checked to determine whether the cursor is beyond or at the right margin, and, since it is not so located, the operation proceeds to block 307.

At this time, it is desirous to read the character located in the character position 61 from the page storage unit 53 into the storage register 71 and to thereafter temporarily store that character. Once this operation is accomplished, the just keyed character located in the input register 65 may be loaded into the thus vacated position of the page storage unit 53. In order to accomplish the above operation, it will be recalled that the X1 address counter 79 contains the horizontal coordinate position of the cursor and the Y2 address counter 81 contains the vertical coordinate position of the cursor. Thus the contents of the X1 and Y1 address counters are gated into the storage address register 73 which causes the character located at character position 61 to be gated into the storage register 71. This is indicated in block 307 as the operation of reading the Y2–X1. Thereafter, the character located in the storage register 71 is written into the row 1 storage 57 for temporary storage. This is accomplished when the control unit causes the contents of the Y2 counter 82 and the X1 counter 79 to be gated into the storage address register 73. It will be recalled that the Y2 counter 82 contains the vertical address of the row 1 storage. Thus, the address register specifies a unique storage location in the row 1 storage 57 for the placement of the character contained in storage register 71. This operation is indicated in block 307 as writing at Y2–X1. The character thus written in the row storage is tested to see whether or not it is a blank character as indicated by block 309. If it is not a blank character, the internal latch in the mode control unit 31 indicating that the row 1 storage is clear of data information is reset to indicate that a character is now present in the row 1 storage. This operation is indicated by block 311 and, as indicated, the row 2 storage latch would be reset if the Y2 counter contained the row 2 address. Thereafter, as indicated by block 313, a test of the internal latch in the control unit 69 to determine whether or not the storage register has been entered from the input register is made. Since the just keyed character located in the input register 65 has not yet transferred to the storage register 71 and since the latch was initially reset, the internal latch indicates that the storage register has not been entered and that it is thereafter desirous to gate the character in the input register 65 into the storage register 71 and thence into the page storage unit 53. Thus, the next operation performed as indicated by block 315 is to write the contents of the input register into the page storage unit 53 at the address specified by the Y1 counter 81 and the X1 counter 79. This address corresponds to the character position 61 or the cursor address. Thereafter, the internal latch indicating that the storage register has been entered from the input register is set.

At this time, the information character keyed from the data keyboard 15 has replaced the character adjacent to the cursor on the display (not shown) and the character previously located adjacent to the cursor is stored in row 1 storage 57 at the same horizontal position which it previously occupied in the page storage 53. During the next portion of the operation to be described, the character located in the row 1 storage replaces the character immediately to the right of the inserted character and the character thus replaced is stored in the row 1 storage. It should be noted at this time, however, that if the cursor were located adjacent to the right-hand margin, the character located in row storage would have to go to the next line of storage immediately below that identified by the cursor. Therefore, it is necessary at this time to make several attempts to determine whether it is permissible to move the character located in row storage back to the cursor addressed line. Hence, the internal latch testing to see whether a paragraph mark had previously been found is sampled as indicated at block 317. Since this latch was initially reset, the X1 counter is sampled to see whether or not it compares equally with the right margin stop as indicated by block 319. This operation is accomplished by gating the right margin stop information into the storage register 71 from the register 153 of FIG. 4(*b*) and by gating the contents of the X1 counter 79 into the storage address register 73. Thereafter, the compare circuit 75 compares the contents of the storage register 71 with the contents of the storage address register 73 and indicates to the control unit 31 whether or not the X1 counter is at the right margin stop position. Since the X1 counter is not at this time at the right margin, the next step performed is to increment the X1 counter 79 as indicated by block 321 and to return to the operation performed at block 307.

As indicated above, the operation performed at block 307 is to read the information contents from the address specified by the Y1 counter 81 and the X1 counter 79 and to write those contents at a corresponding location in the row 1 storage 57. In this manner, the character adjacent to the inserted character is read from the page storage unit 53 thereby leaving a blank location which will be adapted to receive the character displaced by the inserted character. The operation continues in the manner described above with respect to the tests and operations performed by blocks 309 and 311. However, since the internal latch indicating that the storage register has been entered is set, the operation sequence continues through the exit block 323, labeled "C" to block 325 of FIG. 6(*b*).

Summarizing the operation thus far, the character located in the page storage addressed by the cursor has been moved to the row 1 storage 57 at a corresponding horizontal coordinate position and the keyed character has replaced it. Further, the character located immediately to the right of the thus inserted keyed character has been placed in the row 1 storage 57 at a position adjacent to the position where the first character was placed. At this time, it is desirous to read the first character thus placed in the row 1 storage into the storage register 71 and to check the character to detect whether or not it is a blank character, a required hyphen, or a syllable hyphen. The decode circuit 77 is responsive to the character thus contained in the storage register 71 and indicates whether it is one of the above enumerated characters to the control unit 31. If it is not a special character, it is desirous to write the character thus contained in the storage register 71 into the position adjacent to the inserted keyed character. Thus, as indicated by block 325 of FIG. 6(*b*), the contents of the storage unit 9, located at the address specified by the Y2′ counter 83 and the X2 counter 80 are read into the storage register 71. It will be recalled that the X2 counter was initially set equal to the horizontal address of the cursor and that the Y2′ counter was initially set equal to the Y2 counter, and both of these counters were set equal to the row 1, 57 storage address. Thus, the character read into the storage register is the one displaced by the keyed character. Thereafter, this character is tested by the decode circuit 77 to determine whether it is a blank character as indicated by block 327 and, if it is not a blank, the character is next checked to determine whether it is a syllable hyphen as indicated by block 329 or a required hyphen as indicated by block 331. If it is not a syllable hyphen or a required hyphen, a reset signal is applied to the internal hyphen latches as indicated by blocks 337 and 339. The significance of these latches will be discussed hereinafter when the special case of finding a syllable hyphen, a required hyphen or a blank character is discussed.

For the purpose of the discussion which follows, it will be assumed that a character or space character was previously stored in the row 1 storage and is now located in the storage register 71. Thus, the contents of the storage register 71 are written into the page storage unit 9 at the position specified by the Y1 and X1 counters. Since the X1 counter has been incremented by one position, the character thus written is located immediately to the right of the cursor position. At this time, the X2 counter is incremented by one. Both of these operations are indicated by block 341. The operation then continues as indicated at exit block 343 and returns to the operation of block 317 of FIG. 6(*a*). The operations thereafter performed are identical to those previously described, the character located to the right of the inserted character being removed to row storage by the operations depicted in FIG. 6(*a*) and the displaced character being inserted from row storage into the vacated location by the operations depicted in FIG. 6(*b*). This operation continues until a blank character, a hyphen character or the right-hand margin is reached. Detection of a blank character causes the operation to stop since it is unnecessary to place them back into the text. Detection of a hyphen character will be hereinafter described. In the description which immediately follows, it will be assumed that the right margin is first reached.

When the address in the X1 counter is equal to that of the right-hand margin as indicated by block 319 of FIG. 6(*a*), the operation proceeds through exit block 345 to block 347 of FIG. 6(*c*). At this time, it will be recalled that the contents of the character position at the right-hand margin have just been written into the row 1 storage 57 and that the character previously located immediately to the left of the character at the right-hand margin has been written into the right-hand margin character location. Thus, there is only one character located in the row 1 storage 57 which has not been written back into the row of page storage 53 addressed by the cursor. This character thus contained in the row 1 storage 57 can either be a space character, a blank character, or an alphanumeric character. If it is a blank character, the operation can stop at this point since no significant information will have been displaced from the cursor addressed row of the page storage 53. If the character is a space character, or an alphanumeric character, it is desirous to place that character as the first character of the next line. It should be pointed out at this time that the only time the last character on a line can be a space character is if more than one space character had been previously recorded between words.

In order to check the character located in the row 1 storage 57, as indicated at block 347, the character is specified by the Y2′ and X2 counters is read out into the storage register 71 and then rewritten back into its row storage position to save it. Thereafter, the character in the storage register 71 is checked by the decode circuit 77 to determine whether or not it is a blank character as indicated by block 349. If the character is a blank, the operations of blocks 351, 353, and 355 are effected causing the X2 and Y2′ counters to address the first character position of row 2 storage and to set the row 1 storage clear indicator. If both rows of the row storage are clear, as indicated by block 353, the operation proceeds as indicated at exit block 355 to a cursor advance operation to be described hereinafter with respect to FIG. 7 of the drawings. Basically, the cursor advance operation advances the cursor to the right by one position so that a subsequent character can be keyed as an input character. The above description assumes that the last character displaced from the page storage was a blank character. If, instead, it was a space character or an alphanumeric character, the next operation after that specified by block 349 would be that of block 357 whereupon a test would be made to determine whether the character were a space character.

In the description which follows, it will be assumed that the character thus tested was a space character and, since the only space character that can exist at the end of the line as described above, is one which is to the left of another previously keyed space character which was cleared, it is desirous to move the space character down to the next line. (One and only one space character in a sequence of space characters is cleared when the word immediately to the right of the sequence is bumped to the next line. Single spaces are of course eliminated.) Assuming that a space character is detected, the operation proceeds through the steps indicated by blocks 359, 361, 363 and 365. These operations cause the X and Y counters to advance so that the space character can be placed adjacent to the left margin of the following line and that the thus displaced character can be written into row 2 storage. The operation then proceeds through exit block 367 to block 307 of FIG. 6(*a*) where the characters located in the row of page storage beneath the cursor addressed line are shifted to the right to make room for the space character. This operational sequence continues as has been described, shifting all characters in the newly addressed line to the right by one character position.

A special condition exists when the line that the space character is shifted to contain a paragraph mark. This condition is detected as noted by block 365 which causes the newly found paragraph to be thereafter shifted down by one line and the displaced space character to be stored next to the left margin stop of the vacated line. Since the new paragraph could conceivably contain text in a completely different margin format than that of the cursor addressed line, it is necessary to transfer the entire line of information of the new paragraph to the row storage to insure that all characters within a line are transferred. Thus, when a paragraph mark is detected as indicated by block 365, the paragraph mark indicator in the control unit 31 is set, and the X1 counter is set to the format storage location. This location is one less than the leftmost character position of a row of the page storage 53. These operations are indicated at block 369 of FIG. 6(*c*).

Thereafter, the operations defined by blocks 370 and 371 are effected until all information to the left of the margin of the cursor addressed line including the paragraph mark is transferred to row storage at which time the operation proceeds through exit block 367 to the operation of block 307 of FIG. 6(*a*). As indicated by block 307, the contents of the page storage located at the Y1 and X1 counter locations is read into the storage register and written in the row 2 storage. The character thus read out corresponds to the character that will be replaced by the space character from the previous line. Thereafter, the operation proceeds as before through exit block 323 to block 325 of FIG. 6(*b*).

As has been described, the character located in row storage (in this instance the overflow space character) is written in page storage (in this instance at the left margin location of the line beneath the cursor), the row storage X2 counter is advanced and the operation proceeds through exit block 343 to the operations of block 317 of FIG. 6(*a*). Since the paragraph indicator was set, a check is made as indicated by block 369 to see whether the X1 counter is at the full right margin of the storage thus indicating that the entire first line of the new paragraph has been transferred to row storage. Since the X1 counter is located at the left margin at this time, the operation proceeds to block 321 and then to block 307 thereby writing the character adjacent to the inserted space character into row storage.

The operation then proceeds through exit block 323 to the steps of block 325 whereupon the character in row storage which now corresponds to the first character position beyond the right margin on the cursor addressed line is read and checked to determine if it is a blank. Since, in this instance, it is a blank, the operation proceeds through blocks 372, 373, 375, 377 and 379 to exit block 343. The operations of these blocks specify various cursor location checks and hyphenation checks which will be explained hereafter. Additionally, an L5 indicator is set which will thereafter cause the operation to proceed immediately through exit block 381 to block 317 of FIG. 6(*a*). Thereafter, the characters located on the line containing the paragraph mark are stored in row 2 storage until the entire line of storage containing the paragraph mark is transferred to the row 2 storage. Once the entire line has thus been stored, the compare circuit 75 indicates that the X1 counter has reached the full right-hand margin as indicated by block 382 of FIG. 6(*a*). Thereafter, the operation proceeds to the full line transfer operation denoted by block 383 to be described hereinafter.

Referring once again to FIG. 6(*c*) of the drawings, the operation of the data editing system when in insert mode has been described when the last character of the line in which the insertion is made is a space character or a blank character. Further, the operation has been described when the last such character is a space character and the next line of information contains the beginning of a new paragraph. In the description which follows, it will be assumed that the last character of the line where the insertion is made is an alphanumeric character. When such an alphanumeric character exists at the end of a line, it is necessary to transfer that character and the entire word which it forms a part of to the next line so that the word is neither truncated nor split.

Thus, when the test is made as indicated by block 357 of FIG. 6(*c*) to determine that the character is not a space character, the operation proceeds through the cursor location detection steps of blocks 385, 386 and 387 to the steps of blocks 389 and 391. This operation checks the character located to the left of the alphanumeric character which overflowed the cursor addressed line to determine if it is a hyphen or space character. If it is, the operation proceeds to block 393 where a hyphen character is rewritten and thus left alone and where a space character is cleared. Thereafter, the operations of block 361 are effected and the overflow alphanumeric character is placed on the next line in the same manner described heretofore with respect to a space character. At this point, the last character on the cursor addressed line would either be a hyphen character or a character previously located to the left of a space character.

Assuming that the character located next to the overflow character is not a space or hyphen character the operation proceeds from block 391 to block 395 where the X2 counter is decremented and the character read from page storage is written in row storage. The operations of blocks 396 and 397 cause the previously cleared syllable hyphen address to be checked to determine whether it s necessary to replace the hyphen. This operation will be described later. The operation defined by the blocks 398–400 causes the alphanumeric characters which along with the overflow character form a word, to be transferred to row storage. This operation continues until a valid line ending character (space or hyphen) is reached or until a hyphen address is reached at which time the operation proceeds to the steps of block 361. At this time, the word which overflowed beyond the right margin stop will have been located in the row 1 storage once again and the system will start to process information located on the line below the cursor address. This last word of information located in the row 1 storage will thereafter be transferred from the row 1 storage to the line below the cursor addressed line and the information thus displaced will be transferred to the row 2 storage. Prior to describing the operation of moving an entire word to a new line, a special case involving one word lines will be described.

If the overflow word is longer than the line, the counters continue to decrement as a valid line ending character is sought. When the left margin is reached indicating a one word line, the information in row storage is transferred back to the page storage and the overflow character is put on the next line in the same manner described with respect to a space character. This operation is depicted by blocks 401, 403, and 405.

As described above, entire words are relocated from the end of one line to the beginning of the next when one or more letters within the word advance past the right margin location. Often, the last such letter of a displaced word may be a syllable hyphen or a required hyphen. Further, it is necessary to insert a space character between the displaced word and the first word of the new line. The description which follows will describe the placement of an entire word on a new line.

Referring now to FIG. 6(*b*) of the drawings, the operational steps defined by blocks 325 to 341 have been described and they relate to the placement of characters located in row storage into the page storage location defined by the X1–Y1 counters. As has been described, when it is desirous to place an entire word on a new line, the row storage counters (Y2, X2) address the first characters of the word and the page storage counters (X1, Y1) define the left margin location of the line which will receive the word. The operation thus proceeds through the steps of blocks 325 to 341 to effect the placement of the word located in row storage into page storage and through the operations described in FIG. 6(*a*) to effect the placement of displaced characters into the opposite row of row storage until the last character of the word to be inserted is reached. The last such character may be either an alphanumeric character, a syllable hyphen, or a required hyphen. If it is an alphanumeric character, a space character must be inserted after it to separate the inserted word from the word which was previously adjacent to the left margin of the line receiving the inserted word. If the last character is a syllable hyphen, it must be deleted thereby joining together the two syllables. If the last character is a required hyphen, it must be placed adjacent to the word or syllable which was previously adjacent to the left margin.

When the last character of a word is to be placed on a new line is an alphanumeric character, it is placed on the new line of page storage in the same manner as the other characters preceding it, no special indicators being set. If it is a hyphen character, the corresponding indicator is set as noted by blocks 333 and 335. Thereafter, the next character position in row storage will be read as noted by block 325 and it will always be blank. This is because each character of page storage is transferred to the identical horizontal position in row storage. Thus, the character position in row storage adjacent to the last character is a row is always blank and the operation then proceeds to block 372. Since a new paragraph has not been entered, the steps of blocks 407 and 409 are effected whereupon the Y2' and X2 row storage counters are changed to address the first character in the other row of row storage, the indicator is set indicating that all of the characters in the row have been transferred, and, since it is assumed that there are displaced words on the line of page storage receiving the inserted word, the steps of blocks 411, 412, and 413 are next effected.

As indicated by block 411, if the syllable hyphen and required hyphen indicators are not set, a space is generated by the control unit and is written at the Y1, X1 address which is located at the character position immediately to the right of the last character of the inserted word. As indicated by block 412, if the required hyphen indicator is set, one is subtracted from the X1 counter. The operation thereafter proceeds through exit block 343 to the operational steps which cause the character previously located adjacent to the left margin to be inserted next to the required hyphen character. As indicated by block 413, if the syllable hyphen indicator is on, the syllable hyphen is cleared and one is thereafter subtracted from the X1 counter, thus causing the character previously located adjacent to the left margin to be written immediately to the right of the last character of the inserted word.

A further operation indicated by block 413 is the storage of the X1 address of the now cleared hyphen. This address is used in conjunction with the steps defined by blocks 396 and 397 of FIG. 6(*c*) to cause the hyphen to be replaced in its original location if the remainder of the word to the right of the previous hyphen location overflows the new line.

The movement of letters and words to subsequent lines continues line by line down the page until a paragraph mark is detected. The operation then proceeds as has been described by transferring a line at a time down the page until a page end indication is detected. When the page end is detected, the last line which overflows into the row storage is cleared. Thus, the last line is effectively removed from the storage unit 9.

Summarizing the operation thus far, it has been described how a character is keyed when in insert mode and the keyed character is inserted at the location addressed by the cursor. Thereafter, all characters to the right of the keyed character are shifted to the right and, if a blank character exists within the line of the cursor addressed line, the operation stops awaiting the keying of the next character. If, as has been described, the rightmost character of the cursor addressed line is a space character or a data character, the space character or data character is placed on the next line below the cursor addressed line and the operation proceeds in the same manner, shifting all characters in that line to the right to thus compensate for the newly inserted characters. This operation continues line for line down the page until a paragraph mark is detected or until no words are pushed off of a line (detected by detecting blanks at the right margin). If a paragraph mark is detected, the information located in the paragraph defined by the paragraph mark is shifted down page by one line, and any remaining information located in the paragraph addressed by the cursor is placed on the thus vacated line. If the alphabetic character located at the end of the line forms a part of a word, the entire word is shifted to the new line. As words are thus shifted to new lines and the operation proceeds down page, more than one word may overflow thus necessitating the shifting of more than one word to a new line. Once the shifting process ceases, the cursor address is incremented by one and the operator may thereafter depress another character key button and the character thus inserted will be placed immediately to the right of the character previously keyed. Thus, words, phrases and entire sentences can be inserted into previous text. As the keyboarding thus proceeds, the cursor advances toward the right-hand margin.

In the description which follows, the operation of the cursor as it advances across the line and is thereafter shifted to the next line will be described. When the cursor addresses the last word of a line and when the last word overflows the line, that portion of the word located to the right of the cursor is shifted to the next line as though the cursor were defining a space position. This operation is effected by block 387 of FIG. 6(*c*). Thus, as the cursor approaches the right-hand margin, any word existing between the cursor and the right-hand margin which overflows is put onto the next line.

As has been described heretofore, a cursor advance operation is initiated whenever it is detected that both rows of row storage are clear. This test for row storage being clear is indicated by block 353 of FIG. 6(*c*) and block 409 of FIG. 6(*b*). In either instance, once row storage is clear, the cursor is advanced by one position awaiting the keying of the next character. Referring now to FIG. 7 of the drawings, the cursor advance operation is depicted. As indicated by blocks 425 to 431, the cursor position is read from the cursor position counters and is placed in the Y1 and X1 counters. Thereafter, if the cursor is not at the right-hand margin, the X1 counter is incremented by one position and then, as indicated by block 433, the new cursor location is stored in the cursor position counters. At this time, the system awaits the keying of the next character.

A special circumstance exists when the cursor reaches the right margin. When this is detected, as denoted by block 429, the L1 indicator is set as denoted by block 435 and the present cursor location adjacent to the right-hand margin is retained in the cursor position counters.

Thereafter, if a character or space character is keyed, it will be necessary to move the cursor location to the next line and effect the insertion of the just keyed character into that line as the first character of that line. Additionally, if the just-keyed character is an alphanumeric character, the preceding characters with which it forms a word should also be moved to the next line along with it. Referring now to FIG. 6(*a*) of the drawings, when the newly keyed character is keyed, the initial conditions as heretofore described and indicated by the start block 301 are effected. However, the operation thereafter differs since the L1 indicator is detected as depicted by block 305. The operations thereafter effected are specified by block 437 which include the writing of the just-keyed character into row storage and setting of the storage register entered latch. The operation specified by block 347 of FIG. 6(*c*) is next effected so that the just-keyed character is checked as indicated at block 357 to determine whether it is a space character. If this character is a space character, it is desirous to remove it, and set the cursor address at the left margin location. Therefore, assuming that the just-keyed character is a space character, the operational steps of blocks 359, 351, 353 are effected and the next operations specified by the exit to the exit block 355 are those of blocks 438, 439, 441, and 443 of FIG. 7. These operations effect the storage of the new cursor location adjacent to the left-hand margin of the newly addressed line. Additionally, the L2 indicator is set as denoted by block 443.

Referring once again to FIG. 6(*c*) of the drawings, if the newly keyed character was not a space character as indicated by block 357, the next operation would be that of the block 385 whereupon it would be detected that the L1 indicator was on. Next, a latch is set indicating that the cursor address should be stored as denoted by block 445. The space or hyphen character located nearest to the right-hand margin is then defined as has been heretofore described. Once this character is found, all of the characters to the right of it are shifted down to the next line along with the just inserted character in a manner similar to that described above. The character in row storage located immediately to the right of the just inserted character is a blank since the just inserted character location in row storage is at the right-hand margin. Thus, the operation proceeds through block 409 of FIG. 6(*b*) to sample the SCA indicator which has been set as depicted in block 450 if both rows of row storage are clear. If both rows are not clear, the SCA indicator is sampled as depicted in block 377. In either instance, as denoted by blocks 451 and 452, the cursor position is defined as the contents of the Y1 counter and one less than the contents of the XI counter. Thereafter, once all of the characters are shifted down page, the operation proceeds through one of the exit blocks labeled "F" to the cursor advance operation depicted in FIG. 7.

Referring now to FIG. 7, it will be recalled that the L3 indicator is set whenever it is necessary to move the cursor to the next line along with a portion of a word. This indicator prevents the cursor from being redefined at the left margin and thus, since the indicator is on, the operation proceeds from block 439 to block 429 whereupon the cursor is incremented by one to await the keying of the next character.

It will further be recalled that the L2 indicator is set as denoted by block 443 whenever the cursor position addresses the left-hand margin location of a new line. This indicator prevents information from being keyed into a new paragraph after the automatic placement of the cursor at the start of a new line.

Referring now to FIG. 6(*a*) of the drawings, once a new character is keyed, the L2 indicator is checked as denoted by block 303. Since this indicator would be on, the operation proceeds to block 363 of FIG. 6(*c*) whereupon the format storage is checked to determine whether or not a paragraph mark exists. If no such paragraph mark exists, the operation proceeds through exit block 367 to block 307 of FIG. 6(*a*) in a normal manner. If, however, a paragraph mark is detected, the operation proceeds through block 369 in the manner heretofore described thus insuring that all information within the line containing the paragraph mark is transferred to row storage so that it may thereafter be shifted down by one line position.

2. Replace Mode

A further text content control operation is the replacement of stored data characters with keyed data characters. This operation is effected by depressing a "replace" key on the function keyboard 17C of FIG. 2. This signifies to the device that the character to be keyed on the data keyboard 15 is to replace the character located adjacent to the cursor. Thereafter, the cursor will be incremented by one position to the right and the operation continues until the right margin is reached. If further characters are keyed, all characters to the right of the last space character along with the keyed character are transferred to the next line of storage and hence to the next line of display. If the next such line contains no new paragraph, the information previously occupying that portion of the line now containing a partial or full word is destroyed. If, however, the line contained a paragraph mark indication, the entire paragraph is shifted by one line in a downward direction. Since the replace mode of operation is similar in many major respects to the insert mode of operation heretofore described, reference will be made to FIGS. 6(*b*) and 6(*c*) and FIG. 7, as well as to FIG. 8 in the detailed description of the replace mode operation which follows.

Referring now to FIG. 8 of the drawings, a state diagram depicting the replace mode operation is depicted. When the operator depresses a character key button in replace mode, various internal latches are reset as indicated by block 501 and as discussed heretofore with respect to block 301 in the description relating the insert mode operation. Thereafter, as indicated by blocks 503 and 505, the L2 and L1 indicators are sampled to see whether the cursor has advanced to the rightmost position in a line. Assuming that the cursor is addressing a character in the middle of the line, the operation proceeds to block 507 and since no paragraph indication has yet been found, proceeds to block 509 whereupon the character at the cursor location is read from page storage and written in a cleared predefined buffer location in the working storage. This location is denoted by the address Y3, X3. In this manner, the character which is to be replaced is temporarily stored in case it is thereafter needed. The next operation effected is that of block 511 and since the storage resistor has not been entered, the register contents are written at the cursor location, Y1 X1, in page storage as denoted by block 513. As this time, the character previously located in the input storage register 65 of FIG. 3 has been written in the page storage 53 at the location defined by the cursor. Thereafter, the operations of block 515 which indicates that a paragraph mark has not been found and block 517 are effected, then the cursor advance operation of FIG. 7 as denoted by the exit block 519 is effected. As as been described heretofore with respect to FIG. 7, the cursor advance operation causes the X1 counter to increment by one and thus advance the cursor across the page by one character position. Thereafter, the device awaits the keying of another character.

In the description which follows, it will be assumed that the cursor has advanced to the right margin location thereby causing the L1 indicator to be set during the previous operation. Thereafter, when the operator keys a character, the operation proceeds from block 505 to block 521 whereupon the character in the input register is stored in row storage. Thereafter, the operation proceeds through exit block 523, to block 347 of FIG. 6(*c*). The character just keyed can either be a space character or an alphanumeric character. If it is a space character, the steps of blocks 357 and 359 and then blocks 351, 353 are effected. This operation merely causes the space character to be deleted and the row storage addresses to be updated. Thereafter, the cursor advance operation of FIG. 7 is effected as denoted by exit block 355. The L2 indicator is set by the cursor advance operation and the operation with respect to the L2 indicator is identical to that described heretofore with respect to the insert mode operation.

If the character which is keyed in replace mode is an alphanumeric character, the operation proceeds from block 357 of FIG. 6(*c*) to block 385 and thence to block 445. This operation causes the cursor address to be stored, and, thereafter, the operation proceeds to block 389. The operations that follow thereafter are identical to that described with respect to insert mode and cause all alphanumeric characters located between the just-keyed character and the last space or hyphen character on the line to be transferred to row storage. Once this operation is complete, the operations defined by block 393 and blocks 361, 363, and 365 are effected. These operations cause the X1 and Y1 counters to advance to the left margin location of the line beneath the cursor, and to check that line to see whether it contains a paragraph mark. If it contains no paragraph mark, the operation proceeds through exit block 367 to blocks 507, 509, and 511 of FIG. 8. Thereafter, the operation proceeds through exit block 525 of FIG. 8 to block 325 of FIG. 6(*b*). This operation, which has also been described with respect to the insert mode of operation causes the first character of the now displaced word to be read as denoted in block 325 and thereafter written in page storage as denoted by block 341. The operation then proceeds through exit block 343 to block 515 of FIG. 8 and thereafter through blocks 517, 527 and 529. In this manner, the characters located in row storage are transferred to the new line of page storage located beneath the cursor addressed line and the characters previously occupying those positions in page storage are deleted. Eventually, all of the characters on the cursor addressed line which were placed in the row storage will have been thus transferred to the new line and the operation proceeds from block 327 of FIG. 6(*b*) to block 409 of FIG. 6(—*b*). At this time, an indication that the row storages are clear will be provided. Since an extra character read cycle will have been taken at this time, it is necessary to recall the character written in working storage and place it back at the Y1, X1 address. This operation occurs between blocks 409 and 450. Thereafter, the cursor advance operation described with respect to FIG. 7 is effected.

Referring once again to FIG. 8, one further condition that can exist is that if the new line which will receive the word from the cursor addressed line contains a paragraph mark, the operation will proceed from block 507 to block 531 whereupon the information located in the line beneath the cursor containing the paragraph mark is written into row storage. Thereafter, when the entire line has thus been transferred to row storage, an indication is provided as indicated by block 533 which causes the operation to proceed to the full line transfer operation of block 383 described heretofore with respect to the insert mode operation. In this manner, the just-keyed letter located on the cursor addressed line is transfered to the next line and the information on the next line which contained a paragraph mark is shifted down page by one line and each line thereafter is shifted in a similar manner down page.

3. Delete Mode

Referring now to FIG. 9 of the drawings, a state diagram of the operation of the data composer, editing, and formatting system shown in FIG. 3 when operating in delete mode is depicted. When the operator depresses the "delete" key on the function keyboard 17, he is signifying to the machine that characters thereafter addressed by the cursor should be deleted and replaced with blank characters. The delete mode of operation operates in conjunction with cursor right and cursor down logic of FIGS. 4(*a*) and 4(*b*) so that deletion is effected a character at a time or a line at a time going respectively, from left to right and from up to down on the page. Rapid motion controls operated in conjunction with the cursor causes complete lines to be rapidly deleted. Thereafter, when the operator releases the "delete" key, automatic closure of the text is effected. A description of the closure mode of operation follows the present description.

When the operator depresses the "delete" key, as indicated by start block 550, the cursor address is loaded into the X1 and Y1 counters as denoted by block 551 and, thereafter, a check is made to see whether the "close to" address has been stored as indicated by block 553. Since the "close to" address has not previously been stored, the operation of block 555 is effected whereupon the address of the cursor is stored in working storage for later utilization in the close mode operation to be described hereinafter. Thereafter, the operation of block 557 is effected whereupon the contents of page storage located at the cursor address are read. Since the delete key is depressed, the operation proceeds through block 559 to block 561 where a blank character is written at the cursor address. Thereafter, as indicated by block 563, a check is made to determine whether the cursor is at the right margin. If the cursor position is not at the right margin, the X1 counter is incremented by one as denoted by block 565 and thereafter a check is made to determined whether the cursor down button has been depressed as indicated by block 567. If the cursor down button has not been depressed, this indicates that the cursor right button has been depressed. Therefore the steps of block 569 are effected to determine whether the rapid motion key has been depressed. If the rapid motion key has not been depressed, a nonrepeat latch is set as indicated by block 571, a test is made for output overlap noted in block 572 and the new cursor address is stored in the cursor counters as indicated by block 573. Thereafter, the operation proceeds to block 575 where the nonrepeat indicator is tested. Since the nonrepeat indicator was set, the operation stops awaiting the keying of the next character. If a flag bit is detected at the format storage position as noted by block 569, the cursor address is prevented from being updated as noted by block 578. The flag bit indicates that an output operation is in progress and will be discussed hereinafter.

The above description assumes that the cursor right key button was depressed and that the rapid motion key button was not depressed. If the cursor down key button was depressed, the operation would proceed from block 567 to block 557 and continue in a loop until the right margin was reached, at which time block 563 would provide an indication causing the operation to proceed to block 579. If the cursor was not addressing the last line of storage in page storage, the operation proceeds to block 581 whereupon the cursor position as denoted by the X1 and Y1 counters is incremented one line down page and set to the left margin. Thereafter, the operation proceeds to block 569 and eventually to stop block 577 if the rapid motion key is not depressed.

Whenever the rapid motion is depressed, the operation proceeds from block 569 to block 583 where a check is made to determine whether the cursor down key has been depressed. If the cursor down key has not been depressed, and if the X1 counter has not yet reached the right margin, the contents of the Y1, X1 counters are stored as the new cursor address. Since the nonrepeat latch was not set, the next character is read as indicated by blocks 551, 553, and 557. Thereafter, the operation proceeds in a manner described heretofore until the right margin is reached as indicated by block 585. The nonrepeat latch as indicated by block 571 is then set and the operation stops as indicated by the stop block 577. At this time, the characters between the original cursor position and the active right margin will have been deleted.

If the rapid motion key and the cursor down key are depressed, the operation proceeds from block 569 to block 583 and thence to block 587 whereupon the format storage of the new line position of the cursor is read. If a paragraph mark is found as denoted by block 589, the nonrepeat latch is set as denoted in block 571 thereby preventing the cursor from moving down into the new paragraph. If a paragraph mark is not found, the nonrepeat latch is not set and the cursor continues to move from left to right across the line and then down to the next line until a paragraph mark is detected.

Once the operation reaches a stop condition as denoted by block 577, the operator must thereafter release and depress a cursor control key to effect further deletion or release the "-delete" key which effects closure of the text automatically.

An additional operation that can be performed which is similar to the delete operation described above is the deletion of underscore characters from page storage. When the delete underscore key button is depressed, the operation proceeds from block 557 to block 591 and thence to block 593 whereupon the character read from the cursor location containing an underscore is written back in without the underscore mark. In a similar manner, when the "underscore" key is depressed, the operation of block 595 and block 597 is effected whereupon the character read from the cursor position is rewritten with an underscore notation. This operation will be referred to hereinafter in the description relating to text modification.

4. Closure Mode

Referring now to FIG. 10(*a*) of the drawings, a state diagram of the sequence of operations performed by the data editing and formatting system of the present invention as depicted in FIG. 3 when operating in the closure mode is depicted. The closure mode of operation is utilized when the operator desires to move text from a down page location to an up page location, all text located between the two locations being destroyed. In the above description relating to the delete mode of operation, it was described how blanks were inserted in place of character information It was further mentioned that when the operator releases the delete key when in that mode of operation, automatic closure of the text is effected. That is, the text is automatically closed after a delete operation so that blanks no longer remain. Thus, the closure mode of operation complements the delete mode of operation. Sometimes it is desirous to close text by identifying the up page location (referred to hereinafter as the "to here" address) and thereafter identifying the down page location (referred to hereinafter as the "from here" address) and thereafter effecting closure of the text together, deleting all characters located intermediate to the "to here" location and the "from here" location without utilizing the delete mode of operation. This type of operation is effected by positioning the cursor to the up page location and thereafter depressing the "to here" key on the control keyboard 17D of FIG. 2 and thereafter positioning the cursor to the down page location and depressing the "close" key on the control keyboard 17C of FIG. 2. When this operation occurs, the text located at the "from here" address is caused to be shifted so that it is adjacent to the "to here" address. When effecting this operation, it is necessary that words are not split or truncated and that hyphenation symbols be properly maintained or deleted as necessitated within the newly composed text. In this manner, the operation is similar to the insert mode of operation previously described.

In the description which follows, three major operational loops within the operation will be described. In the first operational loop to be described, the character located at the down page location ("from here" address) is shifted to the up page location ("to here" address) and the address counters defining these locations are incremented by one. Thereafter, the next character is shifted up and the operation continues across the page until the "to here" address equals the right margin or until the "from here" address equals the right margin. Whenever the "to here" address equals the right margin, a second operational loop is entered which insures that the word located adjacent to the right-hand margin is not split or truncated, but instead, is shifted to the next line of text. Whenever the "from here" address equals the right margin, it is necessary to insure that a space character is inserted at the "to here" address and, thereafter, the "from here" address proceeds to the next line of storage to read the next character or words. This operation is described in the third operational loop. Special circumstances such as finding a paragraph mark, a syllable hyphen, or a required hyphen at the end of a line are handled within the three basic operational loops.

Referring now to FIG. 10(*a*) of the drawings, when the operator depresses the "close" key, or when the operator releases the "delete" key as described in delete mode, the closure operation is started as denoted by the start block 701. At this time, the cursor address (located adjacent to the "from here" location) is placed in the Y2 and X2 counters. The "to here" address, which was stored in a predesignated register of working storage is placed in the Y1 and X1 counters. Thereafter, the Y1, X1 address is stored in the cursor position counters as the cursor address to be utilized after the operation is complete. The operation then proceeds to the step of block 703 where a check is made to insure that the "to here" address does not equal the "from here" address. The operation stops as noted by block 704 if these addresses are equal, since the text would already be closed. If the addresses are not equal, the character in page storage located at the "to here" (Y1, X1) address is read as denoted by block 705. Thereafter, the blank character indicator L10 is reset at block 706 and then a test is made as indicated by block 707 to determine whether the "from here" location has proceeded beyond the right margin. Since this condition cannot exist when the first character is to be transferred, the sequence continues to block 708 to check for a hyphen key operation to be described and then to block 709 whereupon a character is read from the "-from here" address. As noted, a corresponding indicator is set if the character thus read from the "from here" location is blank, if it is an alphanumeric character, if it is a required hyphen, or if it is a syllable hyphen. Thereafter, the sequence proceeds to block 711 where the indicator denoting that the "to here" address has proceeded beyond the right margin is sampled. Since this indicator cannot be set during the first character operation, the sequence continues to block 713 where the character read from the "from here" address is written into the "to here" location. If this character is a syllable hyphen, it is cleared, no character being written and the syllable hyphen address is stored in case it is necessary to thereafter reinsert the syllable hyphen at the "to here" location. Thereafter, the operation proceeds to block 715 where a check is made to determine whether the X2 counter has reached the right margin location. If it has not reached the right margin location, the operation proceeds to the step of block 717 where the X2 counter is incremented and thereafter to block 718 to check for a margin adjust operation and then to block 719 where the X1 counter is checked to determine whether it has reached the right margin position.

If the X1 counter has not reached the right margin position, a check is made as indicated by block 721 to determine whether the L10 indicator indicating that blank character was read from the "from here" location or the syllable hyphen indicator indicating that a syllable hyphen read and cleared from the "from here" location has been set. In either instance, the sequence proceeds directly to block 723 thereby insuring that the X1 counter is not incremented. In this manner, blank characters encountered at the "from here" location are not stored at the "to here" location. If the L10 indicator and syllable hyphen indicator are both off, the operation proceeds to block 725 whereupon the X1 counter is incremented by 1 and thereafter proceeds to block 723.

In this manner, the operation proceeds so that the next character read from the now incremented "from here" location is stored at a position adjacent to the character stored in the "to here" location. As indicated by block 723, a test is made to determine whether the X1 counter has reached the right margin. If the X1 counter had not reached the right margin, the character located at the address defined by the now incremented X1 counter and the Y1 counter is read from page storage as denoted by block 705. The sequence continues in this operational loop sequentially placing all alphanumeric characters located to the right of the "from here" address in that row of page storage to locations to the right of the "to here" address in that row of page storage. Blank characters at the "from here" and syllable hyphens at the "from here" address are not stored in the "to here" address location. Eventually, either the X2 counter or the X1 counter will reach the right-hand margin.

In the description which follows, it will be assumed that the X1 counter reaches the right margin and, when this even occurs, as noted by block 719, the operation proceeds to block 727 whereupon the L7 indicator is set. When the L7 indicator is set, the operation proceeds from block 723 to blocks 706 and 707 and thereafter to block 709 where the character located at the "from here" address is read in the normal manner. Thereafter, the operation proceeds from block 711 to block 729 where the L10 indicator is sampled to determine whether the character read from the "from here" address is a blank character. If it is a blank character, the operation proceeds to block 713 and through the previously described operations whereby the "from here" address is incremented. Thereafter, the next character from the "from here" address is read and tested to see whether it is a blank character. When an alphanumeric character is thus found as indicated by block 729, the operation proceeds to block 731 where the character is tested to determine whether it is a space character or not.

If a space character is detected as denoted by block 731, the space is cleared as denoted by block 733 and thereafter the X1 counter is set to the left margin location, the Y1 counter is incremented by 1, and the L10 and L9 indicators are set on as denoted by block 735. In this manner, the "to here" address advances to the left margin location on the next line of page storage. The L10 indicator is set to prevent the X1 counter from thereafter advancing as noted in block 725 and the operation proceeds as noted in block 737 to check whether the "to here" address is the same as the "from here" address. If these addresses are equal, the operation stops, as noted by stop block 739. Assuming that the addresses are not equal, the operation proceeds to block 715 and continues through the first operational loop described until the X2 counter reaches the right margin location.

If the character read from the "from here" address is neither a blank character, as indicated by block 729, nor a space character as indicated by block 731, the operation proceeds to block 740 whereupon the character is tested to determine whether the hyphen operation preceded the close operation and whether the character is a syllable hyphen, and, if not, the character is rewritten at the "from here" address as noted by block 741. Thereafter, the operation proceeds through exit block 743 to a "word around" operation depicted in FIG. 10(*b*) of the drawings.

Referring now to FIG. 10(*b*) of the drawings, the system operation is depicted wherein it is insured that no words are truncated or broken when it is necessary to increment the "to here" address to the next line of storage. This operation effectively backs up the "to here" address to the last space character on a line and, at the same time, causes the information to the right of the space character to be once again stored at the "from here" address. Thereafter, the "to here" address is incremented to the next line and the information is again read from the "from here" address to the new line location of the "to here" address.

Thus, as the operation proceeds from the exit block 743 of FIG. 10(*a*) to block 745 of FIG. 10(*b*), a check is made to determine whether the X2 counter and hence the "from here" address is at the left margin location. If it is not, the X2 counter is decremented by 1 as indicated by block 747 and thereafter the character at the "to here" address is read as indicated by block 749. If the character thus read is not a space, it is checked as indicated by block 753 to determine whether it is a required hyphen and, thereafter, a check is made as indicated by block 755 to determine whether a syllable hyphen address previously stored has been reached. Assuming that none of these conditions are met, the character thus read from the "to here" address is written at the "from here" address, and the "to here" address is decremented by 1 as depicted in block 757. The operation specified by block 745 is then again effected and, in this manner, the sequence causes the last word located adjacent to the right margin of the line containing the "to here" address to be transferred to the "from here" address. Both addresses are decremented until the entire word is transferred. The word ending is indicated by block 751, 753, or 755. If the word ending character is a space character, the space character is cleared as specified by block 759 and the operation proceeds to the exit block 761. If a required hyphen is detected as the word ending character, it is rewritten at the "to here" address as denoted by block 763. If the syllable hyphen address is detected as indicated by block 755, this indicates that a syllable hyphen previously existed within the word and the operation automatically thereafter replaces the syllable hyphen at its proper location as indicated by blocks 765 and 767. Thereafter, the operation proceeds through exit block 761 to block 735 of FIG. 10(*a*). Referring now to FIG. 10(*a*), it can be seen that once the entire word is transferred from the "to here" address to the "from here" address, the "to here" address is incremented to the new line position and thereafter the steps of the main operational loop starting at block 715 are effected.

The above description has related to the second loop which is entered when the "to here" address reaches the right margin position. When this event occurs, the character brought up from the "from here" address can be a blank, a space, or an alphanumeric character. As has just been described, if it is an alphanumeric character, the entire word of which it forms a part located to the left of it at the "to here" line of page storage is transferred back to the "from here" line of page storage and thereafter, placed on the next successive line following the "to here" addressed line. Thereafter, the operation proceeds to the first loop described until the "from here" address reaches the right-hand margin. At this time, as noted in block 715, the operation proceeds to block 768 whereupon the L6 indicator is set. Thereafter, the operations of the first loop described are effected until block 707 is reached. Block 707 indicates that the right margin has previously been reached and therefore the X2 counter is set equal to the format storage and the Y2 counter is incremented by 1. This operation is noted in block 769. In this manner, the "from here" address advances to the next line of storage. Thereafter, a test is made as indicated by block 770 to determine whether a paragraph mark exists in the format storage location of the newly addressed line. If a paragraph mark does not exist, the operation proceeds to block 771 where a space character is inserted into the storage register 71 of FIG. 3, if the last character read, as indicated by the L8 indicator, was an alphanumeric character other than a required hyphen or syllable hyphen. If the last character thus read was a required hyphen, a syllable hyphen, a space character, or a blank character, the L10 indicator is set thus indicating that a space character should not be stored at the "to here" address. Additionally, a blank is loaded into the storage register 71. Thereafter, the L6, L8 required hyphen and syllable hyphen indicators are reset and the operation proceeds to block 711. Assuming that the right margin of the "to here" address had not been reached, the L7 indicator would be off and therefore the contents of the storage register would be written at the "to here" location defined by the Y1, X1 counter as indicated by block 713. In this manner, a space character is inserted whenever the "from here" address advances from one line to another. (This operation replaces a carrier return with a space character.) Thereafter, the first operational loop is entered, the "from here" address having been incremented by one line.

If a paragraph mark is detected when the "from here" address is incremented to the next line, the operation proceeds from block 770 to exit block 772 and thence to block 773 of FIG. 10(*b*). At this time, a test is made to determine whether the L9 indicator is on and, if it is not on, the X1 counter is set at the left margin location and the Y1 counter is incremented by one position as denoted by block 775. Thereafter, the Y1, X1 address is compared with the Y2, X2 address as denoted in block 777 and, if they are equal, the operation stops as denoted by stop block 779, If they are not equal, the operation proceeds to a full line transfer routine described with respect to the insert mode and dented by block 781. If the L9 indicator is on indicating that the X1 counter has just been set to the left margin stop, the operation proceeds directly to the full line transfer operation as denoted in block 781. Thus, when a new paragraph is found at the "from here" address, the "to here" address is set to a new line (unless it had just been set there) and the paragraph is transferred on a line for line basis to the new line and the lines following it. It is important to further note that the full line transfer is effected only if no text characters exist on the line above the paragraph mark. Thus, prior to effecting the full line transfer operation, the content of the line above the paragraph mark is checked between the full left and right stops for character information. If a data character is found, the operation stops. If no data character is found, the next prior line is checked and so on until data is found. Thereafter, transfer of the line containing the paragraph mark to the topmost blank line is effected E. Text Modification Control The foregoing description has related to the operation of the data composing, editing and formatting system of the present invention when varying the content of the text information stored in the storage unit 9 of FIG. 1. As has been heretofore described, it is often desirous to modify the text confirmation and order once its content has been ascertained. Once the text confirmation and order is achieved, one may thereafter desire to change the text content. Thus, the text content controls described in the preceding section and the text modification controls to be described in this section are used interchangeably by the operator in order to achieve the desired final document.

As has been described, there are five text modification controls: underscore, center, hyphenation, transfer line and margin adjust. The underscoring control is utilized to effect underscoring of text items and to remove such underscoring. This control may be effected a letter at a time, a word at a time, a line at a time, or a paragraph at a time. The centering control is utilized to automatically center stored text about the column which is located midway between the activated margins. Hyphenation control is utilized to automatically split words at locations designated by the operator to thereby effect a more even right-hand margin. Transfer line control is utilized to transfer lines of text and whole paragraphs of text from one location to another location within a page. The margin adjust control is utilized to change existing margins and to thereafter effect the automatic conformation of the text within the newly defined margins. This control can be effected a line at a time or a paragraph at a time.

In the description which follows, each of the text modification controls will be described.

1. Underscore Control

Referring now to FIG. 2 of the drawings, when the operator desires to underscore a word or line of text, the cursor is placed adjacent to the first character of the text to be underscored manipulating the cursor motion controls of the function keyboard 17*a*. Next, the "underscore" key is depressed signifying that an underscore operation is to be effected. Thereafter, the operator depresses either the cursor right or cursor down key button on the function keyboard 17A. As the cursor moves across the page or down the page, underscoring of words and lines, respectively, is effected.

Referring now to FIG. 9 of the drawings, the operation of the controls which effect the underscoring operation have been described with respect to the delete operation. Briefly recapitulating this operation, when the operator depresses the "underscore" key and thereafter depresses the cursor right or cursor down key, the character addressed by the cursor is read from the page storage unit as indicated by block 557 and then is rewritten as indicated by block 597 with an underscore. Thereafter, a test is made to determine whether the right margin has been reached and, if it has not been reached, the cursor is moved to the right. Thereafter, a test is made to determine whether the cursor down key was depressed or whether the rapid motion indicator was on. In either event, the entire line located to the right of the initial position of the cursor is underscored. If the cursor down and rapid motion operation is designated, the entire paragraph is underscored. Underscores are deleted in the same manner.

2. Center Control

When the operator desires to center a line of text about the column located midway between the active margin stops, the operator manipulates the cursor motion control keys on the function keyboard 17A to place the cursor at the desired line location. Thereafter, the "center" key on the function keyboard 17D is depressed.

Referring now to FIG. 11 of the drawings, the operation effected by the system when the "center" key is depressed is depicted. Depression of this key is indicated by the start block 801 and causes the left margin stop location of the addressed line to be gated into the X1 counter, the line address of the cursor addressed line to be gated into the Y1 counter, and the line address of row storage to be gated into the Y2 counter. Thereafter, the operation proceeds through four major operational loops, 803, 805, 807, and 809. The operational loop defined by the blocks within loop 803 causes the number of spaces and blanks between the left margin and the first text character to be counted. The number of such spaces and blanks is stored in a register in working storage denoted as "-CI." When the first text character is detected, the operation proceeds to block 811 whereupon the X1 counter is set equal to the right margin stop. Thereafter, the number of spaces and blanks located between the right-hand margin and the last text character on a line is counted and stored in a register denoted as "C2" under the control the operational loop 805.

The operational loop 807 is next effected whereupon the entire line of text located between the margins of the cursor addressed line is transferred to row storage. Thereafter, the operation proceeds to block 813 of the operational loop 809. At this time, the X1 and X2 counters are set equal to the left margin stop of the cursor addressed line. Thereafter, the X2 counter is incremented by a number of times equal to the count in the C1 counter. A count equal to the sum of the count in the C1 and C2 counters divided by 2 plus the count of the left margin located is loaded into the X1 counter. At this time, the X2 counter will be addressing the first letter of text in row storage while the X1 counter addresses the position that will contain the first character of text of the centered line. Thereafter, the text characters in the row storage locations are sequentially transferred to adjacent positions of the page storage. In this manner, the line of page storage addressed by the cursor will be centered within the existing margins. The operation stops as noted by block 815 when an entire line has been transferred or as denoted by block 816, if no text characters existed on the line to be centered.

3. Hyphen Control

The hyphen controls are utilized by the operator when it is desirous to shift a portion of a word located adjacent to the left margin of a line to the line immediately above it so that it will form the last portion of text on the line immediately above it. Since all of the text content control operations allow only full words or syllables which have been defined with hyphens to be placed on a new line and since all such operations optimize the number of words that can be placed on a line, hyphen control is necessitated only when the first word of a line is relatively long compared with the margin settings or when the operator desires to remove undesirable appearing rivers and bays formed by vertical lines of space characters.

In operation, the operator effects the placement of the cursor adjacent to a character location within the first word of a line. Thereafter, the operator depresses the "hyphen" key on the function keyboard 17D and all of the characters located to the left of the cursor character are placed on the preceding line. Additionally, a hyphen character is placed on the preceding line as the last character of that line and a space character is placed to the left of the shifted syllables. Thereafter, the character identified by the cursor and all characters following it in the cursor addressed line are shifted to the left so that the character identified by the cursor is located adjacent to the left margin position. By thus shifting the characters in the cursor addressed line, there may be room for the first word(s) in the line following the cursor addressed line. In this instance, the first word(s) of the line following the cursor addressed line may be shifted to the cursor addressed line with subsequent information on following lines being shifted up page. This operation is identical to the operation described with respect to the closure mode of operation in the preceding text content control section description.

If the syllable(s) identified by the operator in the word desired to be shifted to the preceding line do not fit on the preceding line, the text remains as displayed, there being no shifting operation effected by the depression of the hyphen key. Thus, syllable splitting and hyphenation is effected only when the syllable and the hyphen mark fit on the preceding line within the defined margins. Additionally, if the word to be hyphenated had previously been hyphenated, the previous hyphen is removed.

Referring now to FIG. 12 of the drawings, the hyphenation operation is depicted. When the operator depresses the "-hyphen" key, the Y1 and Y2 counters are set equal to the cursor vertical position, the X2 counter is set equal to the cursor horizontal position, and the X1 counter is set equal to the right margin stop location. These operations are denoted generally by the start block 825. Thereafter, as denoted by block 827, a test is made to insure that the cursor is not addressing the top line of the page. The Y counters are then decremented by 1 as denoted by block 829 so that they then address the line above the cursor. Thereafter, as denoted by block 831, the character position located adjacent to the right-hand margin of the line above the cursor is read and rewritten. This character is tested to determine whether it is an alphanumeric character or a blank character. If it is a blank character, the line full indicator is reset as indicated by block 833 and the X1 counter is decremented by 1. Thereafter, the operation proceeds again to block 831 where the character position defined by the now decremented X1 counter is read. This operation proceeds, with the X1 counter being decremented until an alphanumeric character is read. Once an alphanumeric character is read, it is tested as noted by block 835 to determine whether or not it is a syllable hyphen. If it is not a syllable hyphen, the L8 latch is set which controls forcing a space in the closure operation as noted by block 836. If the character is a syllable hyphen, it indicates that the word which the operator is attempting to hyphenate has previously been hyphenated and that the operator is attempting to redefine the hyphen position. Thus, the syllable hyphen address is stored in case the new attempt fails (e.g., the syllable(s) to the left of the cursor will not fit on the line above it) and it is necessary to reinsert the previously defined syllable hyphen. Thereafter, the X1 counter is decremented. This step insures that the syllable hyphen previously defined will be eliminated providing that the newly hyphenated syllable fits on the line. These steps are indicated by block 837.

The operation proceeds from block 835 to block 839 if the first alphabetic character detected is not a syllable hyphen and from block 837 to block 839 if it is a syllable hyphen. Thereafter, the line full indicator is sampled to determine whether it is set. If it is set, this indicates that there are no blanks on the line above the cursor addressed line and the operation stops as denoted by block 841. If the line full indicator is not set, the X1 counter is incremented as denoted by block 843 so that it is addressing the character location on the line above the cursor which is adapted to receive the character adjacent to the left margin location of the cursor addressed line. This location is either immediately to the right of a character or at the syllable hyphen location if one existed in the line above the cursor. Thereafter, the operation proceeds to block 845 whereupon the hyphen indicator and the L6 indicator are set and thence to exit block 847 to block 707 of the closure operation depicted in FIG. 10(*a*).

Summarizing the operation thus far described, the operator causes the cursor to be placed within a word located adjacent to the left margin at a position where it is desired to split the word. Thereafter, the X1 and Y1 counters define the first blank character location on the preceding line which is adapted to receive the split syllable of the word addressed by the cursor. Referring now to FIG. 10(*a*) of the drawings, the operation proceeds from block 707 to block 769 since the L6 indicator was set in the hyphenation operation described heretofore. At this time, the X2 counter is set equal to the format storage location of the cursor addressed line and the Y2 counter is set equal to the line location of the cursor addressed line. Providing no paragraph mark is detected, the operation proceeds to block 771. At this time, if the L8 latch is set, no syllable hyphen was cleared in the setup operation and, therefore, a space character must be forced. If L8 is not set, then previously separated syllables are being rejoined and a space character is not required. Thereafter, the L10 indicator is set and the operation proceeds to block 713 where a blank character is written at the Y1–X1 location and thence to block 717 where the X2 counter is incremented so that it now addresses the character located adjacent to the left margin of the cursor addressed line. The operation then proceeds to block 721 where the L10 indicator which was previously set is sampled and causes the operation to proceed to block 723 and then through blocks 705, 706, to block 707. Since the L6 indicator was reset as indicated by block 771, the operation proceeds to block 708 whereupon the hyphen indicator is sampled. Since the hyphen indicator was set, as described with respect to the operation of FIG. 12, the contents of the X2 and Y2 counters are then compared with the cursor address to determine whether they are equal. It will be recalled that the Y2–X2 counters are now addressing the first character of a line. Hence the operation would proceed to block 709 whereupon the character adjacent to the left-hand margin of the cursor addressed line is read and the L8 indicator is set. Then, as indicated by block 713, the character read is written at the Y1–X1 counter location on the line above the cursor addressed line and, providing that the X2 counter does not equal the right margin location, the X2 counter is incremented as denoted by block 717 and the X1 counter, as denoted in block 725 is incremented. The operation continues in this loop writing characters of the cursor addressed line on the line above until the Y2 and X2 counters are equal to the cursor address. At this time, the operation proceeds from block 849 to block 851 whereupon a syllable hyphen is forced into the storage register. Thereafter, the syllable hyphen is written at the Y1–X1 storage location as denoted by block 713. Since the controls for the hyphen operation and the closure operation are shared, the operation proceeds as though it were a closure operation, storing the syllable hyphen address, clearing the syllable hyphen and thereafter attempting to move the entire word addressed by the cursor to the line above it as though it were the closure operation. This operation, of course, fails and, thereafter, the counters are backed up as described with respect to the closure operation to the syllable hyphen address and the syllable hyphen is placed at its proper position. The normal closure operation is then effected whereby all of the characters in the cursor addressed line are shifted to the left into the space vacated by splitting the word located adjacent to the left-hand margin. The continuation of this operation is exactly as has been described with respect to the closure mode of operation.

One additional condition that can exist is if the syllable(s) which are attempted to be split off do not fit on the preceding line. In this case, the X1 counter reaches the right margin stop location prior to the X2 counter reaching the cursor address. When this occurs, the operation proceeds from block 719 to block 727 whereupon the L7 indicator is set. Thereafter, the steps of block 711, blocks 729, 731, and block 740 are performed as described heretofore with respect to the closure mode of operation. These operations effect the replacement of the word that was attempted to be moved to the line above the cursor addressed line onto the line addressed by the cursor. If, as denoted by block 740, the forced syllable hyphen character is read with the hyphen indicator on, the syllable hyphen is cleared as denoted in block 853. This operation prevents the syllable hyphen which was attempted to be inserted from being reinserted in the line addressed by the cursor.

4. Transfer Line Control

The transfer line control is utilized by the operator to effect the transfer of a line of text characters from one displayed position to another displayed position. In order to effect such a full line transfer operation, the operator effects the placement of the cursor adjacent to the line which will receive the transferred line and thereafter depresses the "to here" key on the function keyboard 17D. This effects the storage of the cursor vertical position (the "to here" address) within a special register of the working storage 55 of FIG. 3. The cursor is then moved to the line that is to be transferred and the "transfer line" key on the function keyboard 17D is depressed. The line to be transferred may be located up page or down page from the position at which it is desired to receive the transferred line. The line position of the line to be transferred thus identified by the vertical position of the cursor is stored in the working storage as the "from here" address. Thereafter, the line identified by the "from here" address is transferred to the line location identified by the "to here" address. If the cursor down key is thereafter depressed, the next subsequent line is transferred to a line position immediately below the line position identified by the "to here" address. If the cursor down key is fully depressed thereby engaging the rapid motion cursor control logic, lines are rapidly transferred until a paragraph mark is detected at the "from here" address. At this time, the operation ceases and requires the operator to again depress the cursor down key to effect further line transfer.

Referring now to FIG. 13(*a*) of the drawings, the operation of the line transfer routine is depicted. When the operator depresses the "transfer line" key, a start signal is applied as denoted by block 861. Thereafter, the "to here" address is placed in the Y1 counter, the "from here" address is placed in the Y2 counter, the row 1 storage address is placed in the Y2′ counter, and the X1 counter is caused to address the format position of storage. These operations are denoted in blocks 862 and 863. A check is then made as denoted by block 864 to insure that the "to here" address does not equal the "from here" address. Thereafter, a check is made as indicated by block 865 to determine whether the "to here" address is up page or down page from the "from here" address. Assuming that the "to here" address is up page, the operation proceeds to block 866 whereupon the first character of information to be transferred is read from the "from here" location and stored in row storage. The operation of blocks 867 and 868 and block 866 are then effected whereupon the second character on the line is transferred to row storage. The operation continues in this loop until the full line has been transferred to row storage at which time it proceeds to block 869 whereupon the X1 counter is set equal to the format storage location. A check is then made to see whether the Y1 counter containing the "to here" address is equal to the Y2 counter containing the "from here" address as indicated by block 870. Since they are not equal at this time, the line location of the "from here" address contained in the Y2 counter is transferred to the Y2′ counter which previously contained the row storage address and the Y2 counter is moved up page by one line. Thereafter, the operation proceeds to block 866 whereupon the first character of the line immediately above the "from here" address is shifted into the first character position of the now vacated "from here" addressed line. Thereafter, the operation proceeds as described heretofore until the full line is transferred. At this time a check is then made as indicated by block 870 to determine whether the contents of the Y2 counter is equal to the "to here" address. If it is not, the contents of the Y2 counter are again transferred to the contents of the Y2' counter and the Y2 counter is decremented by 1 as denoted by block 871. The operation then continues through the loops described above, each line being transferred down to the then cleared line immediately below it until the "to here" line is reached as indicated by block 870. Once the "to here" line is reached, the operation proceeds from block 870 to block 872. The operations thereafter effected cause the characters located in row storage which were transferred from the "from here" addressed line to be transferred from row storage to the "to here" line which was vacated. Once this operation is complete, the steps of blocks 873 and 874 are effected whereupon the "to here" address and the "from here" address are incremented by 1. Thereafter, as denoted by block 875, a test is made to determine whether the cursor down key was fully depressed thereby triggering the rapid motion switch. If the cursor down key was not fully depressed, the nonrepeat latch of the cursor control is set as denoted by block 876 and the operation stops awaiting an additional depression of the cursor down key or the institution of a new operation. If, however, the rapid motion indicator were set, the operation proceeds to block 877 where a test is made to determine whether a paragraph mark exists at the format storage location of the new "from here" address. If such a paragraph mark exists, the operation stops at block 876 as described above. This causes the operator to again depress the cursor down key and thus enables the operator to rapidly transfer paragraphs. If, however, the paragraph mark is not detected, the operation proceeds to block 862 and effects the transfer of the line at the line address immediately below the "from here" address identified by the operator to a line address immediately below the "to here" address identified initially by the operator. In this manner, successive lines of text are rapidly transferred. It should be noted that it is necessary to apply an inhibit signal to the cursor logic to prevent the downward motion of the cursor at the "from here" address until the completion of the transferring of a single line. This inhibit signal thus prevents the cursor from moving ahead of the transfer line operation.

As described above, it is possible that the line to be transferred is located up page from the position at which it is desirous to receive the transferred line. In this instance, the operation proceeds from block 865 to the exit block 879 and thence to the block 880 of FIG. 13(*b*) of the drawings. Referring briefly now to FIG. 13(*b*) of the drawings, when the "-from here" address is located up page from the "to here" address, the line located at the "from here" address is stored in row storage just as in the opposite case heretofore described. Thereafter, the contents of the Y2 counter are transferred into the Y2' counter as before and the Y2 counter is incremented instead of being decremented as described before. This operation continues until the Y2 counter is equal to the "to here" address as denoted by block 881. Thereafter the contents of the row 1 storage are transferred to the "to here" address and, once the entire row has been thus transferred, the operation proceeds through exit block 882 to block 875 of FIG. 13(*a*) whereupon the test is made as described heretofore to determine whether the rapid motion indicator has been set. Thus, as has been described, sequential lines of text are transferred a line at a time or a paragraph at a time to any identified line of text within the display without any resulting loss of information content.

5. Margin Adjust Control

The margin adjust control is used to change the margins containing a section of text so that the lines may be shortened, lengthened, or repositioned upon the page horizontally. In order to effect margin adjustment, the operator causes the cursor to be positioned at the line of text that is to be readjusted. The margin adjust key on the function keyboard 17D is then depressed. The new margins are then marked using the cursor key to identify the new margin positions and the "set left stop" and "set right stop" keys on the function keyboard 17B. The cursor down key is then depressed which initiates the operation which causes the text of the previously addressed line to conform to the new margin stops. Thereafter, further depression of the cursor down key effects margin adjustment on each line thus addressed by the cursor. The text located down page from that which was adjusted is shifted up page or down page as required by the margin adjustment operation. That is, if the new margins define a line length which is shorter than that defined by the old margins, it is necessary to shift text down page in a manner similar to that described heretofore with respect to the insert routine. However, if the new margin set defines a line length which is longer than that defined by the old margin set, it is necessary to shift the text up page in a manner similar to that of the closure operation discussed heretofore.

When the operator thus depresses the cursor down key after having identified the new margin stop positions, the system is set with the same initial conditions described heretofore with respect to the insert operation. Additionally, the LX indicator indicative of a margin adjust operation is set. Further, the old left margin stop position of the addressed line is stored in the X1 and X2 counters, the cursor vertical position is stored in the Y1 and Y2 counters and the row 1 storage position is gated to the Y2' counter. Referring now to FIG. 14 of the drawings, the operations described above are depicted by start block 891. Once the initial conditions are thus set, the operation proceeds through loop 893 which includes blocks 895, 897, and 899 to effect the transfer of text on the cursor addressed line which was previously located between the old margin stop positions to row storage. Once the entire line which was previously located between the old margin stop positions has thus been transferred to row storage, the operation proceeds to block 901 whereupon the new left margin stop position is gated from the working storage and placed in the X1 counter. Thereafter, as indicated by block 902, the row storage is read at the old left margin location and the character or blank thus read is written on the cursor addressed line at the new left margin location. A test is then made as indicated by block 903 to determine whether the information thus written adjacent to the new left margin was a character or a blank. If it was a character, the L8 indicator is set, the L10 indicator is reset, and the syllable hyphen or required hyphen indicators are set or reset in accordance with whether the character is a syllable hyphen or a required hyphen. These operations are denoted by block 904. Thereafter, as indicated by block 905, if a syllable hyphen was read, the syllable hyphen is cleared and its address is stored. If the character detected as denoted by block 903 is a blank character, the L10 indicator is set as denoted by block 906 indicating a blank character.

Once the character has been thus read from row storage and written at the new left margin location, the test performed to determine whether the character is an alphanumeric character or a blank, and the appropriate indicator is set, the operation proceeds to block 907 whereupon a check is made to determine whether the X2 counter has reached the old right margin stop location. If it has not reached the old right margin stop location, the X1 counter is checked to determine whether it has reached the new right margin stop location as indicated by block 908. If it has not reached the new right margin location, the operation proceeds to block 909 whereupon the blank and syllable hyphen indicators are tested. If the character thus stored in the line addressed by the cursor, in the operation defined by block 902 was not a blank or syllable hyphen, the X1 counter is incremented by 1 as indicated by block 910. If, however, it was a blank or syllable hyphen, the X1 counter retains its count. Thereafter, as indicated by block 911, the X2 counter is incremented by 1 and the operation returns to block 902 whereupon the next character is read from row storage and written at the cursor addressed line. In this manner, each character previously stored in row storage under the control of operational loop 893 is read from the row storage and rewritten into the line addressed by the cursor starting with the new left margin location. If the newly defined line is longer than or equal to the line defined by the old margin stops, the X2 counter will reach the old right margin stop position in row storage prior to the time that the X1 counter will reach the new right margin stop position in the line addressed by the cursor. When this occurs, the operation proceeds from block 907 to block 912 whereupon a test is made to determine whether the X1 counter has reached the new right margin stop position. If the X1 counter has reached the new right margin stop position, the operation proceeds to block 913 whereupon the L10 indicator is sampled to determine whether the last character read from row storage was a blank. If it was not a blank, this indicates that the newly defined line length is identical to that previously defined by the old margin stops and a cursor down operation of block 914 is effected. In this operation, the cursor is caused to move downward by incrementing the cursor vertical position counter. It should be noted at this time, that the cursor is prevented from being moved downward under the normal cursor down control when in a margin adjust operation until the operation specifies that it may be moved downward.

If, as indicated by block 912, the X1 counter does not equal the new right margin stop or, as indicated by block 913, the X1 counter equals the right margin stop but that a blank character was the last character read, the operation proceeds to block 915 whereupon the L6 indicator is set. In either of the above two defined events, there is space at the end of the newly defined line which may receive characters located down page from the newly defined line. Thus, as noted by exit step of block 915, the operation of block 721 of the close operation depicted in FIG. 10(*a*) of the drawings is next effected. This operation, where it differs from that in a normal line closure operation will be described hereinafter.

The above description describes the operation of the system when the text previously confined by the old margin stops was less than or equal to the amount of text that could be formed between the new margins. If, however, the line length defined by the new margins is shorter than that defined by the old margins, the operation proceeds from block 908 to block 916 since, in this instance, the X1 counter indicative of the newly defined line will reach the new right margin stop prior to the time that the right margin stop is reached in row storage. When the operation proceeds to block 917, the Y2 counter is set equal to the row 1 storage address and the operation proceeds to block 347 of the insert operation depicted in FIG. 6(*c*). This operation, where it differs from the insert operation of a text content control operation will now be described.

Referring now to FIG. 6(*c*) of the drawings, when it is detected that the X1 counter is equal to the new right margin address, the operation proceeds as has been described to block 347. At this time, the row storage is read. This character represents the character which would overflow the new right-hand margin position and this character is decoded to detect whether it is a blank character, a space character or an alphanumeric character in the same manner as described heretofore with respect to the insert operation. If, for example, it is a space character, this means that the character immediately preceding it was a valid line ending character and, therefore, the text information now located in the line containing the new margin stops can remain as is. Thereafter, the contents of the row storage representative of the information which previously existed on the line and which now must be shifted down page is transferred to the line immediately below the line containing the new margins. This information transfer is in the same manner as that described with respect to the insert operation, all information previously located on the newly addressed line being shifted to the right and then down page.

If the first character read, as indicated at block 347 is an alphanumeric character, it is necessary to reterminate the line containing the new margin at a valid line ending position. Thus, the operation proceeds from block 357 to block 385 in the same manner as described heretofore. Since the LX indicator is on, the operation always proceeds from block 386 to block 389 and thereby bypasses the test to determine if the X1 and Y1 counters are equal to the cursor address. A further modification to the backup operational loop is indicated by block 398 since the LX indicator is on. The operation thus proceeds from block 398 to block 920 whereupon the new left margin stops are thereafter utilized in the operation for the test performed at block 399. Thus, if no word ending character is found on the line defined by the new left margin stop, the operation will proceed to rewrite the entire line and thereafter advance to a new line as necessitated for the shift of information.

Referring now to FIG. 10(*a*) of the drawings and to the closure operation depicted therein, it has been described how the margin adjust operation heretofore described proceeds to block 721 of the closure operation when it is determined that extra space exists in the line containing the newly defined margin stops. Thereafter, the closure operation as will be described, effects the shift of information up page so that the extra space of the newly defined line is utilized.

Thus, the operation proceeds from block 721 to block 725 whereupon the X1 counter is incremented so that it is addressing a new character position within the line containing the newly defined margin stops. The operation then proceeds to block 707 and thence to block 769 whereupon the X2 counter is set equal to the format storage position of storage and the Y2 counter is set equal to the line beneath the line containing the newly defined margins. Thereafter, this line is checked to determine whether a paragraph mark exists and, if no such mark exists, the L10 indicator is set. Thereafter, a blank character is written at the Y1-X1 position and the operation proceeds to block 718 whereupon it is determined that the LX indicator is set. Thereafter, the new right margin stop is read from the format storage location as indicated by block 923 and utilized for the test to be performed by block 719. Thus, the X1 counter is thereafter checked as indicated by block 719 to determine whether or not the new right margin stop is reached. Since it has not at this time been reached, the operation proceeds from block 719 to block 721 and thence to block 723 since the L10 indicator was set as indicated by block 771. Thereafter, the operation proceeds in a normal manner to block 709 whereupon the first character position of the line directly below the line containing the new margin stops is read and this information is then written as indicated by block 713 in the line containing the newly defined margin stops. The operation thereafter proceeds in the same manner as discussed heretofore with respect to the closure operation. It should be noted that the LX indicator is reset once the X1 counter has reached the right margin as denoted by block 727.

6. Logic Implementation of Margin Adjust Control

The operation of the data composing, editing and formatting system of the present invention while performing text content control operations and text modification operations has been described with respect to state diagrams which describe the operation of the device as depicted in FIG. 3 of the drawings. Thus, FIGS. 5(*a*) through 14 depict the operation of the device shown in FIG. 3 for each of the text content control operations and text modification operations. Referring now to FIG. 3 of the drawings, the state diagrams have described the movement of data from and to the various registers and storage devices in a defined sequence. This explanation has, necessarily, for the purpose of clarity and understanding, omitted reference to gating and clocking terms and to the logic which controls the flow of information from and to the various registers, counters and circuits depicted in FIG. 3.

In order to describe how the device of FIG. 3 operates in conjunction with an implementation of the control logic necessary to effect the various state diagrams depicted in FIGS. 5–14, the following description will relate to a logic implementation of the state diagram depicted in FIG. 14 relating to the margin adjust operation. Of course, much of this same logic is utilized to control the operation of the system when performing the other operations depicted in the remaining state diagrams. However, by describing a specific embodiment of one such operation, one skilled in the art could easily derive the remaining embodiments from the state diagrams.

As is recognized by those skilled in the art, there are several alternative methods of embodying the margin adjust state diagram depicted in FIG. 14 of the drawings. In the embodiment to be described, a fixed counter having a plurality of discrete states is utilized in conjunction with timing pulses and logic signals to provide appropriate gating between the various registers and counters. Referring to FIG. 14 of the drawings, various discrete counter states are depicted alongside each of the blocks labeled 901 through 916. These counter states, labeled "C1" through "C5" are representative of the state of a logical counter. For example, when performing the functions depicted in block 901, the logical counter is in the state labeled "C1." When performing the functions depicted by blocks 902–906, the counter is in its "C2" state, etc. Thus, as the operation proceeds along the various sequences depicted in FIG. 14, the counter is incremented through various states in accordance with the operations to be performed. The counter utilized to step the device to the various states could be similar to one described in the aforereferenced copending application of Louis M. Hornung, entitled "Electronic Counter."

Referring now to FIGS. 15 of the drawings, a portion of the implementation of the state diagram in FIG. 14 is depicted. More particularly, the logic utilized to control the gating of the information from the X and Y counters into the storage address register 73 and into the storage register 71 is depicted in FIGS. 15(*a*) and 15(*b*). FIG. 15(*c*) depicts the logic utilized to control the accessing of the storage unit 9 of FIG. 3 of the drawings. The logic depicted in FIG. 15(*d*) is utilized to control the state which the control counter (not shown) will assume and the logic depicted in FIG. 15(*e*) is representative of the various control latches which are set in accordance with the operations performed.

Referring now to FIG. 16 of the drawings, a series of timing pulses labeled TP1 through TP*n* are depicted. These timing pulses are generated by a counter-type of device and recur, as depicted, periodically. A series of *n* timing pulses is provided in accordance with the operation to be performed. The counter is reset to provide a TP1 output each time the control counter (not shown) advances or is reset. A second series of pulses labeled TPX is provided and occur during the latter portion of a TP pulse for a short duration as depicted.

Referring once again to FIGS. 15(*a*) and 15(*b*) of the drawings, the logic utilized to effect the transfer of information between the address counters, address registers and the storage register during the margin adjust operation depicted in steps 901 through 916 of FIG. 14 is depicted. The logical gating circuits which are unique to the operations depicted in FIG. 14 are identified in that they contain a step number identification immediately above the gating circuit depicted. Each of the step numbers correspond to the blocks depicted in FIG. 14. That is, the logical blocks having the identification "-step 01" associated therewith are utilized when performing the operations defined by block 901 of FIG. 14. In a similar manner, those containing the identification "step 02" correspond to the operation depicted in block 902, etc.

As has been described, a control counter is utilized to provide an output signal indicative of the margin adjust operation to be performed. These output signals are labeled "C1" through "C5" and are applied to the various logical circuits depicted in FIG. 15. Additionally, a series of timing pulses labeled "TP1" through "TP*n*" are provided during each of the output cycles of the control counter and are depicted in FIG. 16. Various quantities of such timing pulses are utilized for each state of the control counter. These timing pulses are also applied to the various logical and gating circuits depicted in FIG. 15.

As has been described with respect to FIG. 14 of the drawings, the operation which is performed by block 901 of the margin adjust operation is to enter the new left margin stop information into the X1 counter 79. In order to accomplish this operation, it is necessary to gate the storage address of the working storage position containing the new left margin stop information into the storage address register 73, effect the accessing of the storage unit (not shown) at the addressed location thereby effecting the gating of the information from the storage unit into the storage register 71, and to thereafter effect the transfer of the information in the storage register 71 to the X1 counter 79. Thereafter, the control counter, (not shown) is advanced from its "C1" state to its "C2" state to effect the next operation that is defined by block 902 of FIG. 14.

Referring now to FIGS. 15(*a*) and 15(*b*), the control counter (not shown) is set to state "C1" to initiate step 901 of the operation depicted in FIG. 14. Thereafter, when the first timing pulse TP1 is supplied to OR-gate 1001, AND-gate 1003 is gated with the output signal from the OR gate and provides a signal to the Y and X special encode circuits 1005 and 1007 respectively. Each of these circuits contain combinational logic which is responsive to a plurality of input signals to provide a corresponding plurality of unique output code signals "Y*spl*" through "Y*spn*" and "X*spl*" through "X*spn*." The Y-signals thus supplied correspond to the number of binary digits necessary to define the Y-coordinate storage address positions while the X-signals thus applied define the X-coordinate storage positions.

Thus, when performing step 1, the AND circuit 1003 gates the X and Y special encode circuits 1005 and 1007 which in turn supply a parallel set of output signals. The X output signals are applied to a corresponding plurality of OR-gates 1009 through 1011 which gate the bits into the storage address register 73. In a similar manner, output signals of the Y special encode circuit 1005 are applied to the corresponding plurality of OR-gates 1013 which gate the Y storage address information into the storage address register 73. Also, when pulse TP1 is applied during count C1, the AND-gate 1015 supplies an output signal which resets the X1 counter 79.

Referring now to FIG. 15(*c*) of the drawings, AND-gate 1017 is also gated during step 1 with the TP1 timing input and the C1 control counter input to provide an output signal to the OR-gates 1019 which in turn provides an output signal causing the contents of the storage unit (not shown) at the location specified by the address register 73 OF FIG. 15(*b*) to be gated into the storage register 71 of FIG. 15(*b*). It should be noted at this time that the AND-gate 1017 also is gated when the control counter (not shown) is in states C2, C4, or C5. It is to be understood that this line and others which are similarly labeled with a plurality of terms represent the output signal of an OR gate to which each of the terms has been applied.

Because the storage unit utilizes a conventional core storage unit having a destructive readout, it is necessary to rewrite the information back into the storage unit so that it is not lost. Thus, when the timing pulse TP2 is applied to the AND-gate 1021, an output signal is applied to the OR-gate 1023 causing the contents of the storage register 71 of FIG. 15(*b*) to be rewritten back into the storage unit. The output signal of the OR-gate 1023 is also applied to the AND-gate 1025 along with the TPX timing pulse and an output signal from the invert circuit 1027. The invert circuit 1027 is responsive to the AND-gate 1029 which supplies an output signal when the control counter is in its states C4 and C5. Since the control counter is now in state C1, the input circuit 1027 provides the gating signal so that the AND-gate 1025 gates the OR-gate 1031 effecting the clearing of the contents of the storage register 71 of FIG. 15(*b*).

Summarizing the operation described immediately above, when the control counter is in count C1, the storage unit is accessed during the first timing pulse TP1 and its contents transferred to a register. Thereafter, during timing pulse TP2, the contents of the register are rewritten back into the storage location. Additionally, during the latter portion of the writing cycle, the TPX pulse appears causing the storage register to be cleared.

Referring once again to FIGS. 15(*a*) and 15(*b*) of the drawings, the contents of the storage register 71 are transferred to the X1 counter under the control of AND-gate 1033, OR-gate 1035, and AND-gate 1037 when the second timing pulse TP2 appears while the control counter counts C1.

Summarizing the above described operations, the first timing pulse TP1 applied when the control counter is in count C1 causes the Y and X special encode circuits 1005 and 1007 to provide the storage address of the new left margin stop information to the storage address register 73. At the same time, the X1 counter 79 is reset and the storage unit (not shown) is accessed thereby supplying its information to the storage register 71. When the second timing pulse TP2 thereafter occurs, the contents of the storage register 71 are gated into the X1 counter and, further, they are rewritten back into the addressed storage position. Thereafter, the storage register 71 is reset. At this time, the operation performed during step 1 is complete and it is then desirous to increment the control counter to a new controlling count position. Referring now to FIG. 15(*d*) of the drawings, the AND-gate 1039 provides an output signal when timing pulse TP2 is applied which is utilized to set the control counter to its C2 state. As has been described, the counter utilized could be similar to that described in the aforereferenced copending application of Louis M. Hornung, entitled "Electronic Counter." This counter contains both counting terms and steering terms which are set during one cycle of the clock which control the next state that the clock will transfer to. Thus, the output signal provided by the AND-gate 1039 would applied to the steering terms of the control clock.

Since the control clock will next be advanced to its C2 state, the timing pulse counter (not shown) is reset so that the first signal it will thereafter supply is a TP1 signal. Referring now to FIG. 14 of the drawings, the next step to be performed as defined by block 902 is to cause the contents of the storage unit defined by the Y2' and X2 counters to be read and then rewritten at the location defined by the Y1 and X1 counters. Additionally, as denoted by blocks 903 through 906, the character thus read and rewritten is tested to determine whether it is an alphanumeric character or a blank, and certain indicators representative of the character thus detected are set. Further, as denoted by block 905, if the character thus detected is a syllable hyphen, it is necessary to clear the syllable hyphen and store its location address. All of these operations are performed during count C2.

Referring once again to FIGS. 15(*a*) and 15(*b*) of the drawings, the operations defined by the second step of the margin adjust operation depicted in FIG. 14 are initiated by the AND-gate 1041 which supplies an output signal when the first timing pulse occurs during count C2. This output signal is applied to the OR-gate 1043 which provides a Y2' and X2 IN signal which designates that the contents of the Y2' counter and the contents of the X2 counter will be transferred to the storage address register. This signal is thus applied to the OR-gate 1045 and to the OR-gate 1047. The OR-gate 1045 provides an output gating signal to effect the transfer of the contents of the X2 counter 80 to the storage address register 73. This gating signal is applied by a plurality of AND-gates 1049 through 1051. Each of the AND-gates is responsive to a corresponding bit located in the X2 counter 80. These output signals are then applied to the OR-gates 1009 through 1011 and thence to the storage address register 73. In a corresponding manner, the OR-gate 1047 provides an output gating signal to a plurality of AND-gates 1053 which provide a corresponding plurality of output signals to the plurality of OR-gates 1013. In this manner each of the bits of the Y2' counter are transferred to the storage address register. Thereafter, during the first timing pulse, the contents of the storage unit thus addressed are gated into the storage register 71. This gating is effected by the circuitry heretofore described with respect to FIG. 15(*c*) of the drawings.

When the second timing pulse TP2 is thereafter applied, the AND-gate 1055 provides a Y1 and X1 IN gating signal. This gating signal is applied through combinational gating logic identical to that described with respect to the output signal of the AND-gate 1041 to effect the gating of the Y1 and X1 counters into the storage address register 73. These gated output signals of the X1 counter are depicted by the line X11IN through X1nIN which are applied to the OR-gates 1009 through 1011 respectively. In a similar manner, the Y1nIN signal is depicted as being applied to the OR-gate 1013. The contents of the storage register 71 are then written into the storage unit (not shown) at the location defined by the storage address register 73 which contains the contents of the Y1 and X1 counters. This operation is effected by the gating circuitry which has been described with respect to FIG. 15(*c*).

Referring briefly to FIG. 14, it can be seen that the operation defined by block 903 is to determine whether the character thus read and rewritten was an alphanumeric character or a blank character. This operation is effected during the second timing pulse when the contents of the storage register 71 of FIG. 15(*b*) and FIG. 3 is gated to the decode circuit 77 of FIG. 3 by logic (not shown). The decode circuit provides an output indicative of whether it is an alphanumeric character or a blank character. This output signal is applied to the combinational logic depicted in FIG. 15(*e*) of the drawings. Referring to FIG. 15(*e*) of the drawings, if the character thus detected is a blank character, the operations of step 6 are performed and the AND-gate 1057 provides an output signal which sets the L10 latch circuit 1059. If a character is detected by the decode circuit, the AND-gate 1061 provides an output signal which resets the latch circuit 1059 and further provides a gating signal to the OR-gate 1063 which causes the L8 latch circuit 1065 to be set. Additionally, if the decode circuit provides an output indication that the character contained in the storage register was a syllable hyphen, the AND-gate 1067 provides an output signal which sets the syllable hyphen latch circuit 1069. In a similar manner the required hyphen latch circuit 1071 is set with an output signal from the AND-gate 1073 if a required hyphen is decoded. Further, both the syllable hyphen latch 1069 and the required hyphen latch 1071 are reset with an output signal applied by the AND-gate 1075 if no hyphen character is detected. In this manner, the various indicators are set in accordance with the defined operations of blocks 904 and 906 of FIG. 14 corresponding to steps 4 and 6 of FIG. 15(*e*).

Referring once again to FIG. 14, it is seen that if a syllable hyphen is detected, the syllable hyphen must be cleared and its storage address position stored. These operations are defined by block 905. In order to accomplish the operation specified by block 905, it is necessary to first sample the syllable hyphen latch 1069 of FIG. 15(*e*) to determine whether the character detected is a syllable hyphen. If the character is not a syllable hyphen, the AND-gate 1077 of FIG. 15(*d*) provides an output signal when timing pulse 3 occurs which causes the control counter to be thereafter set to its C3 state. If, however, a syllable hyphen is detected, the AND-gate 1079 of FIG. 15(*a*) provides an output gating signal which effects the transfer of the contents of the Y1 and X1 counters into the storage address register 73. During this same cycle of operation, the AND-gate 1081 of FIG. 15(*c*) provides an output gating signal to the OR-gate 1019 effecting the readout of the storage unit (not shown) to the storage register 71 of FIG. 15(*b*). In this manner, the hyphen character thus stored at the address defined by the Y1 and X1 counters is reread into the storage register 71. This readout is destructive and thus the syllable hyphen is cleared from the storage unit (not shown).

During the next timing pulse, TP4, the AND-gate 1083 of FIG. 15(*a*) causes a unique storage address to be gated into the storage address register 73. This storage address corresponds to the working storage position which will receive the contents of the Y1 counter. This storage position is then destructively read out under the control of the circuits of FIG. 15(*c*) so that it is effectively cleared. Thereafter, on the next timing pulse TP5, the AND-gate 1085 of FIG. 15(*b*) provides an output signal to the OR-gate 1087 which provides a gating signal to the OR-gates 1013 which effect the transfer of the contents of the Y1 counter (not shown) into the storage address register 73. Additionally, the output signal of the OR-gate 1087 gates the OR-gate 1089 which in turn provides an output gating signal to the AND-gate 1091. The AND-gate 1091 gates the Y position contents of the storage address register 73 into the storage register 71. Thus, during pulse TP5, the contents of the Y1 counter are transferred through the storage address register 73 to the storage register 71. During timing pulse TP6, the AND-gate 1083 again causes the Y special encode circuit 1005 and the X special encode circuit 1007 to generate the address in the working storage that will contain the Y counter address. This information is transferred to the storage address register 73 which thereafter causes the contents of the storage register 71 to be transferred to the address specified. The AND-gate 1093 of FIG. 15(*c*) effects the gating necessary to write the contents of the storage register into the addressed storage location.

Once the contents of the Y1 counter containing the vertical coordinate position of the now cleared hyphen have been placed into a unique position of working storage, the contents of the X1 counter defining the horizontal position of the now removed hyphen are stored. This operation occurs during timing pulse 7 when the AND-gate 1095 of FIG. 15(*a*) provides a signal to the Y and X special encode circuits 1005 and 1007 which in turn transfer the address of the working storage position which will contain the contents of the X1 counter to the storage address register 73. At the same time, the AND-gate 1081 of FIG. 15(*c*) causes the defined storage location to be accessed and read into the storage register 71. During timing pulse TP8, the AND-gate 1097 of FIG. 15(*b*) effects the necessary gating to effect the transfer of the contents of the X1 counter 79 into the storage register in a manner similar to that described with respect to the Y1 counter. Thereafter, during TP9 time, the AND-gate 1095 causes the storage address in the working storage which will contain the contents of the X1 counter to be gated into the storage address register 73 and further, the AND-gate 1093 of FIG. 15(*c*) effects the gating of the contents into the storage unit. In this manner, the hyphen is cleared and its address stored. At this time, the operations defined by blocks 902 through 906 of the margin adjust operation depicted in FIG. 14 are complete and the control counter is advanced to state C3 by an output signal from the AND-gate 1099 of FIG. 15(*d*).

Referring briefly once again to FIG. 14 of the drawings, it can be seen that the next operation to be performed is that defined by block 907 of the drawings. This operation causes the contents of the X2 counter to be compared with the old right margin stop position. It will be recalled that the old right margin stop position is stored in the right margin stop register 153 of FIG. 4(*b*). Referring now to FIGS. 15(*a*) and 15(*b*), in order to effect the comparison operation defined by the 7th step of the margin adjust operation, the AND-gate 1101 provides an output gating signal to the OR-gate 1045 when the first timing pulse occurs after the control counter has advanced to state C3. The output of the OR-gate 1045 effects the transfer of the contents of the X2 counter into the storage address register 73 as has been heretofore described. Simultaneously, during timing pulse TP1, each of the *n* number of bits in the right margin stop register (not shown) are gated by a corresponding plurality of AND gates of which AND-gate 1103 is representative to a corresponding plurality of OR gates of which OR-gate 1105 is representative. The output signals of these OR gates are compared with the output signals of the X positions of the storage address register 73 by compare circuit 75. As a result of the comparison operation, the compare circuit 75 provides mutually exclusive compare equal or compare not equal signals. Thereafter, the control counter (not shown) advances from state C3 to state C4 under the control of the AND-gate 1107 of FIG. 15(*d*) if the compare circuit provides a compare not equal signal. If a compare equal signal is provided, the control counter advances from state C3 to state C5 under the control of the AND-gate 1109 of FIG. 15(*d*).

Referring briefly once again to FIG. 14 of the drawings, when the operation proceeds from block 907 to block 908, the X1 counter is then compared with the new right margin stop information. Referring now again to FIGS. 15(*a*) and 15(*b*) of the drawings, the new right margin stop location is stored in a special position of the working storage. This special position is accessed under the control of the AND-gate 1111 which provides a signal to the special encode circuits which in turn provide the storage address register 73 with the address in working storage of the new right margin stop position. During the first timing pulse, this information is accessed or read from the storage unit into the storage register 71 in a manner analogous to that described heretofore. During the second timing pulse, this information is rewritten back into the storage unit. During the third timing pulse TP3, the AND-gate 1113 provides an output gating signal which gates the OR-gate 1115. The output signal from the OR-gate 1115 is applied to the OR-gates 1009 through 1011 to thereby gate the contents of the X1 counter into the storage address register 73. The output of the OR-gate 1115 also provides a gating signal to a plurality of AND gates of which AND-gate 1117 is representative. These AND gates gate the contents of each bit position of the storage register 71 to a corresponding plurality of OR-gates 1105. The output signals of the OR-gates 1105 are compared by the compare circuit 75 with the contents of the X1 counter located in the storage address register 73. If the compare operation results in an unequal comparison, and if the L10 and syllable hyphen indicators are not on, the AND-gate 1119 provides an output signal during TP3 time which causes the X1 counter 79 to be incremented by 1. Thereafter, during TP4 time, the AND-gate 1121 provides an output signal which causes the X2 counter 80 to be incremented by 1.

If, as a result of the compare operation performed during step 8, it was determined that the contents of the X1 counter were equal to the contents of the new right margin stop, AND-gate 1123 provides a gating signal during TP3 time to the Y counter encode circuit 1125. The Y counter encode circuit is similar to the Y special encode circuit 1005 and is responsive to a plurality of input signals provided by various gating circuits to provide a corresponding plurality of uniquely coded output signals to the various Y counters. Thus, when the AND-gate 1123 provides a gating signal to the Y counter encode circuit 1125, the Y counter encode circuit provides the Y2 counter 82 with a count equal to the row 1 storage address. If the comparison is equal as has been described, the AND-gate 1127 of FIG. 15(*d*) causes the control counter to assume a predetermined state corresponding to the operation to be performed by block 347 of the insert operation of FIG. 6(*c*). If the compare operation resulted in a compare unequal, the control counter is set to its C2 state under the control of the AND-gate 1129. When the control counter is thus set to its C2 state, the operations performed during step 2 are again performed in a manner identical to that heretofore described. The operation continues in this manner until either it goes to the insert operation as has been described or until the counter advances to its C5 state when it is found that the contents of the X2 counter equal the contents of the right margin stop.

When the control counter advances to its C5 state, the operation defined by block 912 of FIG. 14 is thereafter performed. This operation checks to determine whether the contents of the X1 counter are equal to the contents of the right margin stop. The operations utilized for making this determination defined as step 12 of FIGS. 15(*a*) and 15(*b*) are identical with those previously described with respect to step 8. Thereafter, as a result of the comparison made, the operation proceeds either to step 13 upon an equal comparison or to step 15 upon an unequal comparison. When the operation proceeds to step 15, the OR-gate 1131 of FIG. 15(*e*) provides a gating signal to the AND-gate 1133 which provides a signal to set the L6 latch 1135. If the compare operation indicates an equal comparison, the L10 latch is sampled to determine whether the operation advances to step 15 or to step 14. Thus, the L10 indicator is provided as in input to the OR-gate 1131 which causes the L6 indicator to be set if the L10 indicator is on at this time. Referring now to FIG. 15(*d*), if the operation proceeds to step 15, the OR-gate 1135 provides an output gating signal to the AND-gate 1137 which causes the control counter to assume a state corresponding to the operation defined by block 721 of the closure operation depicted In FIG. 10(*a*). If the operation proceeds from steps 12 and 13 to step 14, the AND-gate 1139 causes the control counter to be set to a predetermined state of the cursor down operation.

While the foregoing description has related to the operations effected during the margin adjust operation of FIG. 14, it can be appreciated by those skilled in the art that each of the state diagrams depicted in FIGS. 5 through 13 can be implemented in a similar manner utilizing many of the control circuits depicted in FIGS. 15. A different control counter would be associated with each operation or different states of the same counter could be utilized.

F. Input/Output Control

Referring to FIG. 17 of the drawings, a schematic block diagram of the output control logic as is incorporated into the data composing, editing and formatting system of the present invention is depicted. When it is desirous to effect a printer output operation, the operator depresses the "print" key or the "set printer stops" key on the function keyboard 17E of FIG. 2. When the "set printer stops" key is depressed, the device enters into a special mode of operation wherein previously existing tab stops set on the printer are cleared and a new set of tab stops corresponding to those stored in the output tab stop row of the format storage 51 are set. When the operator depresses the "print" key, all of the data information located within the page storage unit 53 of the storage unit 9 is transferred from the page storage unit 53 to the storage register 71 and thence to the print buffer 1201. The print buffer 1201 is a single character buffer which buffers the asynchronous operation of the printer and printer control unit 85. The character thus stored in the print buffer 1201 is then transferred under the control of the switching logic 1203 which forms a portion of the output control unit 35. Mode latches 1205 determine whether the device is operating in a print mode or in a set printer stops mode. The decision latches 1207 determine the most efficient operation of the printer when in print mode. That is, they determine whether the printer should tab, space, print, or carrier return. The output control sequence latches 1209 control the sequencing of the output control logic as will be hereinafter explained. The form length logic 1211 insures that the entire block of information located within the page storage unit 53 is outputted to the printer. The storage address register 73 and the address counters 79–83 operate in the same manner as has been described heretofore.

Referring now to FIG. 18 of the drawings, a detailed block diagram of the decision latches, the mode latches, and the output control sequence latches is depicted. The decision latches 1207 comprise a set of three latch circuits, the L11 latch 1213, the L12 latch 1214, and the L13 latch 1215. These latch circuits are set and reset in accordance with signals provided by the combination logic decision control 1217. This combination logic is similar to that heretofore described with respect to the margin adjust operation, the gating and timing terms applied to the logic to be hereinafter described with respect to the state diagrams depicted in FIGS. 19(*a*) through 19(*d*). The output signals of the latch circuits are provided to a decision encoding circuit 1219 which encodes the states of the latches into tab, print, carrier return, or space operations in accordance with the state of the latches. These signals are in turn utilized to effect the corresponding operation. The output control sequence latches 1209 provide output timing signals which gate the decision encode logic so that it provides an output command signal at the proper time. Additionally, the switching logic 1203 provides an input signal to the mode latches 1205 to assure that they are properly set. The operation of the sequence latches 1209 is similar to that of the control counter heretofore described with respect to the margin adjust operation. The sequence latches 1209 are responsive to the signals supplied by the combination logic sequence control 1223, the operation of which is described in the state diagrams of FIGS. 19 and 20. An L14 latch circuit 1225 if provided for certain sequencing operations to be described hereinafter.

Referring now to FIG. 19(*a*) of the drawings, a flow diagram of the sequence of system operations effected during a data output operation is depicted. When the operator depresses the "print" key on the function keyboard 17E, a start signal is provided as denoted by block 1231. A test is thereafter performed as denoted by block 1233 to determine whether a display operation or other data manipulation operations are currently being effected. If such an operation is in progress, it is continued as denoted by block 1235. If, however, no such operation is in progress, the M1 mode latch is set and the output control sequence latches are set to their OP0 state as denoted by block 1237. Thereafter, the decision latches, the print buffer, and the form length registers are all reset to zero as denoted by block 1239. Then, as denoted by block 1241, the form length (number of lines of page storage) is transferred from a predefined position of the working storage to the form length register which is also located in working storage. The form length register will thereafter be decremented as will be described so that the system always contains an indication of the line of print being outputted. Additionally, the address of the format storage column of storage is placed in the X2 counter. Thereafter, as noted by block 1243, the column 1 address of page storage is transferred into the X1 counter and the row 1 address of page storage is transferred into the Y1 counter. A special flag bit is then set at the address contained in the Y1 and X2 counters which corresponds to the format storage position of the first row of storage. This flag bit is utilized to inhibit the cursor movement to a page position located below the flag bits. In this manner, the operator is precluded from manipulating data in the area of page storage which has not yet been outputted until the output operation is complete.

Once the first character has been printed in the manner to be described, the output control sequence latches are set to the "OP1 state" in a manner to be described and, thereafter, the test denoted by block 1245 is effected. If, at this time, a display or other type of operation has been initiated, the operation proceeds to block 1235 to effect the other operations. If no such other operation interrupts at this point, the decision latches and print buffer are reset as denoted by block 1247, the column register information is transferred to the X1 counter, the format store information is transferred to the X2 counter and the row register information is transferred to the Y1 counter as denoted by blocks 1249 and 1251. Thus, the operation defined by blocks 1247 through 1251 is similar to that described with respect to blocks 1239 through 1243, the column and row information of the character to be printed being defined by the contents of the X1 and Y1 counters. Thereafter, the output control sequence latches are set to their OP2 state and the address of the output tab information in the format storage is transmitted to the Y2 counter as denoted by block 1253. Once the counters have thus been initialized, the operation of setting the decision latches is thereafter effected.

Referring now to FIG. 19(*b*) of the drawings, a state diagram depicting the controls necessary to effect the proper setting of the decision latches is depicted. This operation is entered into when the output control sequence latches are in their OP2 state. Thus, as denoted by block 1257, a test is made to determine whether the OP2 sequence latch is on and the L13 decision latch is off or if the X1 counter is not equal to the right margin stop or if the Y1 counter is not equal to the end of the page. Once the L13 sequence latch is set or once the X1 counter equals the full right margin stop or once the Y1 counter equals the last line of page storage, the output control sequence latches are set to their OP3 state as denoted by block 1259. Otherwise, a test is made as denoted by block 1261 to determine whether the L14 decision latch is on and, if it is not on, the output tab stop position of the format storage location defined by the Y2 and X1 counters is read and then rewritten back into the format storage as denoted by block 1263.

Once the character is thus read from the output tab row of the format storage, it is tested as noted in block 1265 to determine whether it is a stop code or a blank character. If it is not a stop code, or the condition $\overline{L11}$, L12 does not exist, the character in page storage which it is desired to output is read and rewritten so that it is now contained in the storage register. Additionally, the X1 counter is incremented by 1. These operations are denoted by block 1267. The character thus read is checked to determine whether it is a print code or not as denoted by block 1269 and, if it is a print code and if the L11 and L12 indicators are not on as denoted by block 1271, the L11 and L14 indicators are set on as denoted by block 1273 and the operation proceeds to the test performed previously described with respect to block 1257. If a print code is not detected as denoted by block 1269 and if the L11 or L12 indicators are not on as denoted by block 1275, the L12 and L14 indicators are set on as defined by block 1277 and the operation again returns to the steps of block 1257.

Summarizing the above operation, the output tab stop row of format storage is read to determine if a stop code is present and, if no stop code is present, the corresponding horizontal character position of page storage is read to detect whether a print code existed at that position. If a print code exists, the L11 and L14 indicators are set on and, if a print code does not exist, the L12 and L14 indicators are set on. Thereafter, the operation proceeds from the test of the L14 indicator as denoted by block 1261 to block 1279 whereupon the contents of the X1 counter are transferred to the column register and the L14 indicator is reset. Since the X1 counter was advanced as denoted in block 1267 during a preceding operation, the next position of format storage is read for the detection of a stop code and thereafter the next position of the page storage is read for detection of a print code. If no print code thereafter exists, the operation proceeds from the test indicated in block 1275 to the test of block 1257 and continues to cause the format storage to be read and thereafter the page storage to be read until either a stop code or a print code is detected.

When a print code is detected, the operation proceeds from block 1269 to block 1281 whereupon the L13 indicator is set. Thereafter, the operation proceeds to block 1259 and the output control sequence latches are set to their OP3 state. If a stop code is detected as denoted by block 1265, a test is made as denoted by block 1283 to determine whether the L11 indicator is off and the L12 indicator is on. If these indicators are thus set, the L11 and L14 indicators are set as denoted by block 1285. Thus, if a series of blank characters are read causing the L12 indicator to be set and the L11 indicator to be off, and a tab stop is thereafter detected, the L11 and L14 indicators are set on. Thereafter, as denoted by block 1279, the contents of the X1 counter are set into the column register. This enables the initiation of a line scan after a tab operation starting at the tabbed to location if further print characters exist in the print line.

If no print codes are detected in a line, the X1 counter eventually equals the right margin stop position and the output control sequence latches are set to their OP3 state as denoted by block 1259. If the first character detected is a print code and if no further print codes are located on the line, only the L11 indicator is set and the operation proceeds to block 1259. If the first character detected is not a print code, but if a print code thereafter follows, both the L12 and L13 indicators will be set. If a series of blanks are detected followed by a stop code and followed by a print code, the L11, 12 and 13 indicators are all set and the operation proceeds to block 1259.

Referring now to FIG. 19(*c*) of the drawings, once the output control sequence latches are set to their OP3 state, a test is performed as denoted by block 1287 to determine whether the L11 indicator is on and the L12 indicator is off. If the indicators are in this condition, it is desirous to print a character and the output control sequence latches are advanced to their OP4 state as denoted by block 1289. If, however, the L11 and not L12 condition does not exist, two parallel tests are made as denoted by blocks 1289 and 1291 to determine whether the decision latches specify that a space operation or that a tab operation should be thereafter effected. If a space operation is indicated, a space is set into the print buffer by the control logic as denoted by block 1293 and if a tab is indicated, a tab command is set into the print buffer as denoted by block 1295. Once the correct character is thus loaded into the print buffer, the OP4 state is set as denoted by block 1289. If neither a print operation nor a tab operation nor a space operation is specified, this means that only blank characters exist to the right of the addressed line position and that a carrier return operation should be initiated. Thus, as denoted by block 1297, a carrier return code is set into the print buffer and the flag bit at the Y1 and X2 counter locations of format storage is cleared. Thereafter, the column register is reset and the Y1 counter is incremented by 1 so that the first character position of the newly addressed line can be outputted. These operations are denoted in block 1299. Thereafter, as denoted by block 1301, the contents of the Y1 counter are gated into the row register and the flag bit is set at the Y1-X2 position of format storage. Thus, the flag bit is moved down by one line with each carrier return operation.

Thereafter, a check is made as denoted by block 1303 to determine whether the forms length register is equal to zero thereby indicating that an entire page has been outputted. If it is equal to zero, the flag bit is cleared, the output control sequence latches are reset to their OP0 state, the M1 mode latch is reset and the operation stops as denoted by block 1305. If the page length is not exhausted, the forms length register is decremented by 1 as denoted by the operation specified by block 1307. Thereafter, the output control sequence latches are set to their OP4 state which causes a test to be performed as indicated by block 1309 of FIG. 19(*d*) to insure that the printer latches have been reset thereby insuring that the printer is free for a cycle operation. If the printer is in cycle, a delay is effected as indicated by block 1311. Once the printer is free, the contents of the print buffer are transferred to the printer latches as indicated by block 1313 and a print cycle is initiated. The output control sequence latches are then set to their OP1 status as denoted by block 1315 and the next character of information is ready to be obtained.

The above description has related to the operation of the system when the operator depresses the "print" key on the function keyboard 17E. Once the "print" key has thus been depressed, the operator may thereafter wish to enter new information or revise existing information while the output operation is being effected. The flag bit which is set during the output operation in the format storage and which is advanced down page line by line as each line is outputted prevents the operator from manipulating the cursor vertical controls to address a line which has yet to be outputted. Referring briefly to FIG. 4(*a*) of the drawings, it can be seen that the AND-gate 133 has a signal supplied thereto which insures that the +1 gating signal is prevented from incrementing the cursor vertical position counter 129 if the flag bit address is less than or equal to the cursor vertical position.

Referring now to FIG. 20(*a*) of the drawings, the operation of the system when the operator depresses the "set printer stops" key is depicted. When this key is thus depressed, the output control sequence latches are set to their OP0 state as denoted by block 1325 and thereafter a test is performed as denoted by block 1327 to insure that a display or control operation is not required at this point in time. Assuming that no interrupt is thus required, the M2 mode latch is set and the print buffer is reset as denoted by block 1329 and thereafter, the column register is reset to address column 1 and the format row address is gated to the Y2 counter as denoted by block 1331. A carrier return operation is then transmitted to the print buffer so that the printer will return to its leftmost position and the output control sequence latches are set to the OP3 status to effect the carrier return as will be described hereinafter. These operations are denoted by block 1333.

Referring now to FIG. 20(*b*) of the drawings, once the initial carrier return operation is effected, a test is made as indicated by block 1335 to determine whether a control operation has been requested. Assuming no interrupt, the contents of the column register are transferred to the X1 counter as denoted by block 1337 and thereafter, the X1 counter is checked to determine whether it is equal to the full right margin stop as denoted by block 1339. If it is not equal to the full right margin stop, the output control sequence latches are set to their OP2 status as indicated by block 1341, the output tab stop row format storage is read at the character position indicated by the X1 counter and rewritten, and thereafter, the character thus read is checked as denoted by block 1343 to determine whether it is a stop code. If it is a stop code, a print stop code is stored in the print buffer as denoted by block 1345. If it is not a stop code, a print stop clear code is stored in the print buffer as denoted by block 1347. Thereafter, the X1 counter is incremented and the contents of the now incremented X1 counter are stored in the column register as denoted by the operations of block 1349. If the contents of the X1 counter are less than the full right margin stop as indicated by block 1351, the output control sequence latches are set to their OP3 status as noted in block 1353 and the tab set or tab clear operation is thereafter effected as will be described. If the X1 counter is equal to the full right margin position, the tab set or tab clear character in the print buffer is reset and a carrier return code is stored in the print buffer as noted by block 1355. In either event, the next operation performed is denoted in block 1309 of FIG. 19(*d*). The operation of block 1309 and the remaining blocks of FIG. 19(*d*) are the same as has been previously described with respect to the print operation. Once they are complete, the operation returns to block 1335 of FIG. 20(*b*).

Referring once again to FIG. 20(*b*) of the drawings, once the X1 counter equals the full right margin stop and a carrier return operation has been initiated, the operation proceeds from the test indicated at block 1339 to the operational steps of block 1357 whereby the M2 mode latch is reset and the output control sequence latches are reset to their OP0 status and the operation stops.

Summarizing the above operation, once the operator depresses the "set printer stop" key, a carrier return on the printer is initiated and, thereafter, the output tab stop row format storage is read, a character at a time. Each character thus read is decoded into a set printer stop or clear printer stop codes. The corresponding operation is thereafter effected and the next character is then read until all of the characters in the line have thus been read. Once all of the characters in the line have been read, a carrier return operation is initiated and the printer is then ready for a print operation as has been heretofore described.

The above description has related to the outputting of format information and tab control information to a printer. As is apparent to those skilled in the art, this information could be outputted in an identical manner to a serial secondary media reader/recorder unit. Further, the information thus recorded on the secondary media reader/recorder could be inputted into the storage unit of the system in a manner similar to that of outputting. All controls necessary would be similar to those described with respect to the output operation.

G. Display Control

Referring once again to FIG. 1 of the drawings, a CRT display 11 having a plurality of lines of displayed information is depicted. As has been described, the information thus displayed is stored in the storage unit 9 in the form of character representations. Each such character representation consists of eight binary bits of information which are transferred to the CRT control unit 37 under the control of the display address register 39. The character information thus transmitted to the CRT control unit is decoded into a series of blank and unblank instructions which are utilized in conjunction with conventional CRT sweep circuits to generate the character information. Several forms of character generation devices could be utilized. In the embodiment to be described, each character displayed consists of a series of dots which are aligned to form the character representations. Referring briefly to FIG. 21 of the drawings, a grid 1375 depicting the area of the CRT display in which a single character representation can be displayed is depicted. Each elemental block 1377 of the grid is adapted to display a dot or illuminated spot. The elemental blocks utilized to display the letter *M* have an "X" 1379 depicted therein. In this manner, any character, both upper case and lower case, can be displayed. A number of such imaginary grids exist adjacent to one another on the display device, the number of grids aligned horizontally corresponding to the number of characters on a line while the number of such grids aligned vertically corresponds to the number of lines displayed. In the embodiment to be described, it will be assumed that five lines of information are displayed and that 64 character positions are displayed.

Referring now to FIG. 22 of the drawings, a schematic block diagram of the CRT control unit is depicted. In order to achieve an understanding of the timing control necessitated, reference will be made to the character grid 1375 of FIG. 21. A vertical raster sweep is utilized during the display of each character so that the raster initially addresses the elemental block labeled 1377 and thereafter moves in a downward direction until all twelve blocks arranged in that column have been addressed. Thereafter, the raster continues to sweep in a downward direction through the character displayed in the next line and so on until the first column of five adjacent characters have thus been swept. The raster is then blanked and returned to the second column of the character and thereafter sweeps again in a downward direction. This operation is repeated eight times for each column or scan line.

The dot clock generator 1401 generates the necessary timing pulses to control the blanking and unblanking of the raster during its downward sweep through a single character. The character counter 1403 generates the timing signals necessary to control the gating of the appropriate vertically aligned five characters. A sixth timing pulse is provided to control movement of the raster back to an initial position. A scan line counter 1405 generates the timing signals necessary to control the blanking and unblanking of the raster in accordance with the scan line of the characters that it is addressing. A horizontal character counter 1407 supplies the necessary signals to control the proper gating of each sequential character of the five lines displayed, there being 64 displayed characters in each line. It is to be noted that this counter counts to 80, the counts 65 through 80 accounting for the horizontal retrace time of the raster. The counter 1409 maintains the vertical storage address in the storage unit 9 of the five lines displayed, these lines corresponding to the line addressed by the cursor and the two lines above that line and the two lines below it.

The first scan line of each character is always blank, this blank space being utilized to separate adjacent characters. It is during the time that the raster is sweeping the first scan line that the five vertically aligned characters in the format storage 51 or the page storage 53 of the storage unit 9 are gated to the character latches 1411–1415. At this time, the scan line counter 1405 provides an output signal indicating that the first scan line is being addressed. This signal is applied to the AND-gates 1417 through 1421 which gate the five characters to the character latches. Additionally, at this time, the scan line counter provides an output gating signal to the horizontal character counter 1407, the output of which is gated with a display function line and applied to the gating circuit 1423 and thence to the storage address register 73. In this manner, the horizontal position of the characters to be displayed is specified to the storage address register 73.

The vertical storage address of the characters to be displayed is supplied by the counter 1409 which is initially reset to a count equal to two less than the cursor vertical position. This counter advances each time the character counter provides an input signal to the AND-gate 1425 when the scan line counter 1405 is in the first scan line. The counter 1409 is reset when the character counter reaches the count of 6. Thus, as the raster sweeps in a downward direction over the first scan line of the first character to be displayed, the corresponding character in the storage unit 9 is addressed by the storage address register and gated to the storage register 71. Thereafter, the character is gated by the AND-gate 1417 to the character latch 1411. A gating signal is supplied by the character counter 1403 to the AND-gate 1417 which insures that the character is placed only in the character latch 1411. Once the first scan line of the first character has thus been swept by the raster, the dot clock 1401 supplies a count pulse to the character counter 1403 which causes the second character located in the line immediately below the first character to be gated in a similar manner to the storage register and thence into the character latch 1412. In this manner, all of the characters are loaded into their corresponding character latches.

The output of the character counter 1403 also controls the vertical trace circuit 1427 and the vertical retrace circuit 1429. Thus, during the first five character counts, the vertical trace circuit causes the raster to sweep in a downward direction and during the sixth character count, the vertical retrace circuit causes the raster to retrace to its initial vertical position.

When the character counter 1403 reaches the count of 6, the scan line counter is incremented so that it is now addressing the second scan line. When the character counter thereafter reaches a count of 1, the AND-gate 1431 gates the eight bits of the binary coded character in the character latch 1411 into the character generator 1433. Additionally, the scan line counter 1405 provides an output signal to the character generator which consists of combinational logic which encodes the character and scan line information into a set of 12 output signals. These 12 output signals are gated to a serializer 1435 which is further responsive to the dot clock 1401 to provide a series of 12 blank and unblank instructions to the intensity control circuit of the display tube 1437. These signals are synchronized with the vertical trace of the raster as the output of the dot clock generator 1401 is applied to the vertical trace circuit 1427, which in turn controls the voltage applied to the vertical deflection yokes 1439 of the display tube 1437.

Once the dot clock reaches a count of 12, the character counter 1403 advances and the character contained in the character latch 1412 is gated by the AND-gate 1441 into the character generator 1433. The second scan line of this character is serialized in a similar manner and the operation proceeds until the second column of all five characters have been displayed. Thereafter, the character counter reaches a count of 6 and the raster is blanked and retraced and the scan line counter 1405 advances so that the third scan line of each character will be thereafter displayed. This operation continues until all eight scan lines of the five characters have been displayed at which time the scan line counter provides an output signal to the horizontal character counter 1407 causing it to advance one character to the right in the page storage unit 9.

At this time, a new group of five characters are gated into the character latches 1411–1415 while the raster scans the first scan line of those characters. Eventually, the horizontal character counter 1407 reaches a count of 65 indicating that 64 characters of the five lines of the storage unit 9 which are displayed have been displayed. At this time, the raster is retraced in a horizontal direction under the control of the horizontal retrace circuit 1443. This retrace occurs during horizontal character counts 65 through 80 while a horizontal trace is effected during the counts 1 through 64 by the horizontal trace circuit 1445. Both the horizontal trace and horizontal retrace circuits cause a saw tooth wave to be applied to the horizontal deflection yokes 1447 of the display tube 1437 to cause the raster to sweep from the left to the right in a linear manner during the trace and to thereafter be retraced to its initial position.

In order to insure a continuous display of the text information, it is necessary to interrupt long character manipulation operations to effect the transfer of display information from the storage unit 9 to the character latches 1411–1415. Provision for such an interrupt has been described with respect to the output operation. Conventional interrupt control logic can readily be utilized for this purpose.

Whenever the storage address register contains the storage address of the cursor or of the left margin stop or right margin stop, the compare circuits 1449 through 1451 provide output signals to the character generator to effect the display of the cursor mark 19 of FIG. 1 or the display mark 29 of FIG. 1. It should be noted in this connection that the cursor is always along with the character contained in character latch 1413 and the display marks are displayed in conjunction with the characters contained in the character latches 1411 and 1415.

In the description of the above embodiment, it was assumed that five lines of information were displayed. Of course, as is recognized by those skilled in the art, additional lines could be displayed in accordance with the speed of the circuits utilized and the type of display embodiments selected. Since only a portion of the lines stored in the page storage unit are displayed in the present embodiment, additional circuitry is provided to give the operator a "visual feel" of the relationship of the lines displayed to the total number of lines stored. Thus, the lines are displayed at the top of the CRT tube 1437 if they represent lines of information contained at the top of the page storage unit 53 and they are displayed at intermediate locations for intermediate lines and at a lower location for lower lines. The cursor vertical position register 129 supplies an input signal to the digital to analog voltage generator 1453. An additional input representative of the line number of the top of the page and a further one representative of the line number of the bottom of the page is supplied respectively by the top of page indicator 1455 and the bottom of page indicator 1457. These signals can either be in digital or analog form and are utilized in conjunction with the digital signal supplied by the cursor vertical position counter 129 to provide an output analog signal to the vertical deflection yoke 1439. Thus, as the cursor vertical position is near the top of the page, a large DC voltage is applied to the upper vertical yoke causing the raster display to be effected near the top of the display tube 1437. As the cursor vertical position moves downward toward the bottom of the page, a DC potential is applied to the lower vertical yoke. It will, of course, be recalled that the cursor vertical position defines the middle line displayed of the page storage unit 53 and thus always represents a displayed line.

A further aid in determining the relative position of the addressed line is to display the line number. This information is located in the cursor vertical position counter and can be generated on the display surface or on an auxiliary counter.

While the above description has related primarily to the display of data information on a cathode-ray tube, it is understood by those skilled in the art that various forms of electronic display devices such as gas panel displays can be utilized without departing from the spirit and scope of this invention.

Referring once again to FIG. 3 of the drawings, it has been described with respect to the display and output operations how entire lines of text contained in the page storage unit 53 are outputted. It has further been described how only the text contained in the page storage unit 53 that is horizontally bounded by the activated margin stops and vertically bounded by the paragraph marks contained in a column of the format storage unit 51 is operated upon during the text content control operations and text modification operations described. In this manner, columnar information may be entered and adjusted without affecting the displayed information located in adjacent columns. Additionally, paragraphs of information following the operated upon paragraph of columnar information are shifted up or down page to fill void lines or to make room for additional lines. Thereafter, the adjacent columns of information which were entered and adjusted under the constraints of differing sets of margin stops are outputted to a serial printing device 85 as though the column defining margin stops were not present. That is, printing is effected serially across each line, intervening margin stops being interpreted as tab stops.

In the description of the page storage unit 53, it was assumed that there was a one for one correlation between the page storage unit 53 and the displayed information. However, as is apparent to those skilled in the art, a storage unit could readily be structured wherein the horizontal line limits are defined by control logic thereby eliminating the necessity to store blank characters located at column and line ending positions. Thus, instead of each line being defined as a line of storage, it would be defined as a predetermined number of data characters corresponding to the number of data characters and space characters displayed in a line of display. A single character representation could then be utilized to define the number of excessive blank storage locations to be displayed thereby eliminating the one to one storage and display described with respect to the preferred embodiment. In a similar manner, the column defining means instead of defining discrete storage locations would define data character locations within each line.

It has further been described with respect to the page storage unit 53 that the interword characters defining space characters are stored in storage locations located adjacent to the storage of text character representations. An additional method of storing such character representations would be to add an additional binary storage representation to each text character storage location. This added binary storage position could indicate whether a space character was located immediately to the right of the text character, thereby eliminating the necessity of storing interword spaces. This representation of space characters would be operated upon in the same manner as that described with respect to the preferred embodiment. However, such a representation would necessarily effect changes in the control logic to recognize this form of space character representation.

A further modification that can be made to the storage device without departing from the scope and spirit of the invention is to effect the storage of adjacently displayed characters in physically nonadjacent storage locations. This type of operation is often effected in data processing operations to enhance the characteristics of the storage device. Thereafter, the storage locations containing the adjacent characters would be addressed in a defined ordered sequence to effect the operations described and the display described.

A further feature of the present invention which has been described is that input keyboarding is accomplished without requiring the operator to observe margin and word ending conditions. That is, if the point of action goes beyond the right margin, it is automatically removed to the next subsequent line without splitting words or necessitating the operation of a line return key as with conventional typewriter systems. In order to insure that a word is not split, the keying of a subsequent character without keying a space character causes the entire word of which the subsequent character forms a part of to be transferred to the next line of display.

The foregoing description has related to the operation of the system as it is controlled by the control unit 23. The various discrete operations of the control unit 23 have been described with respect to state diagrams, the actual implementation of selected ones of the state diagrams having been described with respect to gating circuitry and timing clocks. As is apparent to those skilled in the art, different forms of logic implementation other than that utilized to depict the state diagrams could readily be incorporated by one skilled in the art. These forms would include stored instructions stored in a memory unit and adapted to be gated out in a sequence defined by various instruction counters and registers. Additionally, several alternative visual controls such as "light guns" could be utilized to identify the point of action on the display for various operations performed. Further, the storage and control units may be located at a remote site from the display and entry device and form a part of an associated computer system. Additional controls described in the aforereferenced application of Robert A. Rahenkamp et al. could also be incorporated for statistical information control.

While the invention has been particularly shown and described with reference to a preferred embodiment thereof, it should be understood by those skilled in the art that the foregoing and other changes in form and detail may be made therein without departing from the spirit and scope of the invention.

What is claimed is:

1. A text processing and display system comprising:

storage means for storing a plurality of coded data text characters in a plurality of addressable storage locations;

a display device responsive to the storage means for selectively displaying at least one line of text character representations corresponding to coded data text characters stored in the storage means and including space character representations;

line-defining means for defining successive lines of text character representations for display by the display device, each line of text character representations as defined comprising a first predetermined number of displayed text character representations;

margin-defining means for establishing plural sets of column boundaries within every line of text character representations, each set of column boundaries defining a number of text character representations located between said set of column boundaries for all of said successive lines of text character representations;

margin set selecting means for selecting one of said sets of column boundaries;

visual addressing means for addressing one of said text character representations in said at least one line of text character representations, said addressed text character representation being visually indicated by said display device, and for providing an output signal representative of the addressable storage location storing the corresponding coded data text character;

means responsive to said margin set selecting means and said margin defining means for inhibiting said visual addressing means from addressing text character representations within said at least one displayed line of text character representations located outside said selected set of column boundaries.

2. The text processing and display system set forth in claim 1 wherein said margin defining means further comprises means for storing a plurality of vertical line numbers, each corresponding to a set of column boundaries, each vertical line number specifying one of said successive lines of text character representations, and wherein said display device is responsive to the margin set selecting means for displaying the line specified by the vertical line number corresponding to the selected set of column boundaries.

3. The text processing and display system set forth in claim 1 further comprising:

character entry means for providing coded data text characters;

input accessing means responsive to the character entry means and to the output signal of the visual addressing means for accessing the storage location represented by said output signal, and wherein said storage means is responsive to the input accessing means and the character entry for storing a coded data text character at the accessed addressable storage location.

4. A text-processing system comprising:

a storage unit having a plurality of storage locations for storing data character representations;

line-defining means for defining a plurality of ordered line sequences of storage locations, each sequence of storage locations storing a line of data character representations;

margin-defining means for defining plural sets of low and high ordered storage locations within said ordered line sequences of storage locations defined by the line defining means;

margin set selecting means for selecting one of said plural sets of low and high ordered storage locations;

data input means for sequentially providing input data character representations;

input accessing means responsive to the data input means and to the margin defining means for sequentially accessing the ordered storage locations within the selected set of low and high ordered storage locations of successive ordered line sequences of said storage unit, said storage unit storing said sequentially provided input characters in corresponding sequentially accessed storage locations;

output control means for sequentially generating output command signals in accordance with data character representations stored in the ordered storage locations of the storage unit for use by a serial printer, said output control means generating tabulate command signals when no data character representations other than character representations are stored in storage locations having an order intermediate the storage location effecting the last command signal and the next ordered storage location defined by the margin defining means.

5. The text-processing system set forth in claim 4 further comprising:

format control means responsive to the margin-defining means and to said line-defining means for generating format command signals, said format control means generating set stop command signals corresponding to those ordered storage locations within a line sequence of storage locations defined by the margin-defining means and generating space command signals corresponding to remaining ordered storage locations within said line sequence.

6. The text processing system set forth in claim 4 further comprising:

a serial output printer responsive to the output command signals of the output control means for printing lines of text characters corresponding to the lines of text character representations stored in said storage means at a printing point, said printer including tabulation stops adapted to be set in columnar positions corresponding to the ordered storage locations defined by the margin defining means and further including tabulation means responsive to the tabulate command signals for tabulating the printing point to a columnar position defined by a tabulation stop.

7. The text processing system set forth in claim 4 further comprising:

tabulate stop-defining means for defining ordered storage locations within an ordered line sequence of storage locations corresponding to input tabulate stops;

and wherein said data input means is a serial data input means having a tabulate command output signal; adapted to receive an inputted text character in accordance with the tabulate stop-defining means;

and wherein said input accessing means is responsive to the tabulate command output signal for accessing the next higher ordered storage location defined by the tabulate stop defining means;

and wherein said output control means generating said tabulate command signal when said no data character representations are stored in ordered storage locations having an order intermediate said ordered storage location effecting the last command signal and an ordered storage location (corresponding to an input) defined by the tabulate stop defining means.

8. The text-processing system set forth in claim 4 wherein said next ordered storage location defined by the margin-defining means being only low ordered storage locations of said sets of low and high ordered storage locations.

9. The text-processing system set forth in claim 4 further comprising:

visual display means for displaying graphic representations of the data character representations stored in successive lines of ordered storage locations in corresponding successive lines of display, said displayed graphic representations including graphic representations of a plurality of the data character representations stored in storage locations last accessed by the input accessing means.

10. The text-processing system set forth in claim 9 further comprising boundary display means responsive to the margin-defining means for displaying boundary indications on said display means in positions related to the displayed position of the character representations stored in the low and high ordered storage locations defined by the margin-defining means and selected by the margin set selecting means.

11. A text-processing system comprising:

a plurality of character storage means;

line-sequencing means for defining a first plurality of access sequences of said storage means, each said access sequence identifying each character storage means to be accessed by its adjacency to at least one other character storage means in said first plurality of access sequences;

column-defining means for defining a second plurality of access sequences of said storage means, each such second access sequence identifying at least one group of character storage means, each group being selected from character storage means identified by at least one of said first plurality of access sequences;

data input means for providing text and space character representations and including means for selecting one of the second plurality of access sequences;

input access control means responsive to the column defining means and the data input means and operative on the plurality of character storage means for exclusively accessing (constraining the storing of data character representations exclusively to) the character storage means defined by the selected one of the second plurality of access sequences, said accessed character storage means being responsive to the input access control means and the data input means for storing text and space character representations;

output control means responsive to the line-defining means for accessing the plurality of character storage means in accordance with at least one of said first plurality of access sequences and for generating output command signals in accordance with the text and space character representations stored in said accessed storage means, said output control means including function command generating means for generating continuous printing point motion commands in accordance with text and space character representations stored in said accessed storage means.

12. The text-processing system set forth in claim 11 wherein the function command generating means generates line return command signals when no character representations other than space character representations being stored in the character storage means having a first access sequence order higher than the storage means effecting the last command signal.

13. The text-processing system set forth in claim 11 further comprising:

page-sequencing means for defining a sequential ordering of the sequences of said first plurality of access sequences, said input access control means being further responsive to the page-sequencing means and the line-sequencing means for sequentially accessing the exclusively accessed character storage means in an order defined by the sequential relationship of the first plurality of access sequences and by the first plurality of access sequences.

14. The text-processing system set forth in claim 13 further comprising:

overlap control means responsive to the output control means and operative on the input access control means for inhibiting the storing of data character representations in character storage means having a first access sequence order lower than the first access sequence order of the character storage means effecting the last output command signal.

15. The text-processing system set forth in claim 13 further comprising:

a serial output printer responsive to the output command signals for printing plural lines of text characters corresponding to the text and space character representations stored in the storage means defined by corresponding pluralities of first access sequences.

16. A data display system comprising:

storage means for storing a block of successive text characters;

display means responsive to said storage means having a display surface for displaying a group of successive text characters within said block of successive text characters in the form of successive horizontal lines of text characters, the area of the display surface being greater than the area required for the display of said successive horizontal lines of text characters;

display address means for selecting the group of successive text characters displayed;

relative positioning means for locating the successive horizontal lines of text characters at a relative vertical position on the display surface related to the relative position of said group of text characters within said block of text characters.

17. The data display system set forth in claim 16 wherein said display means comprises a cathode-ray tube having vertical deflection yokes for controlling the placement of the displayed lines of text characters in a vertical direction and wherein said relative positioning means provides a deflection voltage to said vertical deflection yokes proportional to the relative position of said group of text characters with respect to said block of text characters.

18. A data display system comprising:

storage means for storing a block of text characters;

display means responsive to said storage means and having a display surface for displaying a group of text characters within said block of text characters in at least one line of text characters;

actuable display incrementing means for providing an output signal when actuated;

variable scan speed control means for providing a periodically recurring output signal;

selection means operable on said variable scan speed control means for controlling the period of the periodically recurring output signal;

display address means responsive to the output signal of the display incrementing means and to the periodically recurring output signal for selecting a different group of text characters to be displayed at a selection rate related to the period of the periodically recurring output signal.

19. The data display system set forth in claim 18 further comprising:

relative positioning means for locating said at least one displayed line of text characters at a relative position on said display surface related to the relative position of said group of text characters displayed with respect to said block of said text characters.

20. A data-composing system comprising:

storage means for storing data character representations in a plurality of ordered storage locations, said stored data character representations including text character representations and interword representations;

line-defining means for defining sequential lines of successive data character representations stored in corresponding pluralities of successively ordered storage locations, each line of data character representations including a predesignated number of data character representations;

margin-defining means for establishing a set of column boundaries within each line of data characters, the set of column boundaries defining a fixed number of successive data character representations within said set of column boundaries for each line of data character representations;

word-defining means responsive to text character representations stored in successive ordered storage locations and to interword representations for defining word groups of data character representations;

word optimizing means responsive to the margin-defining means and to the word-defining means for optimizing the number of word groups located within the set of established column boundaries of each line of data character representations;

paragraph-defining means for designating vertical text boundaries corresponding to preferred ones of said lines of data character representations said vertical text boundary having an ordered storage location adjacent that of the first data character representation on said preferred line;

addressing means responsive to the margin defining means and the paragraph defining means for selecting a storage location located within a selected vertical text boundary and within the established set of column boundaries;

character insertion and deletion means alternatively operable to insert and delete data character representations from the selected storage location;

word shift control means responsive to the word defining means and to the word optimizing means for shifting selected word groups of text information stored in storage locations of a higher order than the selected storage location and within the same vertical and column boundaries to higher ordered storage locations during an insert operation and to lower ordered storage locations during a delete operation;

line shift control means for shifting the data character representations of lines of storage locations of higher order than a vertical text boundary into lines of storage locations vacated by the operation of the character shift control means and from lines of storage locations occupied by data character representations shifted by the character shift control means, said vertical text boundary being shifted with its corresponding line of data character representations.

21. The data-composing system set forth in claim 20 further comprising:

column set defining means for defining plural sets of column boundaries within each line of data characters, each set of column boundaries defining a number of successive data character representations located within said set of column boundaries for each line of data character representations and wherein said margin-defining means includes margin set selecting means responsive to the column defining means for selecting the established set of column boundaries.

22. The data-composing system set forth in claim 21 further comprising:

display means responsive to the storage means and to the addressing means for displaying at least one line of data character representations, said at least one line corresponding to the line of data character representations which include the character stored in the selected storage location.

23. A text-processing and display system comprising:

storage means for storing data character representations in a plurality of ordered storage locations, said stored data character representations including text character representations and space character representations;

column boundary defining means for defining a sequence of successively ordered storage locations;

first space character defining means for defining the number of space character representations stored in the sequence of successively ordered storage locations having a lower order than the lowest ordered storage location of the sequence storing a text character representation;

second space character defining means for defining the number of space character representations stored in the sequence of successively ordered storage locations having a higher order than the highest ordered storage location of the sequence storing a text character representation;

manual initiation means;

centering means responsive to the manual initiation means and to the first and second space character defining means and operative on the storage locations of the sequence for storing equal numbers of space character representations in said lower ordered storage locations and said higher ordered storage locations;

display means responsive to the storage means for displaying data character representations stored in the ordered sequence of storage locations and for displaying indicator marks adjacent to the data character representations stored in the lowest and highest ordered storage locations of the sequence.

24. A data composing and display system comprising:

storage means for storing data character representations in a plurality or ordered storage locations;

line-defining means for defining sequential lines of successive data character representations stored in corresponding pluralities of successively ordered storage locations, each line of data character representations corresponding to a predesignated number of data character representations;

margin-defining means for establishing a set of column boundaries within every line of data character representations, the set of column boundaries defining a number of successive storage locations for each line of data characters;

storage addressing means for sequentially addressing the ordered storage locations established by the set of column boundaries of a preferred line of data character representations;

character initiation means for supplying an initiation signal;

character generating means responsive to the initiation signal for cyclically generating special character representations;

character gating means for gating said cyclically generated character representations into said storage locations addressed by said addressing means;

display means responsive to the storage addressing means for displaying a line of character representations corresponding to the data character representations stored in the ordered storage locations addressed by the storage addressing means.

25. The data display system set forth in claim 24 wherein the special character representation is an underscore character representation.

26. A text processing and display system comprising:

storage means for storing data character representations in a plurality of ordered storage locations, said stored data character representations including text character representations and interword representations;

line-defining means for establishing sequential lines of successive data character representations in corresponding pluralities of successively ordered storage locations, each line of data character representations corresponding to a predesignated number of data characters;

margin-defining means for establishing a set of column boundaries within each line of data character representations, the set of column boundaries defining a number of successive data character representations within each line of data character representations;

data input means for providing input data character representations to ordered storage locations located within said set of column boundaries;

word-defining means responsive to text character representations stored in successive ordered storage locations and to interword representations for defining word groups of text character representations;

word optimizing means responsive to the margin-defining means, the data input means, and to the word-defining means for optimizing the number of word groups located within the set of defined column boundaries of each line of data characters;

margin-redefining means for redefining the set of column boundaries within each line of data characters, the set of redefined column boundaries defining a second number of successive data character representations within each line of data character representations;

said word optimizing means being responsive to the margin-redefining means and to the word-defining means for optimizing the number of word groups located within the redefined set of column boundaries of each line of data characters;

and display means responsive to the storage means and to the line defining means for displaying at least one line of data character representations.

27. The text processing and display system set forth in claim 26 wherein said optimizing means effects the shift of word groups of text character representations to succeeding lines of data character representations when the number of data character representations included within the column established by said margin defining means exceeds the number of data character representations defined by the margin redefining means.

28. The text processing and display system set forth in claim 26 wherein the optimizing means effects the shift of word groups of text character representations from succeeding lines of data character representations when the number of data character representations defined by the margin redefining means exceeds the number of data character representations defined by the margin-defining means.

29. A method for formatting data character representations including text character representations and interword representations comprising:

storing data character representations in ordered storage locations;

displaying said stored data character representations within a first set of line boundaries on a plurality of display lines of a temporary display, specifying a second set of line boundaries for said plurality of display lines;

defining word groups of data character representations as successive text character representations stored in corresponding successive ordered storage locations;

optimizing the number of said word groups displayed on each display line within said second set of line boundaries by shifting word groups of data character representations to and from successive display lines.

30. The method for formatting data character representations set forth in claim 29 further comprising:

optimizing the number of word groups displayed on each display line within said first set of line boundaries prior to specifying said second set of line boundaries.

* * * * *

PO-1050
(5/69)

UNITED STATES PATENT OFFICE
CERTIFICATE OF CORRECTION

Patent No. 3,618,032 Dated February 18, 1972

Inventor(s) Paul E. Goldsberry & Jack Ward Simpson

It is certified that error appears in the above-identified patent and that said Letters Patent are hereby corrected as shown below:

In the Specification:

Column 1, line 38 after "(4)" insert --;(6)--. Column 2, line 67 change "medium" to --media--; line 68 change "media" to --medium--. Column 6, line 53 after "text" insert --content--. Column 10, lines 7 and 8 delete "corresponding to the number of characters". Column 12, line 4 change "latch signal" to --latch circuit--. Column 15, line 16 delete "and then store the margin stop information" (first occurence). Column 19, line 52 change "Y2" to --Y1--; line 58 change "Y2-X1" to --Y1-X1--. Column 24, line 55 delete "is"; line 65 change "is" (first occurence) to --in--. Column 27, line 58 change resistor" to --register--. Column 29, line 61 after "motion" insert --key--. Column 34, line 12 change "dented" to --denoted--. Column 35, line 41 after "control" insert --of--. Column 45, line 37 after "would" insert --be--. Column 56, line 25 after "always" insert --displayed--.

In the Claims:

Column 58, line 48 after "at least one" insert --displayed--. Column 59, line 35 after "other than" insert --space--.

Signed and sealed this 13th day of June 1972.

(SEAL)
Attest:

EDWARD M.FLETCHER,JR.
Attesting Officer

ROBERT GOTTSCHALK
Commissioner of Patents